United States Patent
Bar-On et al.

(10) Patent No.: US 9,521,431 B2
(45) Date of Patent: Dec. 13, 2016

(54) METHOD AND A SYSTEM FOR WAVELET BASED PROCESSING

(75) Inventors: Ilan Bar-On, Haifa (IL); Oleg Kostenko, Haifa (IL)

(73) Assignee: NUMERI LTD., Haifa (IL)

(*) Notice: Subject to any disclaimer, the term of this patent is extended or adjusted under 35 U.S.C. 154(b) by 1200 days.

(21) Appl. No.: 12/448,733

(22) PCT Filed: Jan. 3, 2008

(86) PCT No.: PCT/IL2008/000028
§ 371 (c)(1),
(2), (4) Date: Jul. 2, 2009

(87) PCT Pub. No.: WO2008/081459
PCT Pub. Date: Jul. 10, 2008

(65) Prior Publication Data
US 2011/0032994 A1    Feb. 10, 2011

Related U.S. Application Data

(60) Provisional application No. 60/878,050, filed on Jan. 3, 2007.

(51) Int. Cl.
*H04N 7/26* (2006.01)
*H04N 19/64* (2014.01)

(52) U.S. Cl.
CPC .................. *H04N 19/647* (2014.11)

(58) Field of Classification Search
CPC ............ H04N 19/00818; H04N 19/007; H04N 19/008; H04N 21/234327
USPC .................................................... 375/240.19
See application file for complete search history.

(56) References Cited

U.S. PATENT DOCUMENTS

| | | | | |
|---|---|---|---|---|
| 5,764,805 A * | 6/1998 | Martucci et al. | ............. | 382/238 |
| 6,157,746 A * | 12/2000 | Sodagar et al. | ............. | 382/240 |
| 6,351,491 B1 * | 2/2002 | Lee et al. | ................ | 375/240.03 |
| 6,393,060 B1 * | 5/2002 | Jeong | ....................... | 375/240.19 |
| 6,577,770 B1 * | 6/2003 | Martin et al. | ................. | 382/240 |
| 2003/0169928 A1* | 9/2003 | Stanek | ......................... | 382/232 |
| 2006/0156363 A1* | 7/2006 | Wu et al. | ..................... | 725/113 |

(Continued)

FOREIGN PATENT DOCUMENTS

| EP | 1722572 A1 * | 11/2006 |
|---|---|---|
| WO | WO 98/11728 | 3/1998 |
| WO | WO 2008/081459 | 7/2008 |

OTHER PUBLICATIONS

Kim et al. "Low Bit-Rate Scalable Video Coding With 3-D Set Partitioning in Hierarchical Trees (3-D SPIHT)", IEEE Transactions on Circuits and Systems for Video Technology, XP011014133, 1374-1387, Dec. 2000.

(Continued)

*Primary Examiner* — Gims Philippe
*Assistant Examiner* — Joseph Becker
(74) *Attorney, Agent, or Firm* — Manelli Selter PLLC; Edward J. Stemberger

(57) ABSTRACT

A method for compressing digital data. The method comprises creating a plurality of wavelet coefficients associated with an input signal by iteratively performing a plurality of wavelet transforms to a plurality of sub-bands of the input signal, adjusting a zerotree dataset according to each the wavelet transform, and encoding the plurality of wavelet coefficients according to the zerotree dataset.

25 Claims, 43 Drawing Sheets

(56) References Cited

U.S. PATENT DOCUMENTS

2007/0081593 A1* 4/2007 Jeong et al. ............. 375/240.19

OTHER PUBLICATIONS

Shapiro "Application of the Embedded Wavelet Hierarchical Image Coder to Very Low Bit Rate Image Coding", Plenary, Special, Audio, Underwater Acoustics, VLSI, Neural Networks, Proceedings of the International Conference on Acoustics, Speech, and Signal Processing (ICASSP), New York, Apr. 27-30, 1993, 5: 558-561, Apr. 27, 1993.
International Search Report Dated Jul. 23, 2008 From the International Searching Authority Re.: Application No. PCT/IL2008/000028.
Written Opinion Dated Jul. 23, 2008 From the International Searching Authority Re.: Application No. PCT/IL2008/000028.
Office Action Dated Sep. 19, 2012 From the Israel Patent Office Re. Application No. 199675 and Its Translation Into English.
Office Action Dated Sep. 28, 2014 From the Israel Patent Office Re. Application No. 199675 and Its Translation Into English.

\* cited by examiner

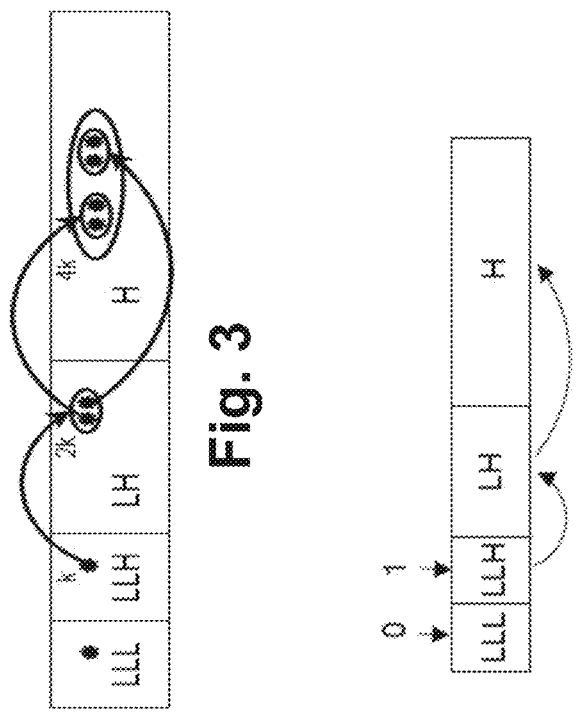
Fig. 3
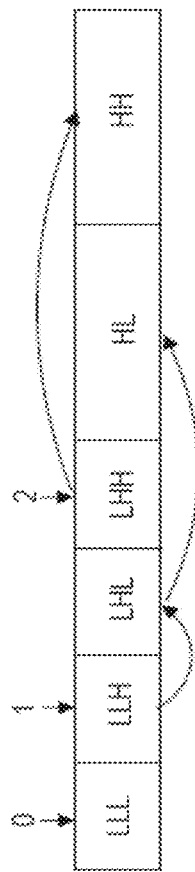
Fig. 4
Fig. 5
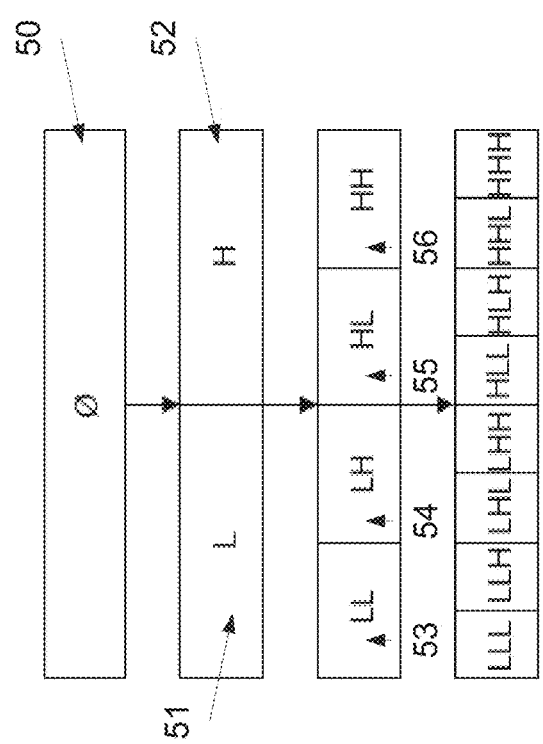
Fig. 2

Remove and transform *LLL*.

Inserting *LLLL* into the LoL's.

Inserting *LLLH* into the LoL's.

The linear array structure.

Remove and transform *LLH*.

Inserting *LLHL* into the LoL's.

Inserting *LLHH* into the LoL's.

The linear array structure.

Remove and transform *LHL*.

Inserting *LHLL* into the LoL's.

Inserting *LHLH* into the LoL's.

The linear array structure.

Original.

Row transformed.

Column transformed.

Row/Col transformed.

| $L_{xxx}$ $L_{yyy}$ | $L_{xx}H_x$ $L_{yyy}$ | $L_xH_x$ $L_{yyy}$ | | $H_x$ $L_{yyy}$ |
|---|---|---|---|---|
| $L_{xxx}$ $L_{yy}H_y$ | $L_{xx}H_x$ $L_{yy}H_y$ | $L_xH_xL_x$ $L_{yy}H_y$ | $L_xH_{xx}$ $L_{yy}H_y$ | $H_x$ $L_{yy}H_y$ |
| $L_{xxx}$ $L_yH_y$ | $L_{xx}H_x$ $L_yH_yL_y$ $L_{xx}H_x$ $L_yH_{yy}$ | $L_xH_x$ $L_yH_y$ | | $H_x$ $L_yH_y$ |
| $L_{xxx}$ $H_y$ | $L_{xx}H_x$ $H_y$ | $L_xH_x$ $H_y$ | | $H_x$ $H_y$ |

Zero Tree DAG

X-Dimension List

Y-Dimension List

Zero Tree DAG

X-Dimesion List

Y-Dimesion List

This result again in a first column transform of $L_x L_y$.

Zero Tree DAG

Zero Tree DAG

METHOD AND A SYSTEM FOR WAVELET BASED PROCESSING

RELATED APPLICATIONS

This Application is a National Phase of PCT Patent Application No. PCT/IL2008/000028 having International filing date of Jan. 3, 2008, which claims the benefit of U.S. Provisional Patent Application No. 60/878,050 filed on Jan. 3, 2007. The contents of the above Applications are all incorporated herein by reference.

FIELD AND BACKGROUND OF THE INVENTION

The present invention relates to a method and an apparatus for digital data compression and, more particularly, but not exclusively to a method and an apparatus for digital data compression of images, audio, and video using wavelet-based transformations.

Digital multimedia includes video, images and audio data, typically involving a large amount of data. For instance, one second of HD (1920×1080, 30 fps) digitized video has a data size of ≈200 M (mega bytes), and 90 minutes of such a movie would occupy ≈Tera ($10^{12}$) bytes. Similarly, transmitting such a movie over a 3 Mbps high broadband connection would take about a month.

Video and image compression have been widely adopted since the advent of digital multimedia technology and the popularization of DVD, web images, mp3 and digital cameras. Several image compression standards exist to compress images, such as JPEG and JPEG2000. Several video compression standards have been adopted for a variety of different applications. These include the International Standard Organization (ISO) video compression formats MPEG-1, MPEG-2 and MPEG-4, developed by the Moving Picture Experts Group, and the ITU H.261 and H.263 video standards. These standards came into being at different times when the stage of multimedia technology development had different needs. For example, the MPEG-1 standard supports a 352×240 resolution and an input frame rate of 30 frames per second (FPS), and produces video quality slightly below the quality of conventional VCR videos, whereas MPEG-2 supports up to a 1280×720 resolution and an input frame rate of 60 FPS and produces video quality sufficient for all major TV standards, including HDTV, with full CD-quality audio. MPEG-2 is also used with DVD-ROM since it has a relatively high compression ratio, defined simply as the ratio of compressed to uncompressed data. The MPEG-4 standard is based on MPEG-1 and MPEG-2 technology and is designed to transmit video and images over a narrower bandwidth. MPEG-4 further provides the mixing of video with text, graphics and 2-D and 3-D animation layers. H.261 and H.263 are mainly developed for teleconferencing applications that require both the encoder and decoder to operate in real time.

However, both the JPEG and the MPEG standards have a number of known drawbacks and limitations. The key to the JPEG algorithm is a discrete cosine transform (DCT) of N×N blocks. Each block is computed using the DCT, the results are quantized, and then entropy coded. Though information can be efficiently coded, using a DCT based compression, the limitations of the DCT basis Cosine functions, are that although the transform is of a global nature, the JPEG algorithm uses frequency analysis only for small areas of the image and therefore results in blocking artifacts at low compression rates. Thus, the overhead for large image size is increased. MPEG, which is based on JPEG images, suffers from the same drawbacks and limitations. Moreover, the MPEG has a number of additional limitations. For example, the MPEG compression causes motion artifacts, which are blocking artifacts in scenes with high motion. In addition, the MPEG compression causes signal degradation as single erroneous bits may affect the visual quality of large areas of the image. Moreover, the MPEG compression has high complexity due to motion estimation and compensation.

Furthermore, the existing video compression standard, such as MPEG-2 defines scalable profiles, which exploit classic DCT-based schemes with motion compensation. Unfortunately, spatial scalability as proposed by the MPEG-2 coding standard is inefficient because the bitrate overhead is too large. Additionally, the solutions defined in MPEG-2 do not allow flexible allocation of the bitrate. There is a great demand for flexible bit allocation to individual layers, for example for fine granularity scalability (FGS), which is also already proposed for MPEG-4, where the fine granular enhancement layers are intra-frame encoded.

Another known compression method is the discrete wavelet transform (DWT)-based compression. DWT-based compression is a form of finite impulse response filter. Most notably, the DWT is used for signal coding, where the properties of the transform are exploited to represent a discrete signal in a more redundant form, such as a Laplace-like distribution, often as a preconditioning for data compression. DWT is widely used for handling video and image compression to recreate faithfully the original images under high compression ratios. DWT produces as many coefficients. These coefficients can be compressed more easily because the information is statistically concentrated in just a few coefficients. During the compression, process coefficients are quantized and the quantized values are entropy encoded. The lossless nature of DWT results in zero data loss or modification on decompression to support better image quality under higher compression ratios at low-bit rates and highly efficient hardware implementation.

The principle behind the wavelet transform is to hierarchically decompose the input signals into a series of successively lower resolution coarse signals and their associated detail signals. At each level, the coarse signals and detailed signals contain the information necessary for reconstruction back to the next higher resolution level. One-dimensional DWT processing can be described in terms of a filter bank, wavelet transforming a signal is like passing the signal through this filter bank wherein an input signal is analyzed in both low and high frequency bands. The outputs of the different filter stages are the wavelet and scaling function transform coefficients. The decompression operation is the inverse of the compression operation. Finally, the inverse wavelet transform is applied to the de-quantized wavelet coefficients. This produces the pixel values that are used to create the image.

In particular, the discrete wavelet transform is usually related to two pairs of filters. One pair comprises lowpass $\{\tilde{h}_k\}$ and highpass $\{\tilde{g}_k\}$ analysis filters, and the other pair comprises lowpass $\{h_k\}$ and highpass $\{g_k\}$ synthesis filters. The lowpass filters come from a respective pair of biorthogonal functions. One biorthogonal function is an analysis scaling function $\tilde{\Phi}(x)$ and the other is a synthesis scaling function $\Phi(x)$. $\tilde{\Phi}(x)$ and $\Phi(x)$ are defined by the following respective refinable equations:

$$\tilde{\phi}(x) = \sqrt{2} \sum_k \tilde{h}_k \tilde{\phi}(2x-k), \quad \phi(x) = \sqrt{2} \sum_k h_k \phi(2x-k). \quad (3.1)$$

In the same manner, the highpass filters come from another pair of biorthogonal functions. The first biorthogonal function is an analysis wavelet function $\tilde{\psi}(x)$ and the other is a synthesis wavelet function $\psi(x)$. $\tilde{\psi}(x)$ and $\psi(x)$ are defined by the following related refinable equations:

$$\tilde{\psi}(x) = \sqrt{2} \sum_k \tilde{g}_k \tilde{\psi}(2x-k), \quad \psi(x) = \sqrt{2} \sum_k g_k \psi(2x-k). \quad (3.2)$$

A more elaborate mathematical discussion on the filters can be found in David F. Walnut, An Introduction to Wavelet Analysis, Birkhauser, 2001, which is herein incorporated in its entirety by reference into the specification.

Biorthogonality then implies the following conditions:

$$\sum_k h_k \tilde{h}_{k-2l} = \sum_k g_k \tilde{g}_{k-2l} = \delta_l, \quad \delta_l = \begin{cases} 1 & l = 0 \\ 0 & l \neq 0 \end{cases}. \quad (3.3)$$
$$\sum_k h_k \tilde{g}_{k-2l} = \sum_k g_k \tilde{h}_{k-2l} = 0,$$

which are the equivalent of the perfect reconstruction property in signal analysis, see M. Vetterli and J. Kovacevic, Wavelets and Sub-band Coding, Prentice Hall, 1995, which is herein incorporated in its entirety by reference into the specification. The DWT and IDWT can now be defined to move from the signal domain to the wavelet domain and vice versa. In particular, based on the input signal $\{c^{(1)}(i) \in R\}$ and the analysis filters as above, the DWT can be defined as follows:

$$c^{(0)}(i) = \sum_j \tilde{h}_{j-2i} c^{(1)}(j), \quad d^{(0)}(i) = \sum_j \tilde{g}_{j-2i} c^{(1)}(j), \quad (3.4)$$

where the $c^{(0)}(i)$ denotes the lower resolution representation of the original signal and $d^{(0)}(i)$ denotes additional detailed parts of the signal. Conversely, given the lower resolution representation $\{c^{(0)}(i) \in R\}$ and the additional detailed parts $\{d^{(0)}(i) \in R\}$, the IDWT is defined as:

$$c^{(1)}(2i) = \sum_j h_{2(i-j)} c^{(0)}(j) + \sum_j g_{2(i-j)} d^{(0)}(j), \quad (3.5)$$
$$c^{(1)}(2i+1) = \sum_j h_{2(i-j)+1} c^{(0)}(j) + \sum_j g_{2(i-j)+1} d^{(0)}(j).$$

In known applications, such as encoders, decoders, compressor, and decompressor, the compressed input comprises highly correlated signals, such as voice samples, audio samples, pixel based images, and video, which are captured by the wavelet coefficients and computed using the DWT. The transformed signals can be efficiently compressed, usually in a lossy way, yielding an encoded bit-stream that can be transmitted over a computer network such as the Internet or stored on a medium such as a DVD disk. Applications, which are designed to decode such transformed signals, reconstruct the encoded bit-stream using the IDWT. Though the resulting signal is not mathematically the same as the original, it can be used for many purposes.

International Pat. App. Pub. No. WO2007/083312 published on July 2007, which is incorporated herein by reference, discloses methods and apparatuses for compressing and decompressing digital data. The method for compressing digital data comprises a number of steps: a) generating a vector-valued dataset according to the digital data, b) transforming the vector-valued dataset into multiwavelet coefficients, and c) entropically coding the multiwavelet coefficients. The method for decompressing digital data is substantially made up of the same steps as the method for compressing digital data but functioning in a reverse manner.

SUMMARY OF THE INVENTION

The present invention relates to a method and an apparatus for digital data compression and, more particularly, but not exclusively to a method and an apparatus for digital data compression using wavelet-based transformations.

According to an aspect of some embodiments of the present invention there is provided a method for compressing digital data. The method comprises a) creating a plurality of wavelet coefficients associated with an input signal by performing a plurality of wavelet transforms to a plurality of sub-bands of the input signal, b) adjusting a zerotree dataset according to each the wavelet transform, and c) encoding the plurality of wavelet coefficients according to the zerotree dataset.

Optionally, the encoding is entropy coding.
Optionally, the performing is iteratively performed.
Optionally, the a) and b) are performed concurrently.
Optionally, the plurality of wavelet coefficients comprises a plurality of multiwavelet coefficients.

Optionally, each the wavelet transform divide respective the sub-band to a high-resolution sub-band and a low-resolution sub-band.

Optionally, the input signal comprises a member of a group consisting of: one dimensional data and multi dimensional data.

More optionally, the multi dimensional data comprises a member of a group consisting of: an image, a sequence of images, a video stream, a three dimensional image and a four dimensional image.

Optionally, the plurality of wavelet transforms are iteratively performing for a predefined number of iterations.

Optionally, the plurality of wavelet transforms are iteratively performing until each the sub-band having a predefined size.

Optionally, the zerotree maps a plurality of relations among a plurality of sub-bands each sub-band comprising at least one of the plurality of wavelet coefficients.

More optionally, the input signal having a plurality of dimensions, the zerotree mapping the relations in the plurality of dimensions.

Optionally, the zerotree comprises a plurality of linked lists.

Optionally, the plurality of sub-bands comprises at least one parent sub-band having at least two child sub-bands.

More optionally, the plurality of wavelet transforms are performed to maintain a predefined size ratio between the at least one parent sub-band and the at least two child sub-bands.

Optionally, the plurality of wavelet transforms are performed in a non-recursive manner.

Optionally, the plurality of wavelet transforms are performed to maintain a predefined ordering among the plurality of sub-bands.

Optionally, the zerotree dataset is adjusted according to a size order of the plurality of sub-bands.

Optionally, the method further comprises adjusting a directed acyclic graph (DAG) according to each wavelet transform before b), wherein the zerotree dataset is adjusted according to the DAG.

Optionally, the a)-c) are performed in a first network node, further comprising forwarding the encoded plurality of wavelet coefficients to at least one second network node.

More optionally, the encoding is performed according to one member of the group consisting of: a scalar quantization method, a vector quantization method, a Huffman coding method, an arithmetic coding method, and a zero tree method.

According to an aspect of some embodiments of the present invention there a method for analyzing digital data. The method comprises: a) creating a plurality of wavelet coefficients associated with an input signal by performing a plurality of wavelet transforms to a plurality of sub-bands of the input signal, b) adjusting a zerotree dataset according to each the wavelet transform, and c) using the zerotree dataset during the analysis of the plurality of wavelet coefficients.

According to an aspect of some embodiments of the present invention there is provided a method for decompressing encoded digital data. The method comprises: a) extracting a plurality of encoded wavelet coefficients by entropically decoding an encoded digital data, b) reconstructing a zerotree dataset according to the encoded wavelet coefficients, and c) using the zerotree dataset for performing an inverse wavelet transform on the encoded wavelet coefficients, thereby reconstructing the digital data.

According to an aspect of some embodiments of the present invention there is provided an apparatus for compressing digital data. The apparatus comprises a wavelet transformation module configured for creating a plurality of wavelet coefficients associated with an input signal by iteratively performing a plurality of wavelet transforms to a plurality of sub-bands of the input signal, a zerotree adjusting module, associated with the wavelet transformation module, configured for adjusting a zerotree dataset according to each the wavelet transform, and a processing module for processing the plurality of wavelet coefficients according to the zerotree dataset.

Optionally, the processing comprises encoding the plurality of wavelet coefficients according to the zerotree dataset.

Optionally, the processing comprises analyzing the plurality of wavelet coefficients according to the zerotree dataset.

According to an aspect of some embodiments of the present invention there is provided an apparatus for decompressing encoded digital data. The apparatus comprises an entropy decoder module configured for extracting a plurality of encoded wavelet coefficients by entropically decoding a encoded digital data, a zerotree reconstructing module configured for reconstructing a zerotree dataset according to the encoded wavelet coefficients, and an inverse wavelet transformation module configured for using the zerotree dataset for performing an inverse wavelet transform on the encoded wavelet coefficients, thereby reconstructing the digital data.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings and images. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 2 is a schematic illustration of a number of transforms each performed in a different iteration of the process, which is depicted in FIG. 1, according to some embodiments of the present invention;

FIGS. 3-5 are schematic illustrations of different wavelet trees;

DESCRIPTION OF SPECIFIC EMBODIMENTS OF THE INVENTION

Figure 1:
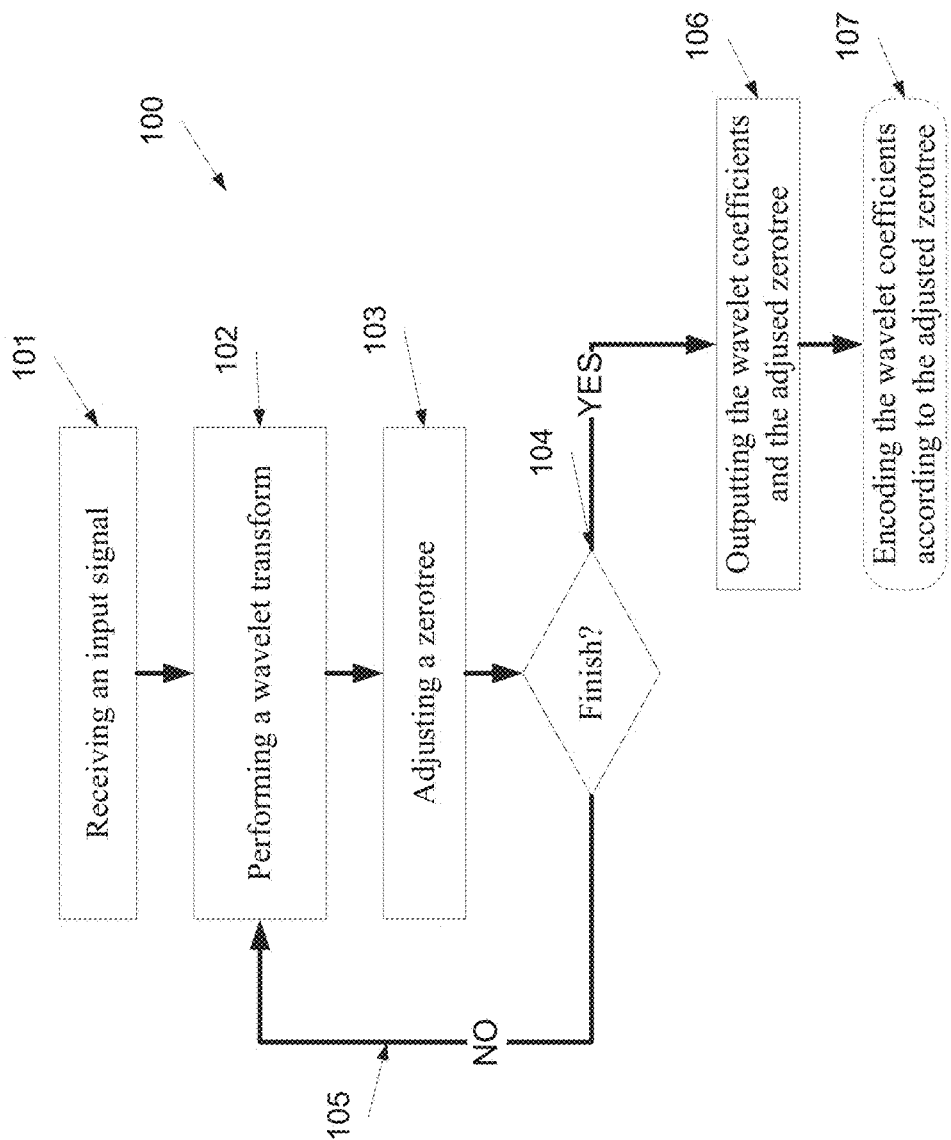
FIG. 1 is a flowchart that illustrates a method for compressing digital data using wavelet transform, according to some embodiments of the present invention.

The present invention relates to a method and an apparatus for digital data compression and, more particularly, but not exclusively to a method and an apparatus for digital data compression of images, audio, and video using wavelet-based transformations.

According to an aspect of some embodiments of the present invention there is provided a method for compressing digital data. The method is designed for comprising one dimensional data, such as an array, and/or multidimensional data, such as an image, a sequence of images, for example a video stream and/or sequence. The method is based on a number of phases. After an input signal that includes the aforementioned data is received, a plurality of wavelet which are associated with the input signal, are generated. As used from here on, wavelet coefficients means wavelet coefficients and/or multiwavelet coefficients and wavelet transform means wavelet transform and/or multiwavelet transform. The coefficients are generated by iteratively performing a plurality of wavelet transforms to the input signal. In each one of the iterations, the input signal or any segment thereof is divided to two or more sub-bands. Optionally, one of the sub-bands is a high-resolution sub-band and the other is a low-resolution sub-band. The plurality of wavelet transforms are applied in parallel to the adjusting of a zerotree dataset, optionally as described below. The zerotree dataset is adjusted according to the wavelet transforms, using relations between the sub-bands of the transformed coefficients. Now, the plurality of wavelet coefficients are encoded, optionally entropy encoded, according to the zerotree dataset. It should be noted that this encoding may be performed after any number of wavelet transforms. Methods for decoding data that has been encoded using such an adjusted zerotree are also described herein below.

According to an aspect of some embodiments of the present invention there is provided a method for decompressing encoded digital data. The method is based on extracting a plurality of encoded wavelet coefficients by entropically decoding an encoded digital data, reconstructing a zerotree dataset according to the encoded wavelet coefficients, and using the zerotree dataset for performing an inverse wavelet transform on the encoded wavelet coefficients, thereby reconstructing the digital data. Furthermore, other embodiments of the present invention include apparatuses and systems for compressing data and apparatuses and systems for decompressing data.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Reference is now made to FIG. 1 which is a flowchart that illustrates a method for compressing digital data using a plurality of wavelet transforms, according to some embodiments of the present invention. First, as shown at 101, an input signal is received. As used herein, input signal means digital media data, a bit stream, an image, a sequence of images, a text segment, a video stream, an audio stream, a video file, an audio file, and a text file. Then, a plurality of wavelet coefficients associated with the received input signal are created. Optionally, for example as shown at 102-105, the plurality of wavelet coefficients are created by iteratively performing a plurality of wavelet transforms. Optionally, the wavelet transform is performed and the as wavelet coefficients are generated as described in International Pat. App. Pub. No. WO2007/083312 published on July 2007, which is incorporated herein by reference.

In some embodiments of the present invention, the input signal comprises a one dimension dataset, such as an array or the like. In such embodiments, for brevity, $S^{(N)}$ denotes the received input signal and N denotes the size thereof. $S^{(N)}$ can be represented as described in the following equation:

$$S^{(N)}=\{s_0, s_1, \ldots, s_{N-1}\}, s_i \in \mathcal{R}, 0 \leq i < N, N = 2^k N_0, \quad (1.1)$$

where $N_0$ denotes an odd integer, and k denotes a positive integer, which is herein large enough so as to simplify the following presentation of exemplary embodiments of the invention. In each one of the wavelet transform iterations, the input signal is divided to two or more sub-bands. During 102, a low pass and a high pass filters are repeatedly applied, optionally in a recursive manner, on the input signal. In each iteration, for each segment, the low pass filter results in a subsignal that have a length which is half of the length of the segment and the high pass filter results in a detailed subsignal that have a length which is half of the length of the segment.

Optionally, the process is repeated for each sub-signal as long as the length of each sub-signal is more than $N_0$. For example, as shown at FIG. 2, which is a schematic illustration of a number of transforms each performed in a different iteration of the process, given $S^{(N)}$ 50, a wavelet transform results in the sub-signals $S_L^{(N/2)}$ L 51 for the lower sub-signals and $S_H^{(N/2)}$ H for the higher sub-signals 52. It should be noted that the process may be ended before, optionally after a predefined number of iterations and/or after a certain period. Each sub-signal, which may be referred to herein as a sub-band, is labeled as L if it is a low resolution subsignal or as H if it is a high resolution subsignal. In such a manner the letters L and H represent the frequency region of the related sub-band in the original signal. During the following iteration, the lower sub-band L results in the sub-bands $S_{LL}^{(N/4)}$ 53 and $S_{LH}^{(N/4)}$ 54 which are referred to herein as the low low (LL), and low high (LH) frequency sub-bands. The higher sub-signal H results in the in the sub-bands $S_{HL}^{(N/4)}$ 55 and $S_{HH}^{(N/4)}$ 56 which are referred to herein as the high low (HL) and high high (HH) frequency sub-bands. In this application, the size of the sub-band can be computed from the corresponding length of its sub-band name, for example, $N/2^l$ where l is the label length.

During each iteration, as shown at 103, a zerotree, which is optionally initialized in advance, is adjusted according to the wavelet coefficients created in the current wavelet transform, optionally as further described below. In such an embodiment, in any iteration, the adjusted zerotree, which is referred herein as the self adjusted zerotree (SAZT), maps the wavelet coefficients of the transformed input signal with which it is associated. As described above and shown at 102-105 one or more segments of the input signal are wavelet transformed and the SAZT is respectively adjusted. Then, as shown at 106, the wavelet coefficients and the associated SAZT are outputted.

In one embodiment of the present invention, the wavelet transforms are performed before the SAZT is adjusted. In such an embodiment, the outcomes of all the transforms are stored and used for the adjusting of the SAZT. Optionally, there are no iterations in the process and transformation is fully completed before the SAZT is created.

Optionally, as described in 107, the wavelet coefficients are encoded according to the SAZT. The encoded coefficients, which are a compressed version of the input signal, can now be streamed or forwarded with less bandwidth and/or require less storage space. Optionally, the wavelet coefficients are further entropy coded. The encoding is where actual compression and scalable transmission occur. Encoding is done according to the SAZT by standard algorithms for entropy and wavelet coding such as, scalar and vector quantization methods, Huffman and arithmetic coding methods, and zero tree methods, see, inter alia, Allen Gersho et al., Vector quantization and signal compression, Kluwer Academic Publishers, 1992; Sayood Khalid, Introduction to Data Compression, Morgan Kaufmann, 2000; Jerome M. Shapiro, Embedded image coding using zero trees of wavelet coefficients, IEEE Transactions on Image Processing, 41(12):3445-3462, 1993; and Amir Said et. al, A new, fast, and efficient image codec based on set partitioning in hierarchical trees, IEEE Trans. on Circ. and Syst. for Video Tech., 6(3):243-250, 1996 which are herein incorporated in their entirety by reference into the specification. The implementation of such encoding methods is generally well known and therefore is not described here in greater detail.

Optionally, the encoded wavelet coefficients and the SAZT are forwarded or streamed to one or more remote servers and/or terminals. The SAZT is used by the receiving unit for decoding the encoded wavelet coefficients. In such a manner, media content, such as video sequence, encoded and streamed to a remote terminal.

Figure 28:
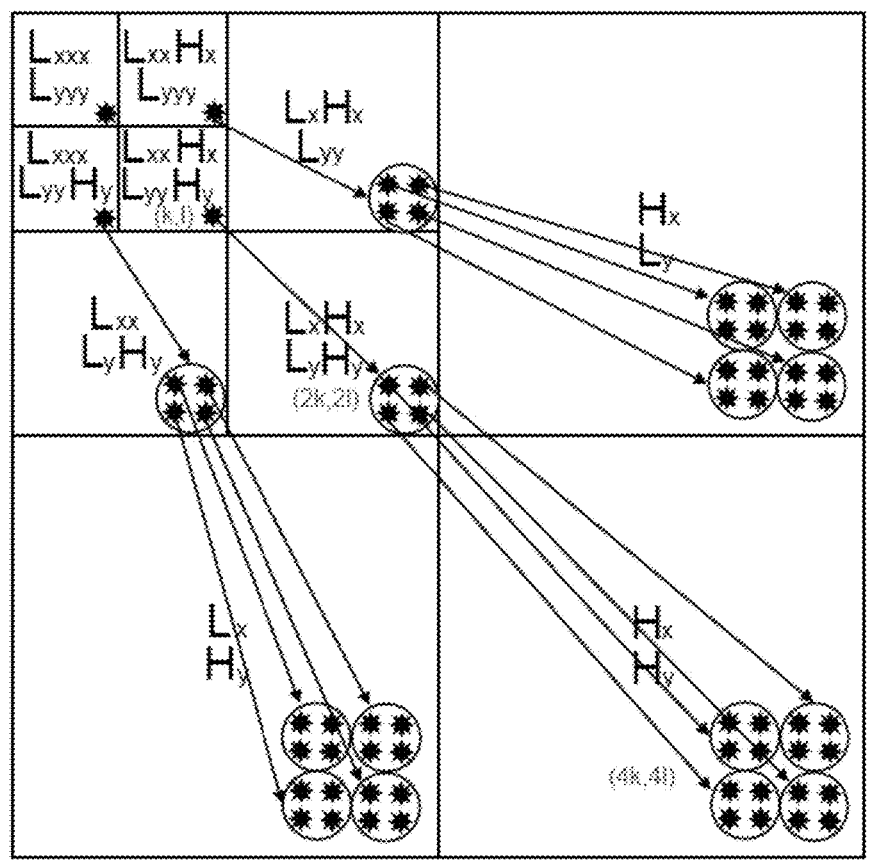
FIG. 28 is a schematic illustration of a dyadic wavelet tree, depicting local layer relations, that is used, according to some embodiments of the present invention.

As described in J. Shapiro. *An embedded wavelet hierarchical image coder* Proc. IEEE Intl. Conf. on Acoustics, Speech, and Signal Processing, 4:657-660, March 1992 and in A. Said and W. Pearlman, *Image compression using the spatial-orientation tree*, Proc. IEEE Intl. Symp. Circuits and Systems, pages 279-282, May 1993, which are incorporated herein by reference, an embedded zerotree wavelet (EZW) algorithm and a set partitioning in hierarchical tree (SPIHT) algorithm, may be used for efficiently coding 2D wavelet coefficients, for example as shown at FIG. 28. The EZW and SPIHT algorithms codes the 2D wavelet coefficients in datasets which are referred to herein as 2D wavelet zerotrees. EZW and SPIHT, which exploit the inherent similarities across sub-bands in a wavelet decomposition of an image, imply uniform quantization and bit allocation that is applied after wavelet decomposition. EZW and SPIHT are designed for coding 2D wavelet coefficients which have been generated in a dyadic wavelet transform. For clarity, it should be noted that these algorithms can be generalized in the obvious way to dyadic wavelet transforms of higher dimensions. However, they do not address the problem of non-dyadic transforms, performed on one or higher dimensions.

Optionally, the SAZT is used for analyzing the wavelet coefficients. Wavelet analysis of signals and images allows analysis of signals according to scale. Data associated with a signal or image can be analyzed according to a scale. Wavelet functions can be used to represent or approximate signal behavior at various points while satisfying certain mathematical constraints. Wavelet analysis is advantageous in analyzing signals or images having discontinuities or sharp spikes or edges. See, for example, "An Introduction To Wavelets", Gaps, Amara, 1995, Institute of Electrical and Electronic Engineers, the subject matter of which is incorporated herein by reference. The use of analytic functions to allow for the approximation and, thus characterization of signal behavior is not new and therefore not further elaborated herein.

Wavelet analysis may involve adopting a wavelet prototype function called an analyzing wavelet or mother wavelet. Frequency and time analysis can be performed with high and low frequency versions of the prototype wavelet. A wavelet expansion can then be used to represent the signal. Coefficients can be derived for the linear combination of wavelet functions which approximate the signal and can be used for data operations. Moreover, certain coefficients, for example, those below a selected threshold, can be truncated without significant effect, allowing a sparse representation of the signal, and giving rise to advantages in the area of, for example, data compression.

As described above, in some embodiment of the present invention, the SAZT is adjusted according to the wavelet coefficients which are generated in one of the wavelet transform. In such a manner, an input signal that includes packets of any sequence or stream, such as a video sequence or stream, and coded according to any wavelet transform or any sequence of wavelet transforms can be mapped.

Furthermore, as the SAZT is adjusted during the wavelet transformation, the time which is needed for compressing the input signal is reduced. Usually, for example as described in J. Shapiro. *An embedded wavelet hierarchical image coder* Proc. IEEE Intl. Conf. on Acoustics, Speech, and Signal Processing, 4:657-660, March 1992, the zerotree is created after the wavelet transformation is completed. The zerotree cannot be created before the wavelet transformation is completed as the zerotree has a predefined pattern that is based on the final wavelet coefficients of the wavelet transformation, which is a wavelet dyadic transform. In the present invention, the wavelet transformation may be performed in parallel to the creation of the SAZT. In such an embodiment, optionally by parallel processing techniques, the SAZT is adjusted according to the last wavelet transform that is applied on any segment of the input signal and therefore map in the most updated manner the wavelet coefficients immediately after the wavelet transformation ends.

Figure 6:
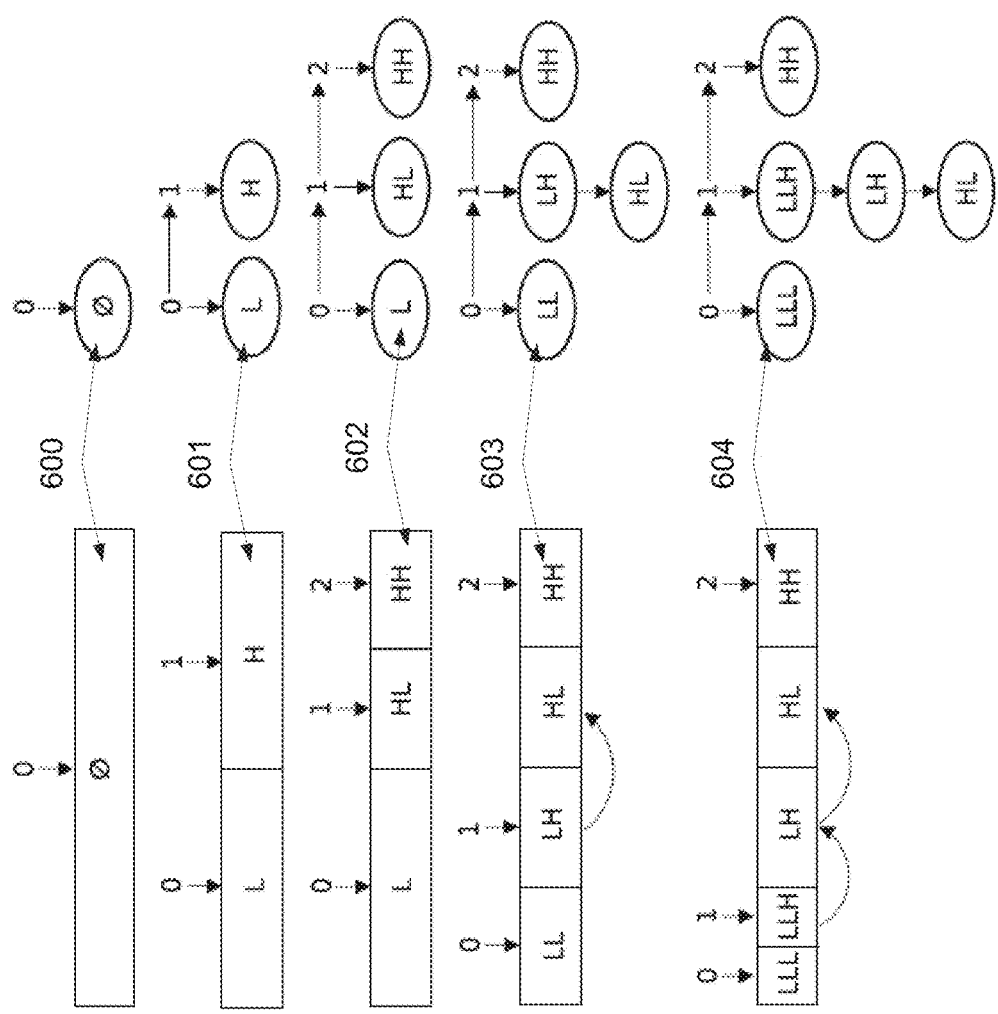
FIG. 6 is a schematic illustration of a signal which is transformed in a number of iterations and a zerotree list of lists (LoL) which is adapted thereto, both according to some embodiments of the present invention.

Reference is now made to FIGS. 3-5, which are schematic illustrations of different wavelet trees, and to FIG. 6, which is a schematic illustration of a signal which is transformed in a number of iterations and a zerotree list of lists (LoL) which is adapted thereto, both according to some embodiments of the present invention.

In an exemplary embodiment of the present invention, the input signal is transformed into wavelet coefficients according to a three level wavelet dyadic transform. In such an embodiment, the transform yields the sub-bands LLL, LLH, LH and H, each represents a respective phase-space area in the input signal on a finer resolution scale. For example, the sub-band H stores the finest details of the input signal; the sub-band LH stores the finest details of the low resolution approximation L, and so on and so forth. Hence, it is clear that these sub-bands can be adjoined, for example as shown at FIG. 3. It should be noted that FIG. 3 shows an exemplary tree structure that is rooted at a relative location $0 \leq k < N/8$ in LLH, with child nodes at respective locations $2k$, $2k+1$ in LH, and grandchild nodes at respective locations $4k$, $4k+1$, $4k+2$ and $4k+3$ in H. Obviously, the remaining wavelet coefficients in LLH may give rise to similar trees. However, the wavelet coefficients that belong to LLL remain isolated, as they have no common relations with any of the other wavelet coefficients. For clarity, wavelet coefficients may also be referred herein as pixels.

Figure 29:
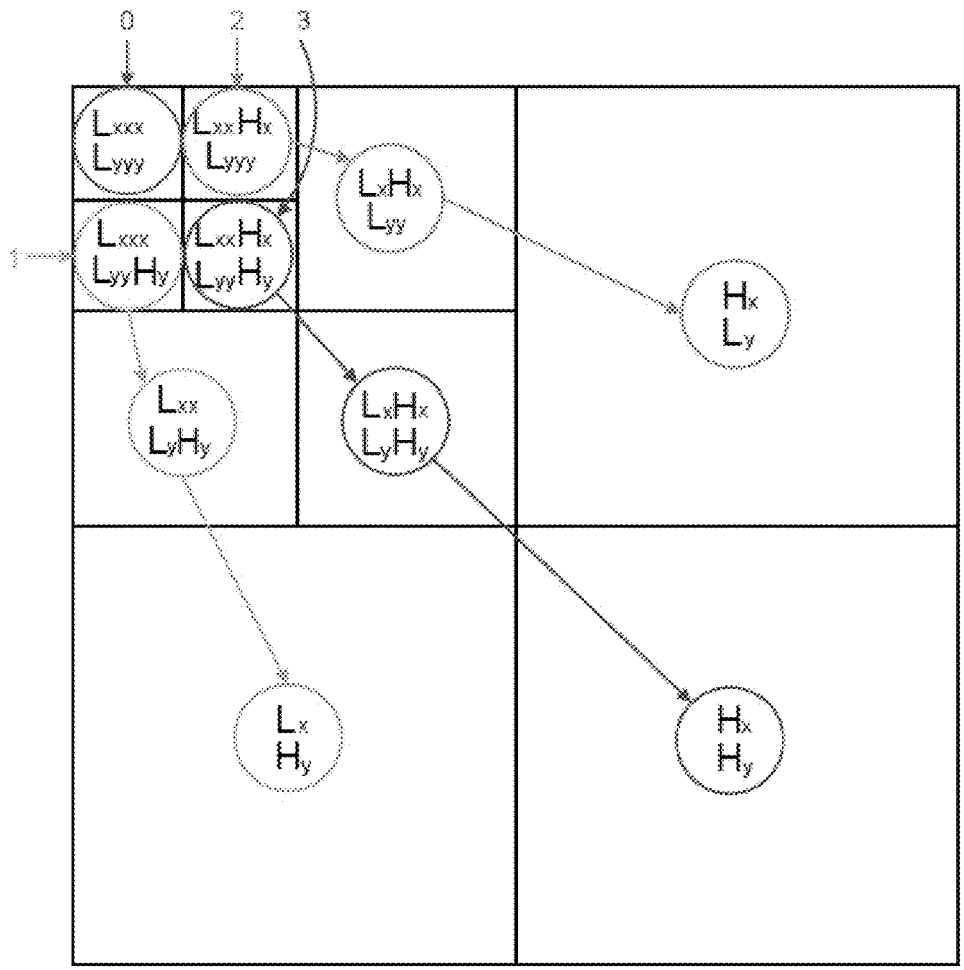
FIG. 29 is a schematic illustration of dyadic zerotree lists, according to some embodiments of the present invention.

These tree structures are distinguished with respect to global relations and local relations. As used herein a local relation is a relation that exists between any two wavelet coefficients, for example a relation that exists between wavelet coefficients among parent sub-band and its child sub-band, for example as shown at FIG. 28. As used herein a global relation is a relation that exists between subbands, for example the relation that is depicted in FIG. 29.

In the global layer, which may be referred to herein for describing the layer of global relations, such a tree forms a list of linked lists of sub-bands, each of the same detailed information, for example as shown at FIG. 4 for a dyadic transform. That is, each linked list contains sub-bands with the same number of H's. For example, a linked list, which is headed by 0, holds a low resolution sub-band representation of the signal. A linked list, which is headed by 1, points toward the detailed sub-bands of the signal. In general, in a packet like transform, a tree with finer details of information, such as a linked list, which is headed by 2, for example as shown at FIG. 5, is generated. For clarity, lists are numbered from 0, for the list with the lowest sub-band resolution, to some k≥0 for the highest sub-band resolution.

In such a manner, the relations between pixels can be locally calculated. This calculation is based on the aforementioned global linked list relations. Briefly stated, pixel relations are directed from a parent node to a child node in the aforementioned global relations representation, for example as described with relation to FIG. 3.

For clarity, as local relations are uniquely defined by global relations, in the following description, they may be ignored. Furthermore, henceforward only the global linked list representation, which may be referred to herein as a zerotree LoL, is considered. It should be noted that the zerotree LoL is depicted independently of the linear array data structure, for example as shown in FIG. 6. In such a representation, sub-band names reflect pointers to real sub-bands in a related linear array. Such a relative position may be determined by a pointer or a name comparison.

In order to define these local relations in a unique manner, some constraints are imposed on these global relations. Optionally, unless stated otherwise, in the examples and description that is provided in this document, the size of a child node of a sub-band is at least as large as its parent node, sub-band L is defined as lexicographically smaller than sub-band H, and sub-band X is lexicographically smaller than sub-band Y according to whether their labels are respectively ordered. However, it should be noted that in some embodiments of the invention, which are described herein, the lexicographical order and the size definitions may be different. In such a manner, a sub-band LLH is lexicographically smaller than a sub-band LHL. It should be noted that the lexicographical order relates to the position of sub-bands in the original linear array, for example as shown in FIG. 4. That is, if sub-band X is smaller than sub-band Y, sub-band X is positioned to the left of sub-band Y and vice versa. These constraints, which may be referred to herein as order constraints, allow defining that sub-bands should be first ordered by size, and in case of equality, by a lexicographical order of their name. Hence, in case of equality, sub-bands can be ordered from left to right. Such a definition ensures the local relations are uniquely defined.

Accordingly, a process and/or a method that maps such zerotrees with uniquely defined local relations may be used for coding wavelet trees for reflecting the current wavelet transform stage. Such a process may be referred herein as a self adjusted zerotree (SAZT) generation process.

Figure 7:
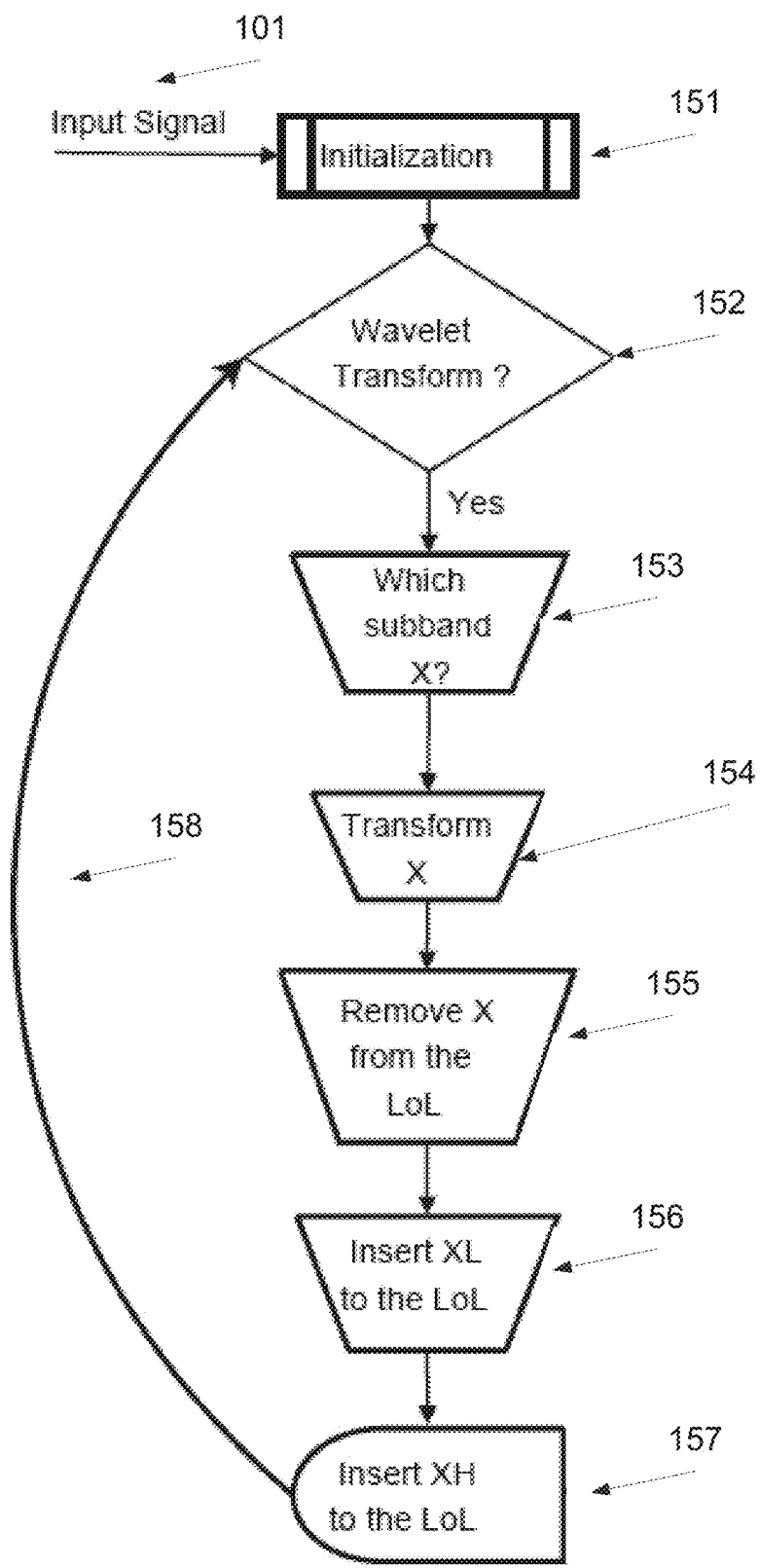
FIG. 7 is a flowchart of a self adjusted zerotree (SAZT) generation process, according to some embodiments of the present invention.

Reference is now made to FIG. 7, which is a flowchart of the SAZT generation process, according to some embodiments of the present invention. 101 is as described in FIG. 1, however FIG. 7 depicts 151 and 152-158 which is an iterative process for building a SAZT.

Reference is also made to FIG. 6, which are schematic illustration of an exemplary SAZT generation, which may also be referred to herein as a zerotree LoL generation, as described above. At the end of any transform iteration which is depicted in FIG. 6, the zerotree LoL complies with the aforementioned order constraints.

Initially, as shown at 101, the input signal that includes the original data, as shown at 600, is received. Then, as shown at 151, a zerotree LoL that consists of a linked list with only one element is initialized. Then, for example as shown at 601-604, the original data is transformed in a number of iterations, each transform is associated with a respective zerotree LoL. As shown at 152-157, a sub-band is selected 153 and transformed 154. This transform leads to replacing the associated zerotree LoL with a respective low (L) and high (H) child sub-bands 155-157.

Figure 8:
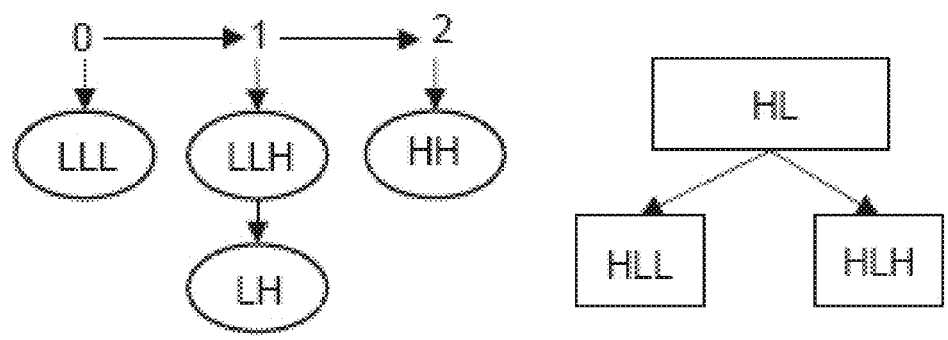
FIGS. 8-10 are schematic illustrations that depict an exemplary iteration of few steps of the SAZT generation process, according to one embodiment of the present invention.
Figure 9:
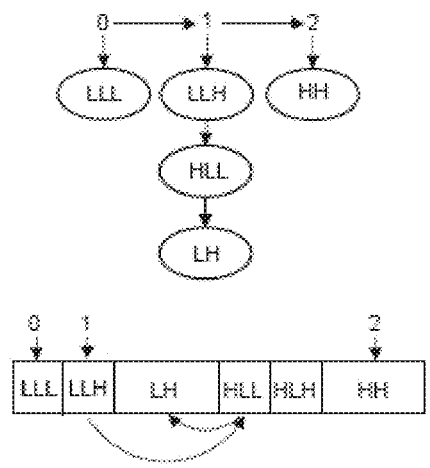
Figure 10:
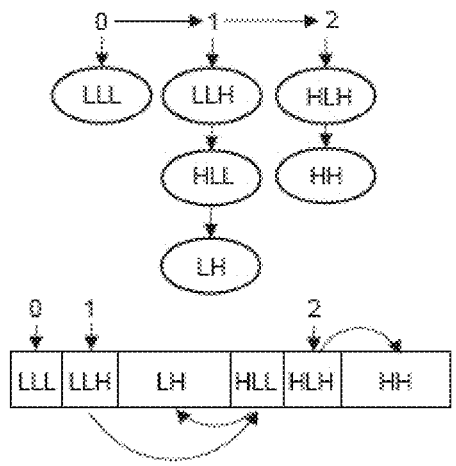

Reference is also made to FIGS. 8-10, which are schematic illustrations that depict an exemplary iteration of 154-157 of the SAZT generation process, according to one embodiment of the present invention. In FIG. 8 the sub-band HL is transform to get HLL and HLH 154 and then removed 155. In FIG. 9 the sub-band HLL is inserted 156 and in FIG. 10 the sub-band HLH is inserted 157.

It should be noted that such a process 152-157 may result in parent sub-bands that points to their left child sub-band, as for example, the parent sub-band HLL that points toward the child sub-band LH in FIG. 10. Such a tendency may be problematic as the more left is the sub-band is found, the less is the correspondence thereof with the original image. Usually, a sub-band to the left, which is of a relatively low resolution, contains more significant coefficients than a respective sub-band to the right. For example, it is expected to find significantly more coefficients in the LH sub-band than in HLL sub-band. Optionally, in order to take the sub-band to the left first, a direction constraint that defines that parent-child relationship should always be directed from left to right should be imposed. In such an embodiment, the sub-bands are optionally lexicographically ordered.

Optionally, the SAZT generation is bound to the aforementioned direction constraint and to the aforementioned size constraint. It should be noted that these constraints are inconsistent with each other if the sub-bands are not inserted in a lexicographical order so as to comply with the direction constraints. As further described below, a size inconsistency may be fixed by a designated transformation.

Figure 11:
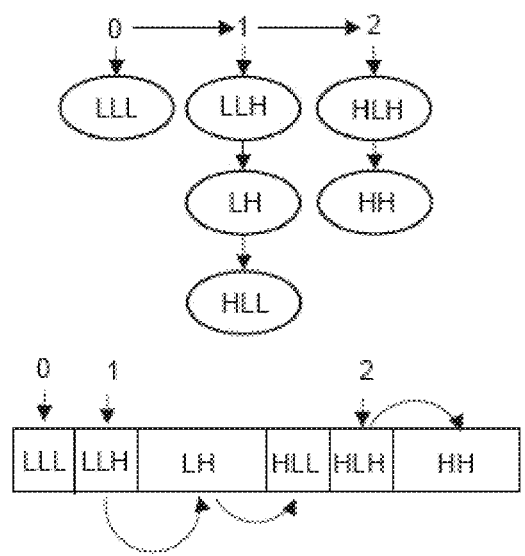
FIG. 11 is a sub-band and an associated zerotree LoL that is created after transforming a sub-band HL in one of the rows of FIG. 6, according to one embodiment of the present invention.
Figure 12:
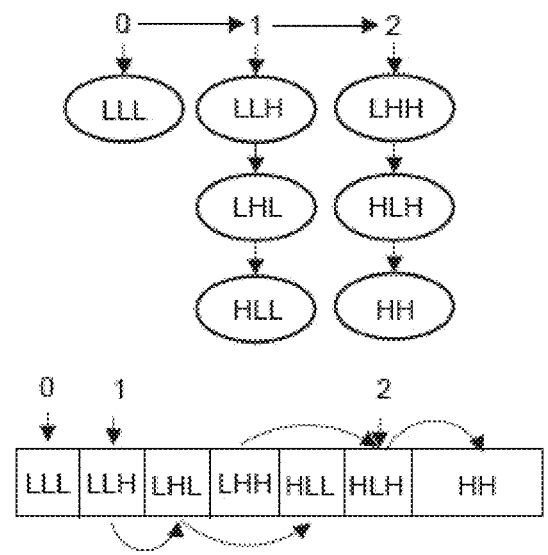
FIG. 12 depicts a process for resolving a type-A inconsistency, according to some embodiments of the present invention.
Figure 13:
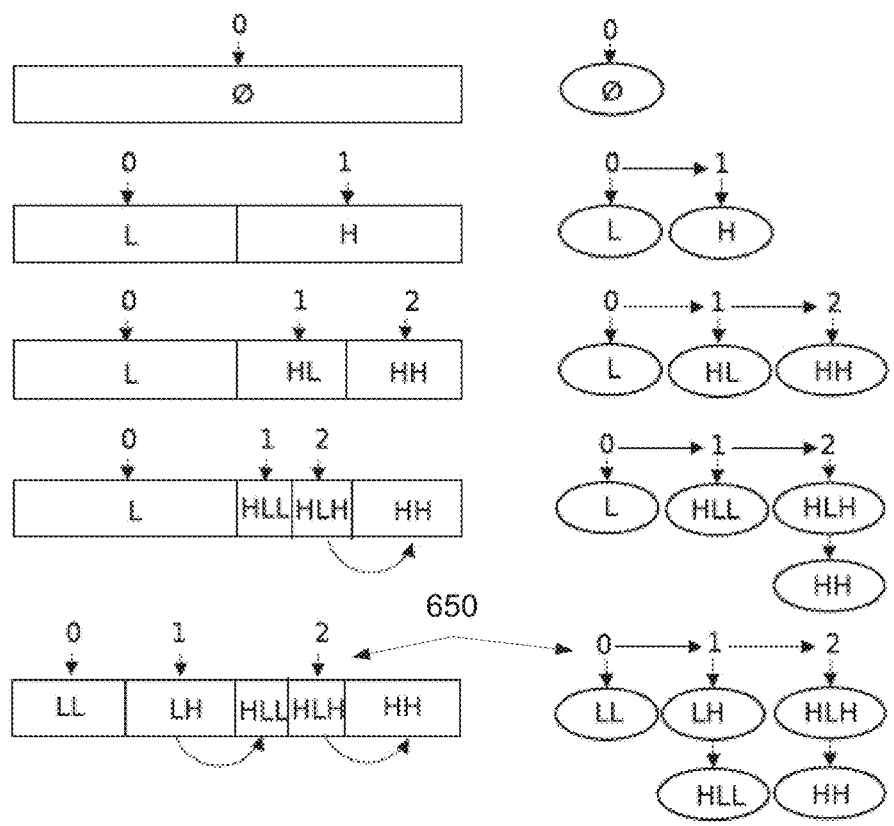
FIG. 13 depicts a set of transforms of a sub-band that creates a type-B inconsistency.
Figure 14:
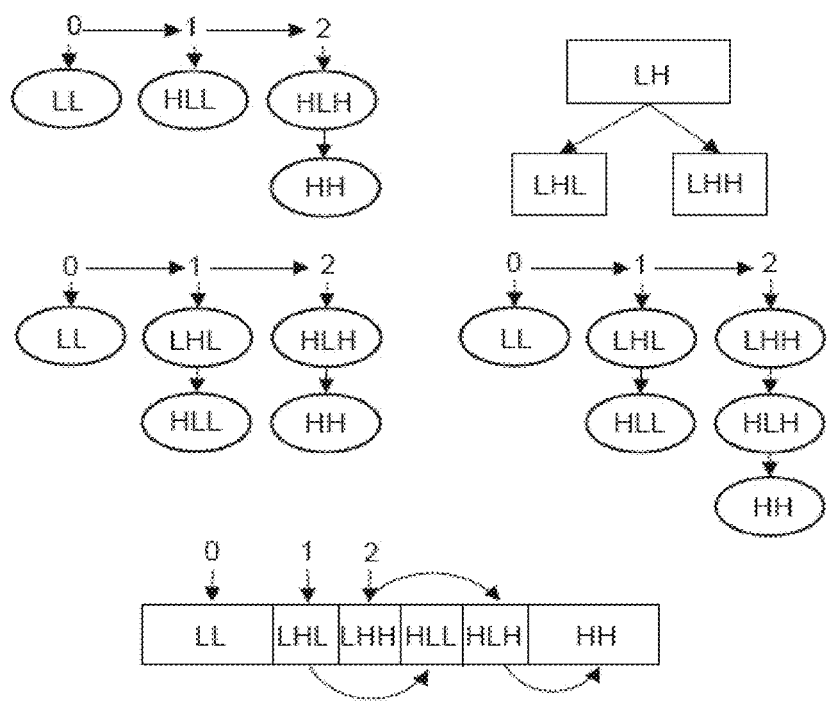
FIG. 14 depicts a process for resolving the type-B inconsistency, according to some embodiments of the present invention.

There are two types of size inconsistencies that may occur. The first inconsistency, which may be referred to herein as a type-A inconsistency, occurs when a sub-band conflicts with its parent sub-band but not with its child sub-band. An example for such an inconsistency is provided in FIG. 11, which is a zerotree LoL that is created after transforming the sub-band HL at row 604 of FIG. 6, using the aforementioned insertion, for example as depicted in 156. The size may be inconsistent but the directions of the pointers are well set. Type-A of size inconsistencies can be resolved by transforming the parent of the inconsistent sub-band, for example, the parent sub-band LH of HLL in FIG. 12 that depicts a process for resolving the type-A inconsistency, according to some embodiments of the present invention. The second inconsistency, which may be referred to herein as a type-B inconsistency, occurs when a sub-band conflicts with a child sub-band, as for example as a consequence of the transforms which are depicted in FIG. 13. In particular, in the last raw 650, sub-band L is transformed into the sub-bands LL and LH, resulting in a size inconsistency between the parent sub-band LH and child sub-band HLL. In such an embodiment, the parent LH has to be retransformed, for example as shown at FIG. 14, which depicts a process for resolving the type-B inconsistency, according to some embodiments of the present invention.

In general, although type-A inconsistency does not lead to recursion that may consume high computational power, the combination thereof with type-B inconsistency, which is recursive by nature, may result in more type-A and type-B of inconsistencies.

Optionally, the aforementioned SAZT generation is adapted to comply with aforementioned direction and size constraints. Note that no change has been made to the underlying data structure that is defined in above. For brevity, an SAZT generation that complies with aforementioned direction and size constraints is referred to herein as a directed SAZT (DSAZT) generation process. The DSAZT generation process proceeds similarly to the process depicted in FIG. 7. However, unlike the process which is depicted in FIG. 7, this process may result in more recursive splitting of sub-bands and handle both type-A and type-B inconsistencies. For simplicity, the process is assumed to be initialized with a null data structure.

The main procedure is performed as follows: First, any sub-band X is selected for transform, as shown at 153, or end the algorithm and immediately start transmission of the bit stream. Then, for example as shown at 155, the sub-band X is removed and transforms to get XL and XH, as shown at 156 and 157. Sub-band XL is inserted in a lexicographical order, optionally, as described above. If sub-band XL does not comply with the aforementioned size constraint, a repair procedure is applied, optionally as described below. Similarly, sub-band XH is inserted in a lexicographical order, optionally, as described above. If sub-band XH does not comply with the aforementioned size constraint a repair procedure is applied, optionally as described below. It should be noted that the process may be applied independently of the sequence of wavelet transform.

Furthermore, the ability to insert the sub-bands XL and XH in a lexicographical order shows that the SAZT generation is dynamic. Briefly stated, the SAZT is concurrently constructed according to a sequence of transforming. The ability to apply the repair procedure allows the performing of an adapted wavelet transform that is based on the information collected by the SAZT. As used herein an adapted wavelet transform means a directed, a recursive, and/or a non-recursive wavelet transform, such as the series of wavelet transforms which are performed during the DSAZT generation process and the non-recursive SAZT generation process which is described below. The adapted wavelet transform enable optimal rate control methods, for example as described in Mladen Victor Wickerhauser, Adapted Wavelet Analysis from Theory to Software, 1994 ISBN:1-56881-041-5, which is incorporated herein by reference.

Finally, as in the previous section, the bit stream may be immediately transmitted by the end of any such wavelet transform step.

Optionally, for type-A inconsistency, the repair process for sub-band X is applied as follows: if sub-band X has no parent sub-band or if its parent sub-band does not have a larger size, stop the repair process. Otherwise, apply the aforementioned main procedure to the parent sub-band.

Optionally, for type-B inconsistency, the repair process for sub-band X is applied as follows: if sub-band X has no child sub-band or its child sub-band not smaller in size than its size, stop the repair process. Otherwise, apply the aforementioned main procedure above to sub-band X.

In the DSAZT generation process, which is a variation of the SAZT generation process, the parent-child relationships are from left to right. Although this is a valuable feature, it may incur high computational costs because of the recursive procedure that is applied in order to assure that the SAZT is built with none of the aforementioned inconsistencies. In one embodiment of the present invention, a simplified process that complies with the order and size constraints without the computational cost of the recursive procedure is disclosed. In such an embodiment, a more restricting constraint, which is referred to herein as the nondecreasing constraint is applied. The non-decreasing constraint defines that all the sub-bands which are positioned to the left of any given sub-band are smaller or equal in pixel size. Briefly stated, the sub-bands, from left to right, with respect to size, are ordered in a nondecreasing sequence. A sufficient condition for a zerotree generation process which is directed with no type-B inconsistencies is that it complies with the aforementioned nondecreasing constraint. Such a generation may be referred to herein as the non-recursive SAZT (NSAZT) generation process.

Figure 15A:
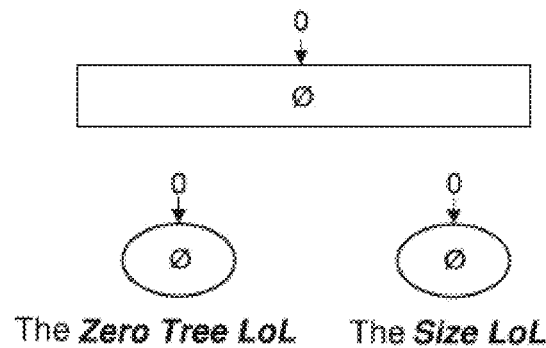
FIGS. 15A and 15B are a schematic illustration of a sub-band and a zero tree LoL and a size LoL which are built according to the transformations thereof, according to some embodiments of the present invention.
Figure 15B:
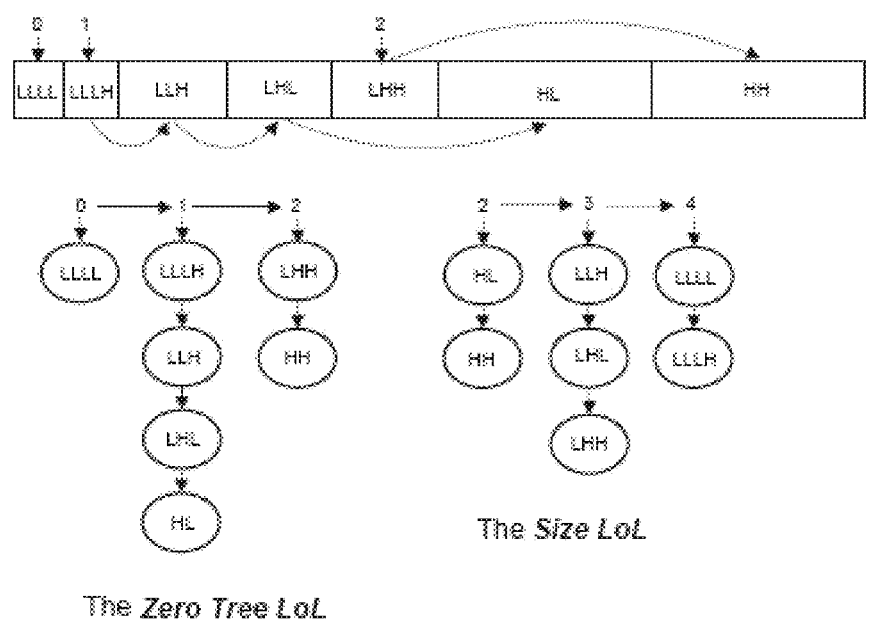

The NSAZT generation process maintains the aforementioned size, direction, and nondecreasing constraints. Complying with the nondecreasing constraint, together with the lexicographical ordering of the sub-bands, ensures that the three constraints and the main data structure is a zerotree LoL, as depicted in FIG. 6. However, implementing the above scheme in an efficient manner requires an additional data structure, which is referred to herein as the Size LoL, for example as depicted in FIG. 15A, which is a schematic illustration of a sub-band and a zero tree LoL and a size LoL during the initialization thereof, according to some embodiments of the present invention. An example for such a Size LoL is depicted in FIG. 15B, which is a schematic illustration of a sub-band and a zero tree LoL and a size LoL which are built according to the transformations thereof, according to some embodiments of the present invention. The Size LoL arranges sub-bands in clusters according to their size, for example LLH, LHL and LHH, which have a similar size, are arranged in a common cluster in a common linked list. Each such linked list is ordered lexicographically, from left to right. Note that the size of the sub-bands which are given herein in a label length, for example $N/2^l$, where N denotes the original signal size, and l denotes the respective label length. Accordingly, the linked lists are named herein by their respective label lengths.

The main procedure of the NSAZT generation process is performed after a certain sub-band X is selected for transform and proceeds as below. The NSAZT generation process, or any other SAZT generation process, may end at any point of the compression process. Optionally, the SAZT generation process is ended according to a one or more dynamic criteria, such as required latency, required output, allocated computational power and the like. If more computational power and/or computational time are allocated for the SAZT generation process, more iterations are performed. However, if limited computational power and/or limited computational time are available, less iterations are performed. Optionally, the allocation is determined in real time.

Figure 16:
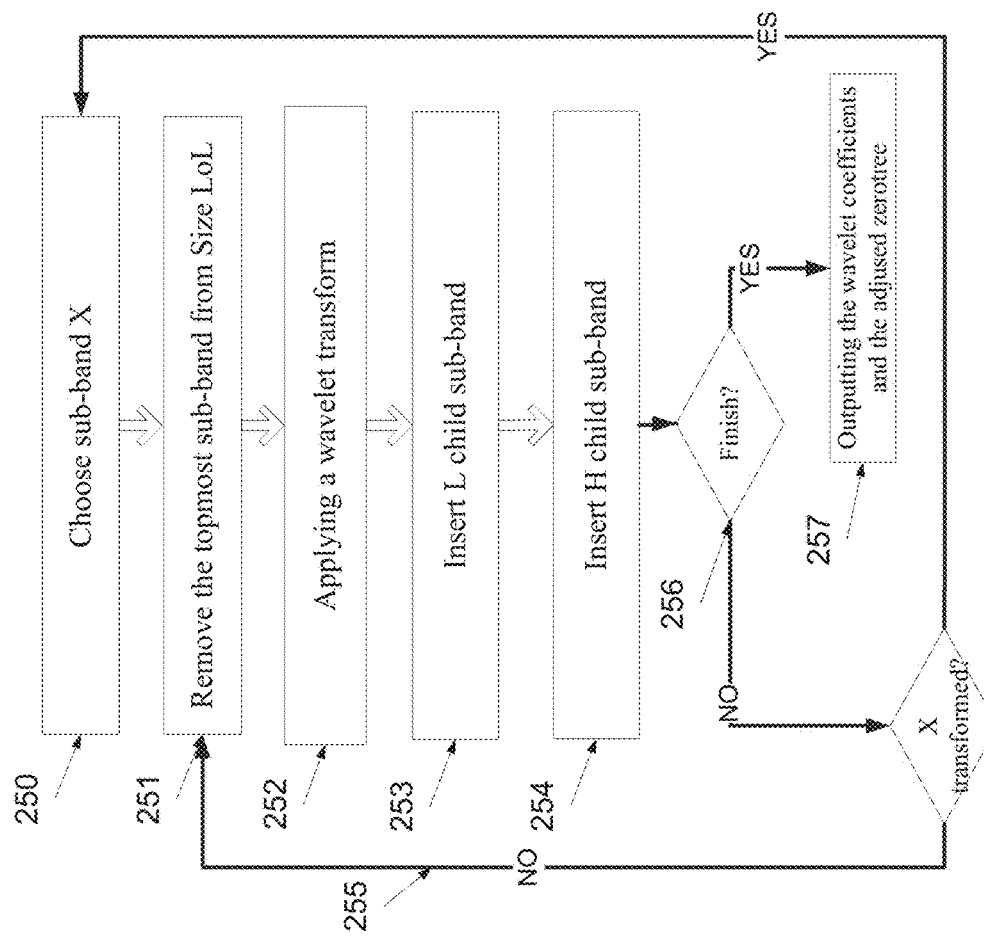
FIG. 16 is a flowchart of the main procedure of a non-recursive SAZT generation process, according to one embodiment of the present invention.

Reference is now made to FIG. 16, which is a flowchart of the main procedure of the NSAZT generation process, according to one embodiment of the present invention. The main procedure is based on the following: First, a sub-band X is selected, as shown at 250. Then, as shown at 251, remove sub-band Y, the topmost sub-band, from the Size LoL of X and the corresponding list in the Zero Tree LoL. Then, for example as shown at 252, a wavelet transform is applied to sub-band Y, yielding the sub-bands YL and YH. Now, as shown at 253, sub-band YL is inserted into the zerotree list where Y has been before. The sub-band YL is inserted in a lexicographical order. Similarly, YL is inserted to a respective size list. Similarly, as shown at 254, sub-band YH is inserted to the respective zerotree LoL and the respective size LoL. This process 255, is repeated for each one of the topmost sub-bands of size LoL of X, until any other condition for finishing the process has been fulfilled, for example as described above. The process may be repeated to any number of selected sub-bands.

This process may be applied with any sequence of wavelet transform iterations, as in the algorithms of the previous sections.

Similarly to the described above, the zerotree is self adjusted and therefore built concurrently with the iterations of the wavelet transform. In such a manner, an adapted wavelet transform may be applied on the bases of the information that is collected automatically by the self adjusted zerotree. Finally, as before, the bit stream can be transmitted immediately. It should be noted that the NSAZT generation process maintains the nondecreasing constraint.

It should be noted that when this generation process, or any SAZT generation process is encoded using an video and/or an image encoder, the encoder can terminate the encoding at any point thereby allowing a target rate or target distortion metric to be met exactly. Also, the encoded bit stream may be transmitted, for example by streaming, to a remote client that can decode the bit stream, for example as described below. A decoder which is designed to decode such a bit stream can cease decoding at any point in the bit stream and still produce exactly the same image that would have been encoded at the bit rate corresponding to the truncated stream.

Figure 17:
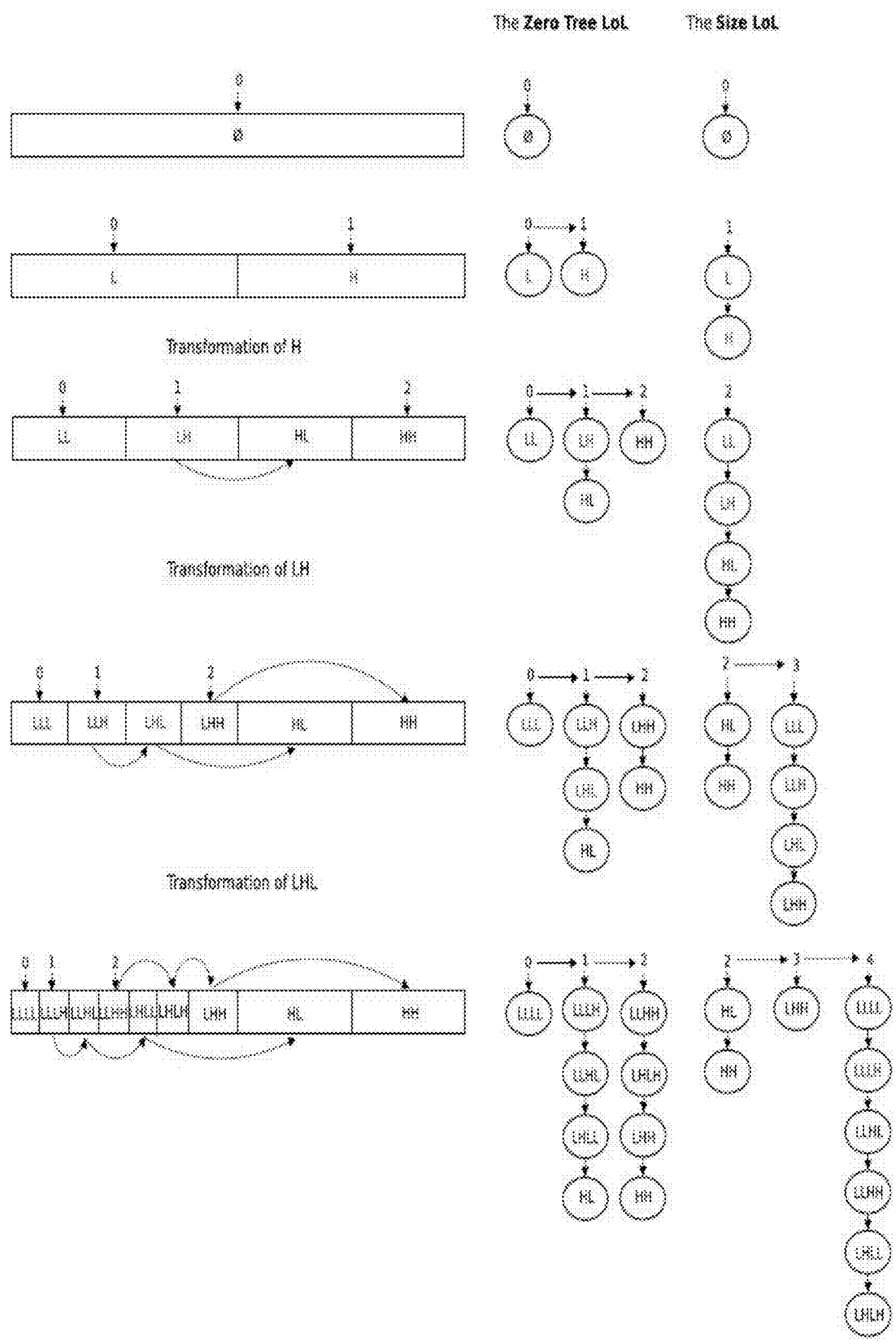
FIG. 17 is an exemplary sketch of a sequence of wavelet transform iterations, which are performed concretely with generation of a non-recursive SAZT, according to some embodiments of the present invention.
Figure 18:
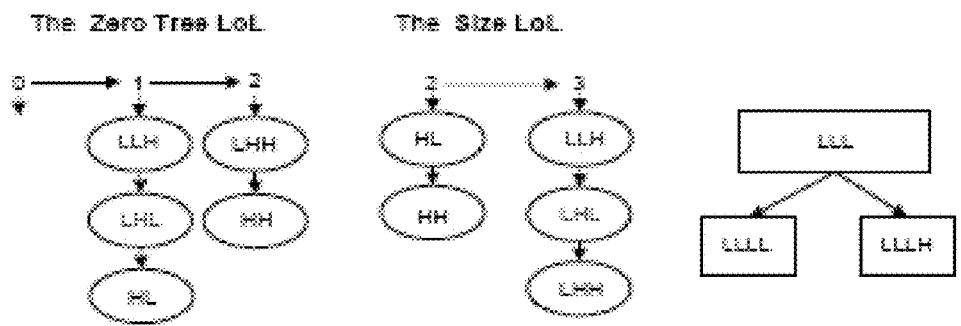
FIGS. 18-20 are exemplary sketches that depict a step by step example of transforming a sub-band in the non-recursive SAZT generation process, in accordance with some embodiments of the present invention.
Figure 18:
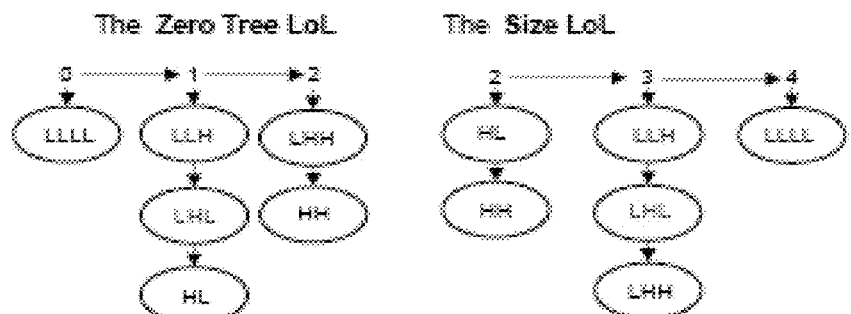
Figure 18:
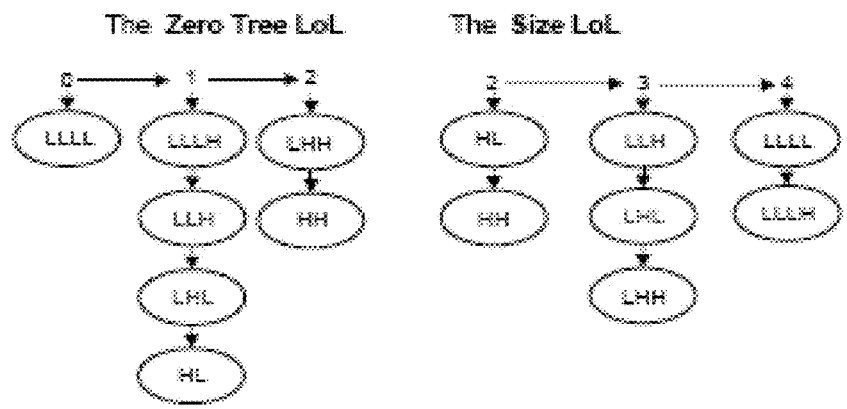
Figure 18:
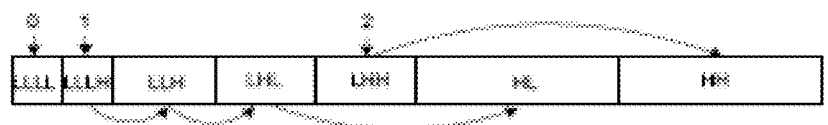
Figure 19:
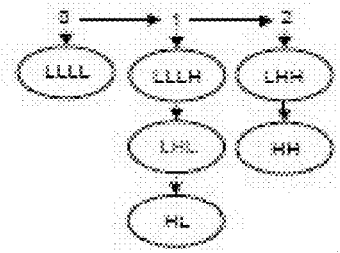
Figure 19:
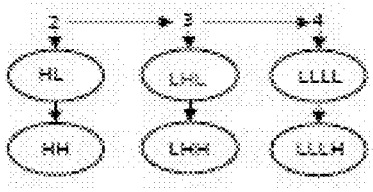
Figure 19:
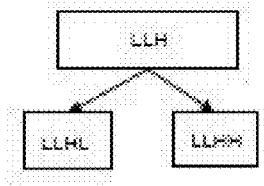
Figure 19:
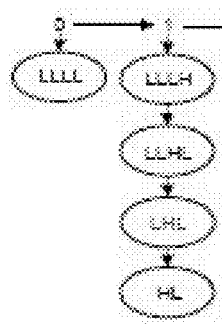
Figure 19:
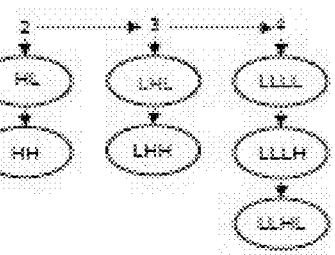
Figure 19:
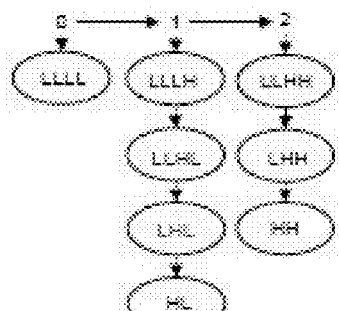
Figure 19:
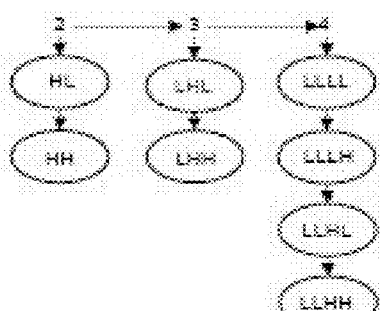
Figure 19:
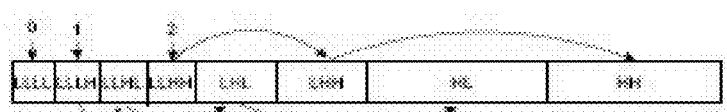
Figure 20:
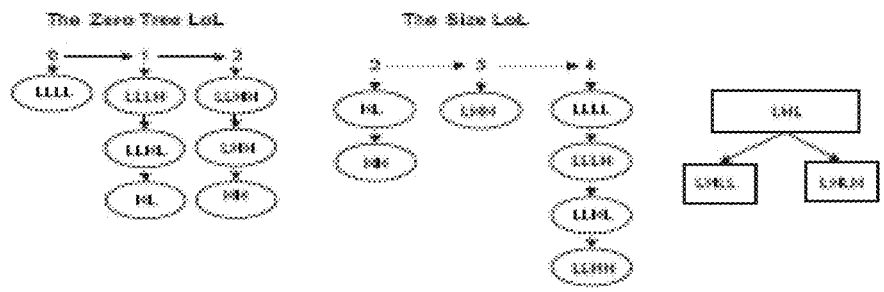
Figure 20:
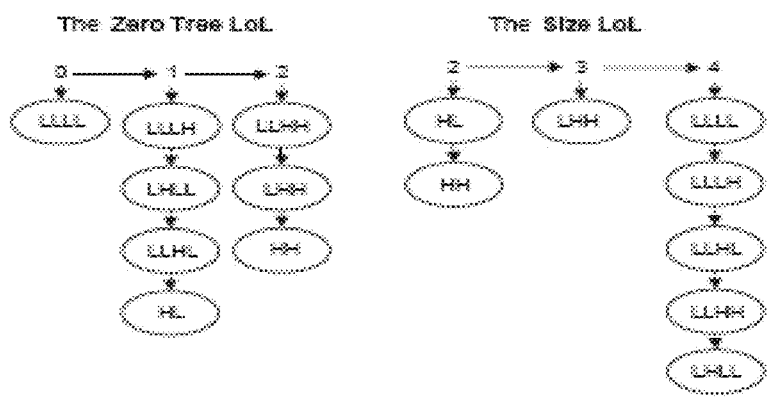
Figure 20:
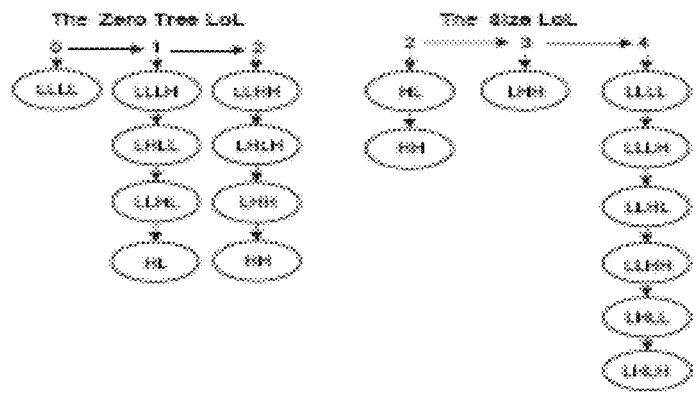
Figure 20:
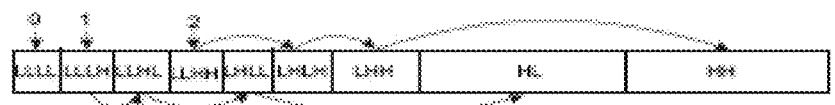

Reference is now also made to FIG. 17, which is an exemplary sketch of a sequence of wavelet transform iterations, which are performed concretely with generation of a NSAZT according to the NSAZT generation process, according to some embodiments of the present invention. FIG. 17 depicts the last transformation of the sub-band LHL. In order to transform the sub-band LHL, the sub-band LLL is transformed, optionally as depicted in FIG. 18, then the sub-band LLH, optionally as depicted in FIG. 19 and finally the sub-band LHL, optionally as depicted in FIG. 20, where each one of these figures depicts a step by step example of transforming a sub-band in a the NSAZT generation process, in accordance with some embodiments of the present invention.

Each one of the aforementioned SAZT generation processes can be used for compressing an input signal that carries digital data, such as media content. The aforementioned SAZT generation processes are not bound to a certain wavelet transform. In such a manner, any packet like wavelet transform can be used and the compression process is not limited to a predefined transform, such as a standard dyadic wavelet transform, for preparing the data in the input signal to be mapped in the aforementioned SAZT. Moreover, the SAZT may be built dynamically during according to the iterations of the wavelet transform and therefore can be automatically adjusted in order to improve the compression rates of the original data that is received in the input signal.

It should be noted that known methods for non-dyadic transform, for example as described in Gabriel Peyr et al. Discrete bandelets with geometric orthogonal filters, In Proceedings of ICIP'05, which is incorporated herein by reference, are bound to less efficient structures which are defined in advance, such as quadtrees.

As described above, the wavelet transform and the generation of the zerotree may be performed simultaneously. In such an embodiment, an output signal that includes the compressed data, which is optionally a bit stream, may be transmitted before all the data has been transformed. Furthermore, analyzing one segment of the compressed data may be analyzed to learn about a following data, for example as described above.

Furthermore, it should be noted that although the aforementioned processes are introduced in the context of one dimensional signal, multidimensional signals such as images and video signals may also be compressed. For example, the quincunx wavelet transform in image compression, result in similar sub-band decomposition, although each sub-band now corresponds with a respective two dimensional subimages. However, for separable wavelet transforms, which are applied on multidimensional data, the process is generalized using a directed acyclic graphs, optionally as described below. Such a generalization is valid for any dimension. For brevity, the following describe wavelet transforms which are applied on 2D data. Additional information for how to implement the following process on data which is provided in higher dimensions is also given herein below.

Reference is now made, one again to FIG. 1. As described above some embodiments of the present invention discloses a method for compressing digital data $$S^{(N,M)} = \begin{pmatrix} s_{0,0} & \cdots & s_{0,M-1} \\ \vdots & \vdots & \vdots \\ s_{N-1,0} & \cdots & s_{N-1,M-1} \end{pmatrix}, \begin{array}{l} 0 \le i < N, \\ 0 \le j < M, \\ s_{i,j} \in \mathcal{R}, \end{array} \quad \begin{array}{l} N = 2^k N_0, \\ M = 2^l M_0 \end{array} \quad (2.1)$$

using wavelet transform. In such an embodiment an input signal is received and transformed into multidimensional coefficients that allows the generation of a zerotree, optionally in a dynamic manner. Optionally, the input signal comprises a 2D image. In such an embodiment, as shown at 102, the transform may be a two dimensional (2D) wavelet transform. For clarity, a two dimensional image is defined as follows:

where $N_0$ and $M_0$ are odd integers, and k and l are relatively large positive integers. Hence, N denotes rows and M denotes columns of one dimensional signals. Namely:

$$S^{(N,M)} = \begin{pmatrix} R_0^{(M)} \\ \vdots \\ R_{N-1}^{(M)} \end{pmatrix} = ( C_{(N)}^0 \quad \cdots \quad C_{(N)}^{M-1} ) \cdot 15$$

which may be denoted as follows:

$$R_i^{(M)} = (r_{i,0}, r_{i,1}, \ldots, r_{i,M-1}), \quad r_{i,j} \in \mathcal{R}, \quad 0 \le j < M,$$

or $$C_{(N)}^j = \begin{pmatrix} c_{0,j} \\ c_{1,j} \\ \vdots \\ c_{N-1,j} \end{pmatrix}, \quad c_{i,j} \in \mathcal{R}, \quad 0 \le i < N.$$

A standard 2D wavelet transform is a separable transform that is based on the application of the one dimensional wavelet transform to the rows and columns of the image, the background section and International Pat. App. Pub. No. WO2007/083312 published on July 2007, which is incorporated herein by reference.

Figure 21:
FIGS. 21-24 are respectively an original image, a wavelet transform to the rows of the original image, a wavelet transform to the column of the original image, and wavelet transforms to the rows and to the columns of the original image.
Figure 22:
Figure 23:
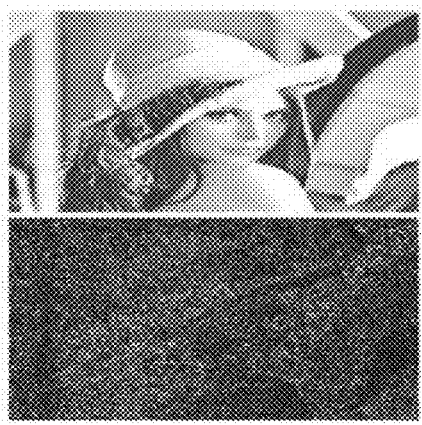
Figure 24:

For example, the application of a wavelet transform to the rows of the image, which is shown at FIG. 21, results in a low resolution sub-image on the left and vertical details on the right, for example as shown at FIG. 22. Similarly, the application of the transform to the columns of the image, results in a low resolution subimage on the top with horizontal details on the bottom, for example as shown at FIG. 23. Finally, an application of both of these transforms results in a low resolution subimage on the top left, vertical details on the top right, horizontal details on the bottom left, and diagonal details on the bottom right, as shown at FIG. 24. It should be noted that this is an outcome of a single dyadic transform, however the present invention is not limited to a single dyadic transform and can use any transform in a number of iterations. As used herein a dyadic wavelet transform means a repeated application of these transforms to the lower resolution subimage; see for example FIG. 25, which is a schematic illustration of a dyadic wavelet transform. As used herein a full packet transform means a repeated application of these transforms to all the sub-bands of each level. In general, a packet like transform may occur where the aforementioned transforms can be arbitrarily applied to any sub-band, see for example FIG. 26, which is a packet like transform, according to some embodiments of the present invention. It should be noted that such a predefined transform, is used for example in J. Bradley et al. The FBI wavelet/scalar quantization standard for gray-scale fingerprint image compression. Technical Report LA-UR-93-1659, Los Alamos Nat'l Lab, Los Alamos, N. Mex., 1993, which is incorporated herein by reference.

Figure 26:
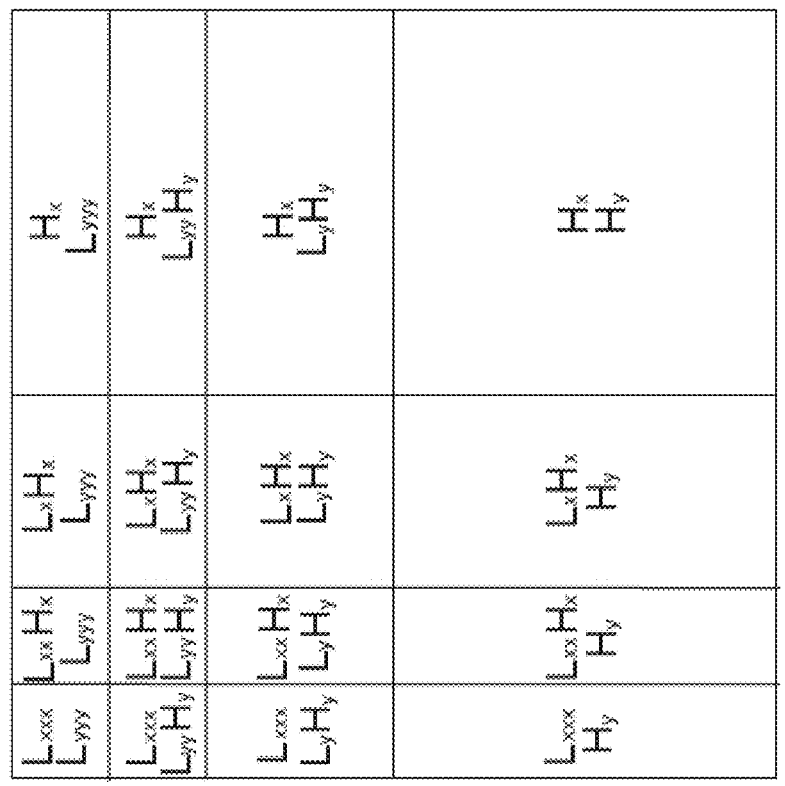
FIG. 26 is a packet like transform, according to some embodiments of the present invention.
Figure 25:
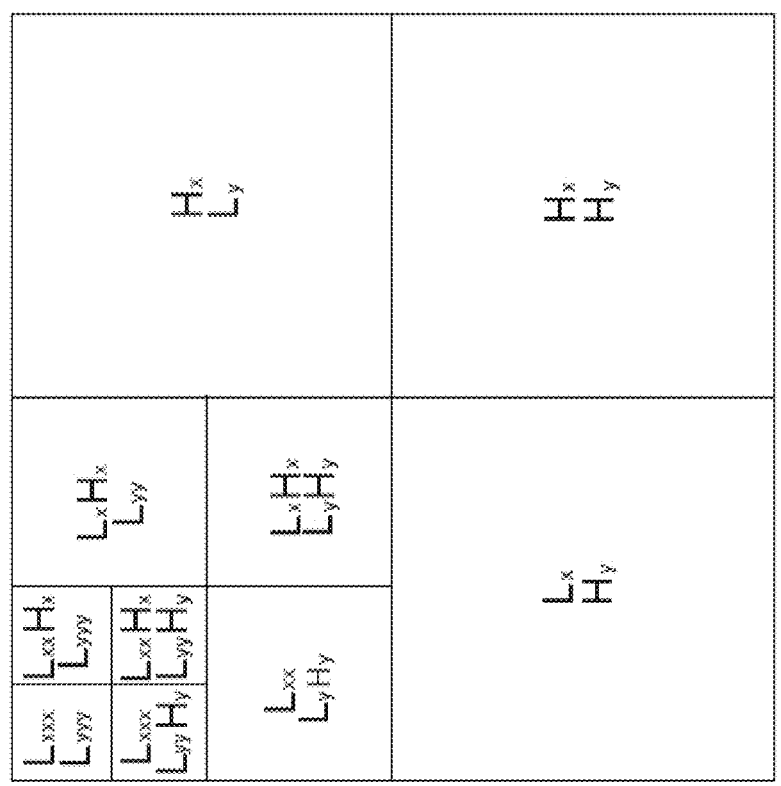
FIG. 25 is a dyadic wavelet transform.

For clarity, a naming convention procedure is used for distinguishing between sub-bands of such general packet transforms. Ø denotes the input signal, which includes an original image. Optionally, the input signal includes an image and/or a video sequence such as a streaming video that includes media content. As used herein media content means any dynamic or static multimedia content, such as a video sequence, video stream, an audio file, a video file, a segment of text. Whenever a row transform is applied to a sub-band, an affix of the labels Lx and Hx is attached to its respective offspring sub-bands. Similarly, sub-band $L_y$ and sub-band $H_y$ are respectively affixed to the labels of the column transform. As an example to this naming convention, the resulting sub-bands, their names for a 3-level dyadic transform, and a packet transform is depicted in FIGS. 25 and 26. It should be noted that as a separable transform may be used in each one of the iterations, there may be no significance as to the relative order of the row and column transforms. For example, $L_x L_y$ is the same as $L_y L_x$ and vice versa. Hence, as depicted in FIGS. 25 and 26, a separate naming can be used for naming the x and y transforms. A shortcut notation, such as $L_{xxx}$, denotes $L_x L_x L_x$ etc.

As described above and commonly known in the field, EZW can be used for coding a 2D dyadic wavelet transform. However, this 2D dyadic wavelet transform is mapped according to a fixed pattern. Some embodiments of the present invention use dynamic zerotree data structures for mapping groups of wavelet coefficients. The dynamic zerotree data structures are not bound to a known wavelet transform and are built up in conjunction with any sequence of wavelet transform iterations. Optionally, this dynamic zerotree has a data structure which is adjusted to the last wavelet transform iteration of the compression process.

Figure 27:
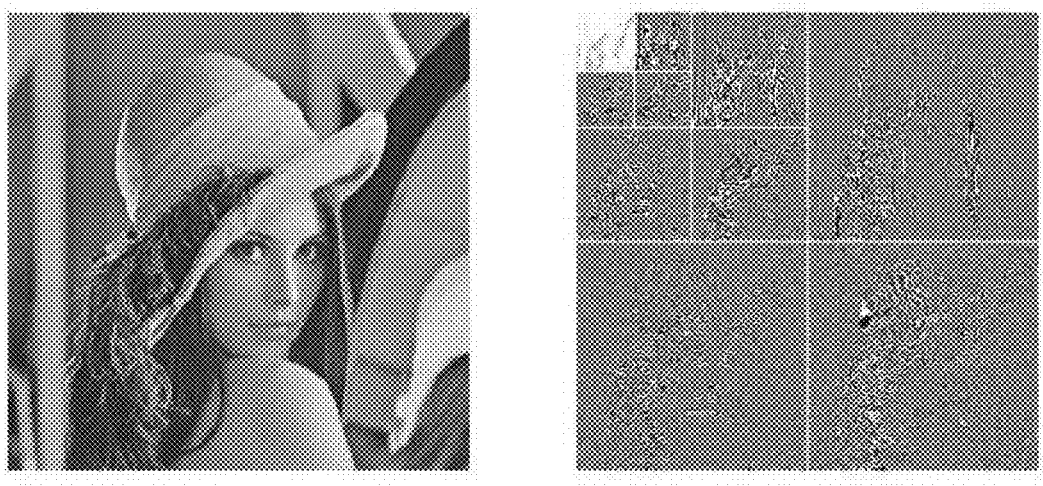
FIG. 27 is an exemplary Lena image and an outcome of a 3-levels dyadic transform thereof.

As described hereinbelow, a generic process that can be applied on any wavelet transform is applied in conjunction with the wavelet transform iterations that transform a multidimensional segment of data, such as an image, a video, a 3D image, a 4D image, and the like. The following description is provided with examples which are based on a 2D data segment, such as an image. FIG. 25 and FIG. 27 that depict a 3-levels dyadic transform that results in a low resolution subimage at the top left corner, with additional vertical, horizontal, and diagonal details, at the top right, bottom left and bottom right, on each level. FIG. 27 exemplifies how most of the transformed coefficients are of relatively insignificant values, for example close to zero and that sub-bands of the same orientation, that is horizontal, vertical or diagonal, on different levels, are of similar form. It should be noted that FIG. 27, which depicts an exemplary Lena image and an outcome of a 3-levels dyadic transform thereof, is not special and the same conclusions are also true for other natural images which are typified by large smooth areas bordered by edges and texture.

Reference is now made to FIG. 28, which is a schematic illustration of a dyadic wavelet tree, according to some embodiments of the present invention. As depicted in FIG. 28, sub-bands $L_{xx}H_xL_{yy}H_y$, $L_xH_xL_yH_y$, and $H_xH_y$ have similar phase-space information. That is, sub-band $H_xH_y$ stores the diagonal details of the original image, sub-band $L_xH_x$-$L_yH_y$ that of the low resolution subimage $L_xL_y$, and the like. As these sub-bands represent similar features, which are mostly insignificant, the image may be compressed by joining them together into a tree structure, for example as in depicted FIG. 28. Here, the pixels $L_{xx}H_xL_{yy}H_y$, which are in relative locations 0≤k, l<N/8 are joined into 4 child sub-bands in $L_xH_xL_yH_y$ respectively in (2k+i, 2l+j), i, j=0, 1, and then to more 16 grandchild sub-band in $H_xH_y$, in respective locations (4k+i, 4l+j), i, j=0, 1, 2, 3. The same hold for the other tree structures, except that of the pixels of $L_{xxx}$, $L_{yyy}$ which remain isolated as this sub-band has no phase-space relations with other sub-bands. Such an example demonstrates that tree structures are essentially composed of global and local relations. On the global layer, sub-bands of similar phase-space information are connected to one another by parent-child relations. Then, on the local layer, which may be referred to herein for describing the layer of local relations, respective pixels are connected. It should be noted that the local relations are determined on the basis of parent-child sub-band relations and may be referred to herein as the global layer. In one embodiment of the present invention, only the creation of the sub-band relations, which may be referred to herein as the zerotree lists, as depicted for example in FIG. 29, which is a schematic illustration of dyadic zerotree lists.

Figure 30:
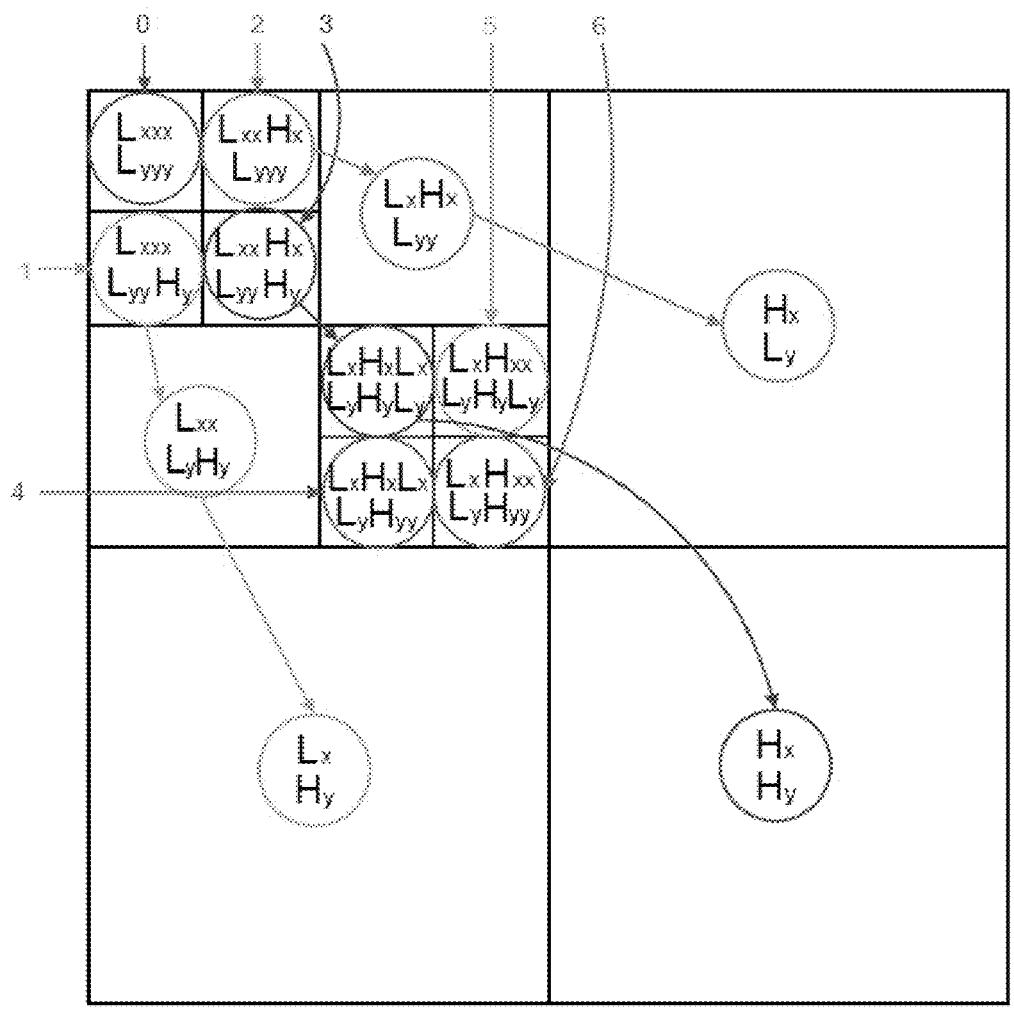
FIG. 30 is a packet transform with seven components, according to some embodiments of the present invention.
Figure 31:
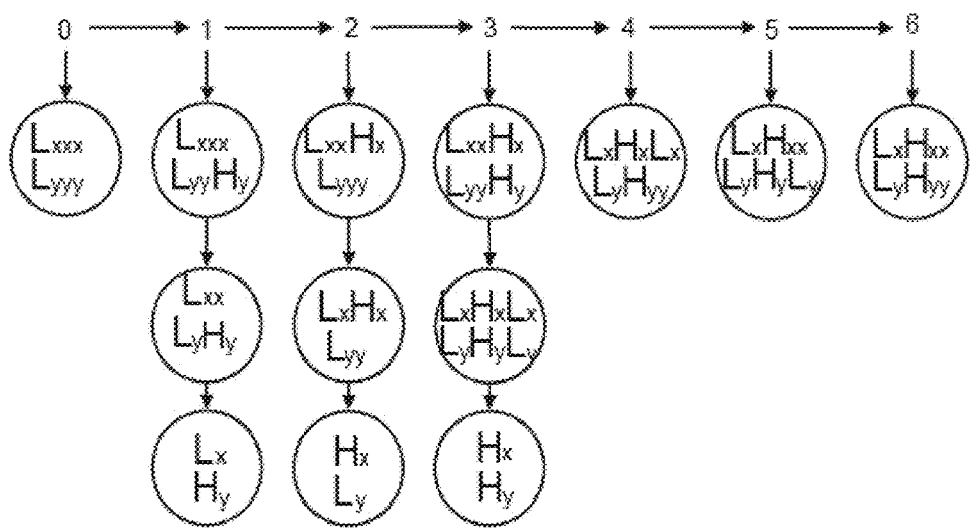
FIG. 31 is zerotree lists which are built according to the packet transform of FIG. 30, according to some embodiments of the present invention.

The zerotree lists consists of a list of components, each with the same phase-space sub-bands, that is sub-bands with the same number of $H_x$s and $H_y$s. For example, FIG. 29 depicts four components, the $0^{th}$ component points toward a low resolution subimage without H's and the $1^{st}$ component points toward sub-bands of horizontal information with only one $H_y$. In general, FIG. 30 is a schematic illustration that depicts a packet transform with 7 components and FIG. 31 is a schematic illustration of corresponding zerotree lists which are built accordingly. It should be noted that in such a representation, only pointers to the sub-bands location in a 2D array representation are taken into account. The correspondence is defined as follows:

Sub-band Origin: $A_o=(x_o^A, y_o^A)$,

End Point: $A_e=(x_e^A, y_e^A)$ where X denotes a sequence of a row transform for sub-band A and Y denotes a sequence of a column transform for sub-band A. $x_o=0$, a 0/1 bit is added for each L/H that appears in X. The last bit of $x_o$ is incremented to get $x_e$. Similarly the last bit of $y_o$ is incremented to get $y_e$.

For example, as shown at FIG. 31, the origin and end points of sub-band A=($L_{xxx}$, $L_{yyy}$) are $A_o=(0.000, 0.000)$ and $A_e=(0.001, 0.001)$ in binary notations, or $A_o=(0, 0)$, and $A_e=(⅛, ⅛)$ in decimal notations. Similarly, sub-band B=($L_x$-$H_{xx}$, $L_yH_{yy}$) has an origin point $B_o=(⅜, ⅜)$, and end point $B_e=(½, ½)$, in decimal notations. It should be noted that in FIG. 30, the topmost left corner of the original image is mapped to the point (0, 0) in the two dimensional Euclidean plane, and the scale of its width and height is 1. Then, the origin point of each sub-band corresponds to its topmost left corner, and the end point to its rightmost bottom corner. A multiplication of these points is performed by the corresponding row/column sizes that equals to the exact sub-band pixel position. Such a calculation is similar to the case of one-dimension input signals, optionally as described above. However, in order to compress a 2D input signal, for example as shown at FIG. 26, the size of all the subbands which are connected in a certain zerotree has to be correlated. For example, in FIG. 26, sub-bands $A=(L_xH_x, L_{yy}H_y)$ and $B=(L_{xx}H_x, L_yH_y)$, which are located in the same component, are of incompatible size, and therefore can not be connected together.

Figure 32:
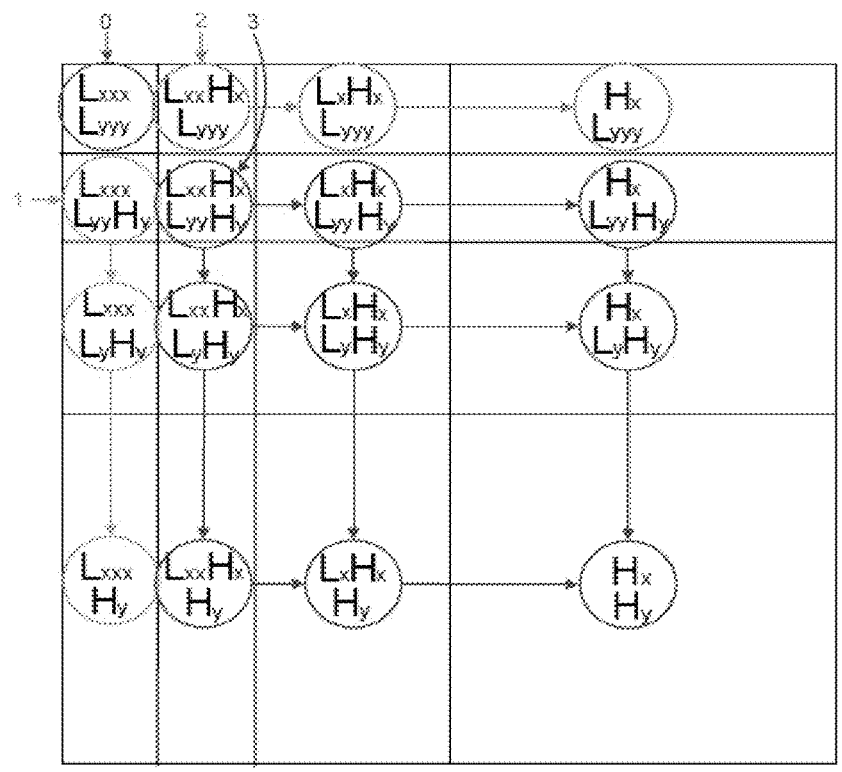
FIG. 32 is a schematic illustration of a transformation which is mapped according to a packet zerotree directed acyclic graph (DAG), according to some embodiments of the present invention.
Figure 33:
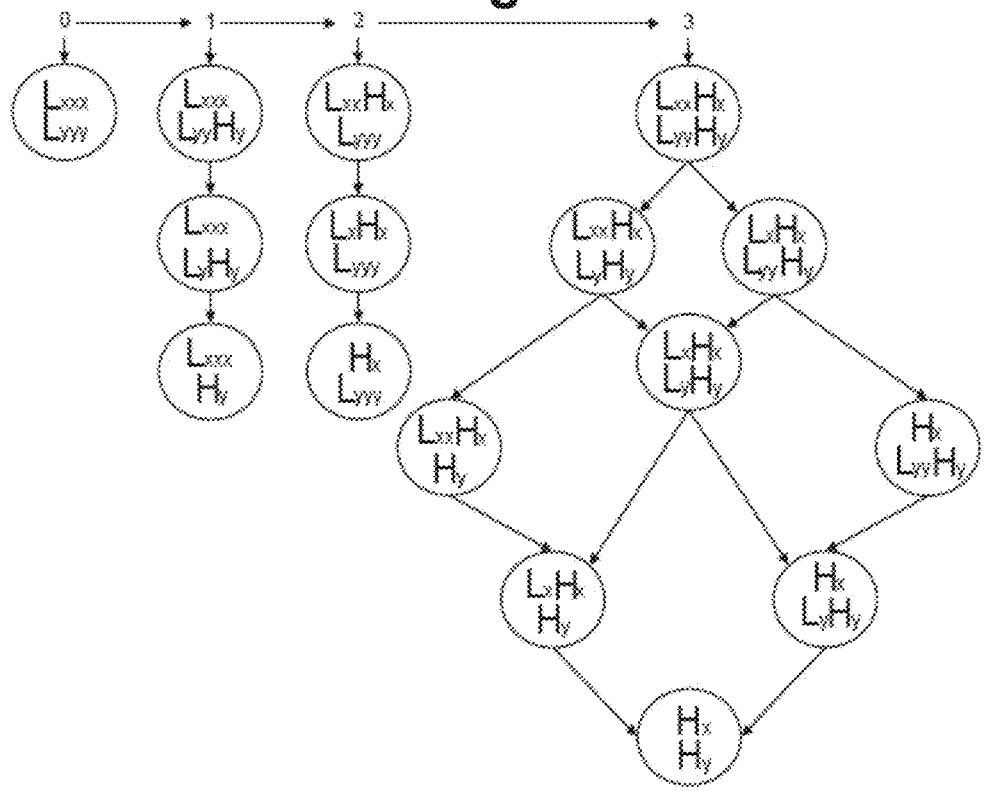
FIG. 33 is a schematic of the packet zerotree DAG of FIG. 32, according to some embodiments of the present invention.

In one embodiment of the present invention a directed acyclic graph (DAG) is used for mapping the global relations between groups of wavelet coefficients in the various sub-bands which are formed during the wavelet transform. As commonly known, a DAG is a directed graph containing no cycles. This means that if there is a route from one group of wavelet coefficients to another group of wavelet coefficient then there is no way back. In such an embodiment, a component could be described as a DAG, as can be seen from FIG. 32, which is a schematic illustration of a packet zerotree that maps the transformation of the depicted sub-bands and from the corresponding data structure, which is shown at FIG. 33. This data structure is referred to herein as a zerotree DAG. The advantages in using a DAG is that it depicts any of the possible relations among parent and child sub-bands and allows the constructing of a viable zero tree data structures. The actual tree can be constructed on the basis of input relations, such as weighted edges.

Figure 34:
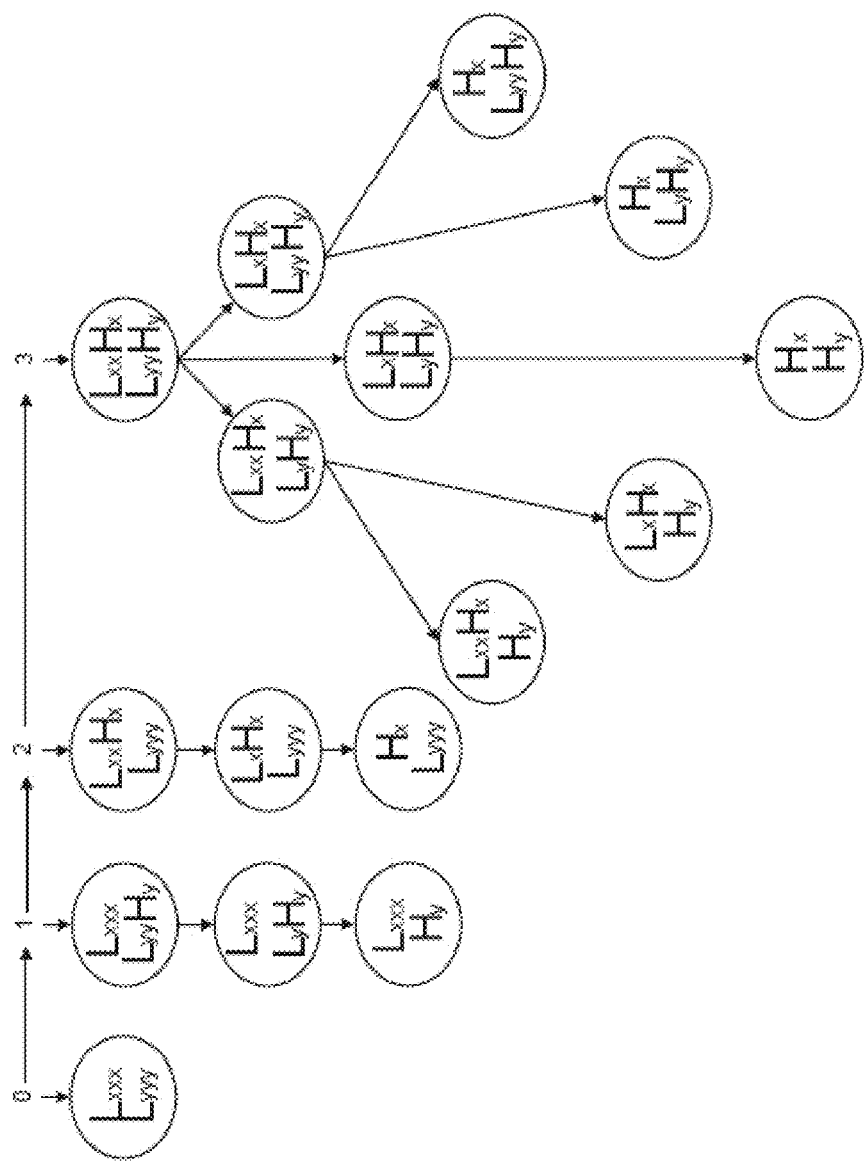
FIG. 34 is a schematic illustration of the DAG of FIG. 33 after it has been converted to a tree form, according to some embodiments of the present invention.

It should be noted that prior to the construction of the local relations, the DAG is transformed into a tree structure, as for example as shown at FIG. 34, which is a schematic illustration of the DAG of FIG. 33 after it has been converted to a tree form, according to some embodiments of the present invention. Such a transform is necessary so as to ensure that the sub-band parent-child relations are unique. It should be noted that as a DAG can be considered to be a generalization of trees in which certain subtrees can be shared by different parts of the tree, the DAG can always be transformed to a tree with unique relations.

In such an embodiment, the sub-bands are partitioned into components with same phase-space information that is arranged into DAG structures.

The dimensions of a sub-band A are defined as follows:

$$A_n = [n_y^A, n_x^A]$$

where the corresponding size is of $n_y$ pixel height and $n_x$ pixel wide.

The dimension ordering is assured as a sub-band A is smaller in dimensions than a sub-band B whenever $A_n \leq B_n$, that is whenever $n_y^A \leq n_y^B$ and $n_x^A \leq n_x^B$ It should be noted that the above is only a partial order as some sub-bands may have incompatible dimensions, for example as described above. In such an embodiment, a DAG constraint is imposed. The DAG constraint is a constraint that defines that in a valid zerotree DAG, a sub-band has dimensions which are not more than any of its child sub-bands. Such a constraint is required for completing the related pixel connections. However, this constraint, does not distinguish between sub-bands of the same components and the same dimensions, as for example sub-bands $A=(L_{xx}H_x, L_{yy}H_y)$ and $B=(L_xH_xL_x, L_yH_yL_y)$ in FIG. 30.

As used herein a lexicographical order means an order that is defined in a manner that a sub-band A is lexicographically smaller than a sub-band B whenever $x_o^A + y_o^A < x_o^B + y_o^B$, or in case of equality, for example whenever $y_o^A < y_o^B$. A primitive DAG ordering is defined herein as an order in each DAG component of the same detailed information hosts sub-bands which are ordered by dimension and in case of equality also in a lexicographical order. In order to maintain the primitive DAG ordering, all the global relations between all possible comparable sub-bands are kept. The relations are kept automatically if the DAG is transformed to a minimal form in which it has a minimal number of groups of wavelet coefficients as vertices.

Figure 35A:
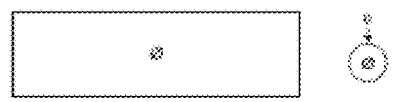
FIGS. 35A-35H are schematic illustration of using a zerotree DAG for constructing a SAZT, according to some embodiments of the present invention.
Figure 35B:
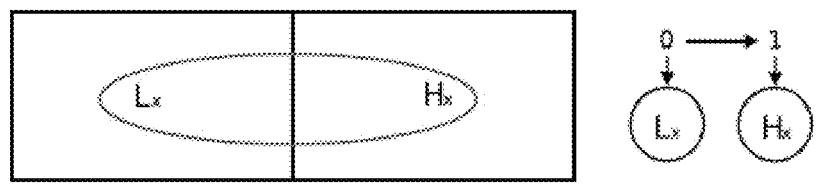
Figure 35C:
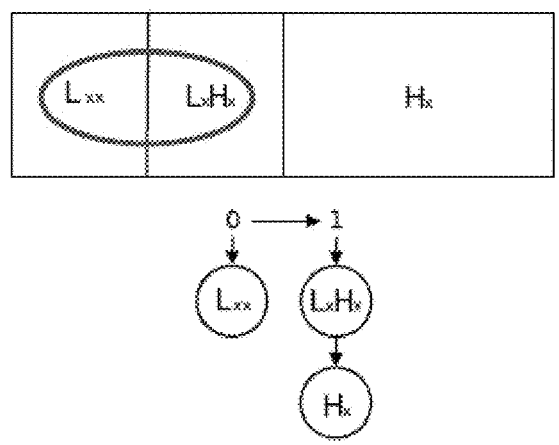
Figure 35D:
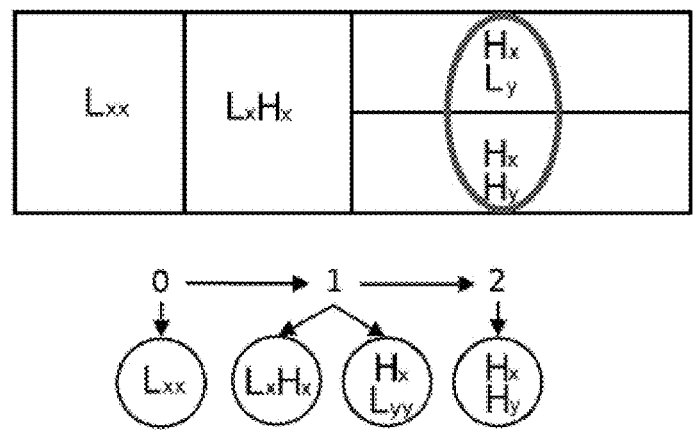
Figure 35E:
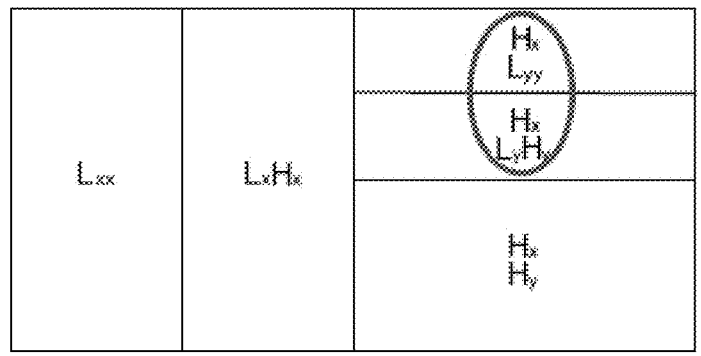
Figure 35E:
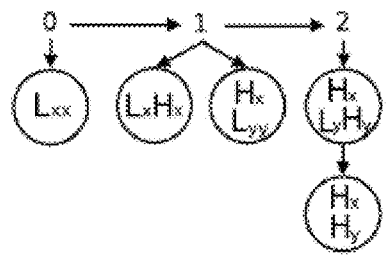
Figure 35F:
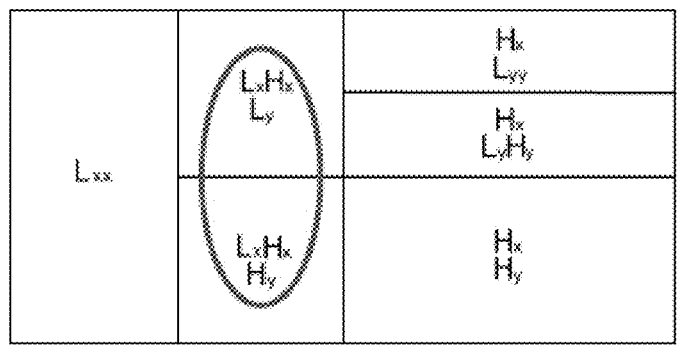
Figure 35F:
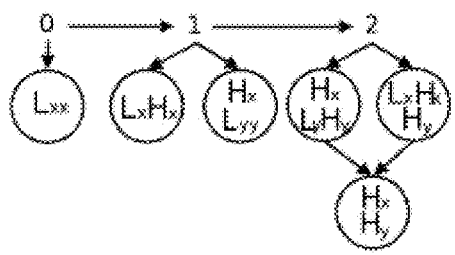
Figure 35G:
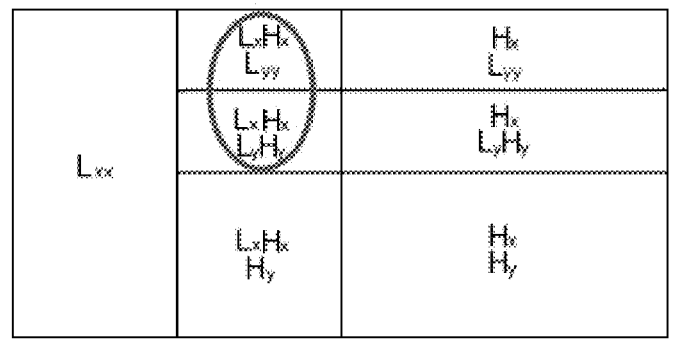
Figure 35G:
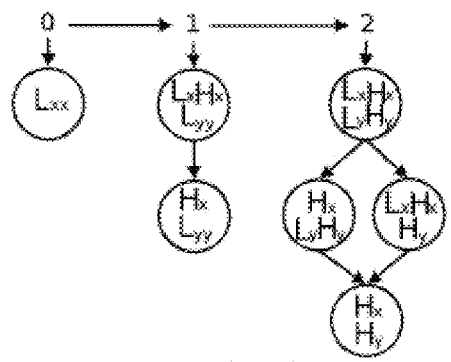
Figure 35H:
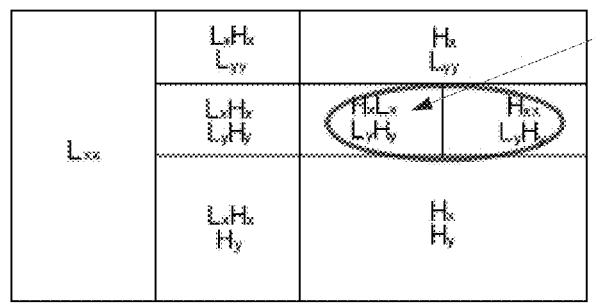
Figure 35H:
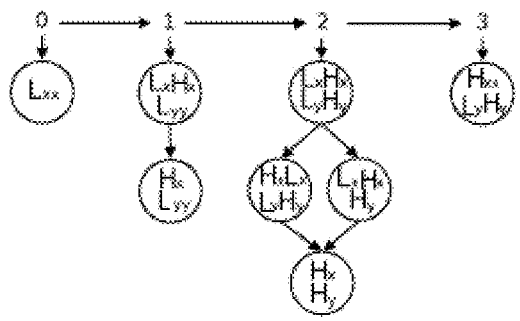

The aforementioned zerotree DAG can be used for constructing SAZTs. Reference is now made to FIGS. 35A-35H, which are schematic illustration of using a zerotree DAG for constructing a SAZT, according to some embodiments of the present invention. First, as shown at FIG. 35A, an input signal that includes an original image is received and associated with a zerotree DAG that consists of a single DAG. Then, for example as shown at FIGS. 35B-35H, a sequence of transforms is made. Initially, as shown at FIG. 35B, the original image is row transformed. Then, for example as shown at FIG. 35C, the sub-band $L_x$ is also row transformed. During the following transform, as shown at FIG. 35D, sub-band $H_x$ is column transformed. Then, for example as shown at FIG. 35E, the sub-band $H_xL_y$ is column transformed. During the following transform, as shown at FIG. 35F, the sub-band $L_xH_x$ is column transformed. Then, for example as shown at FIG. 35G, the sub-band $L_xH_xL_y$ is also column transformed. In the end, as shown at FIG. 35H, sub-band $H_xL_yH_y$ is row transformed.

Figure 36A:
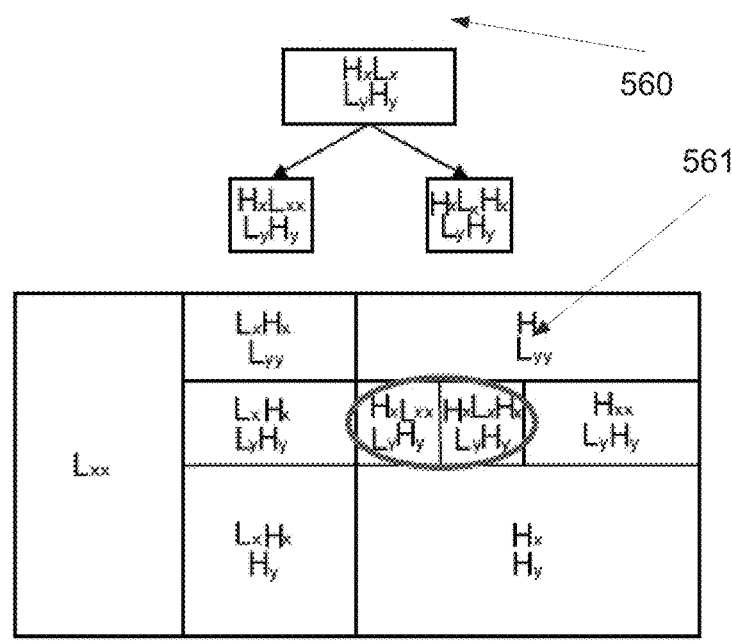
FIGS. 36A-36C are schematic illustrations of row and column transformations which are used for depicting the process of transforming a sub-band A using a zerotree DAG together with a concrete example of transforming a specific sub-band $H_xL_xL_yH_y$, in accordance with some embodiments of the present invention.
Figure 36A:
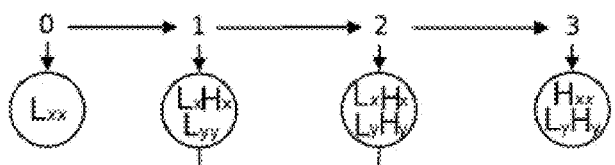
Figure 36B:
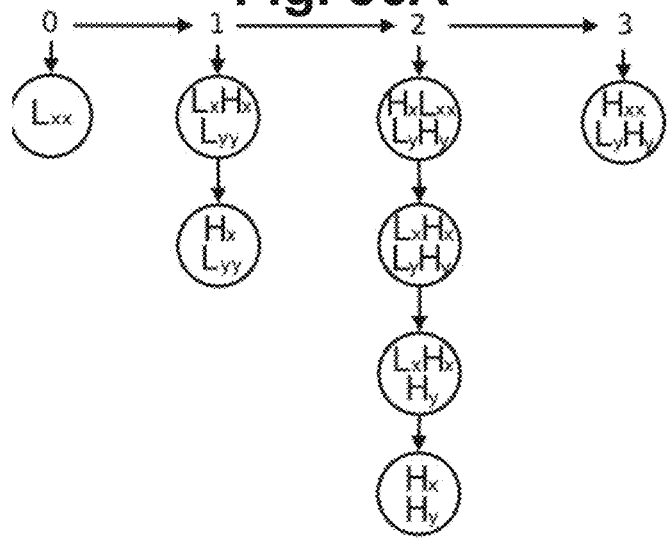
Figures 36C, 36D:
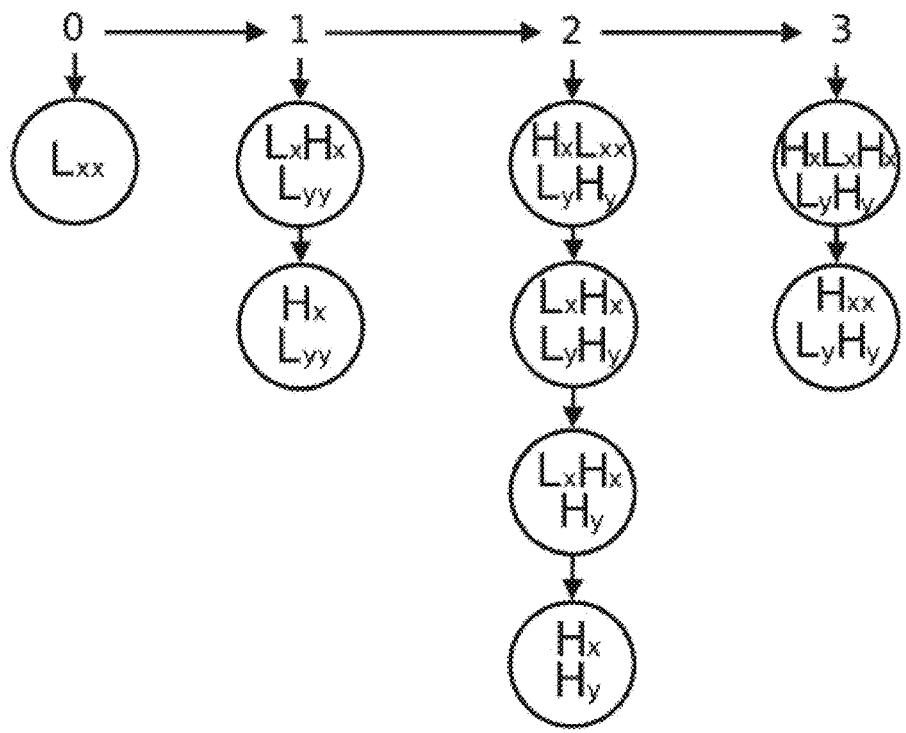
FIG. 36D is a schematic illustration of a parent sub-band that maps backwards, toward a child sub-band.

Reference is now made to FIGS. 36A-36C, which are schematic illustrations of row and column transforms which are used for depicting the process of transforming a sub-band A using a zerotree DAG, in accordance with some embodiments of the present invention, together with a concrete example of transforming sub-band $H_xL_xL_yH_y$. First, a sub-band, for example sub-band $H_xL_xL_yH_y$ 560, which is depicted in FIG. 35H, is removed and transformed to get child sub-bands L and H, for example as shown at FIG. 36A. The child sub-bands L and H are positioned in the place of the parent sub-band 561. Then, for example as shown at FIG. 36B, the child sub-band L is added to the zerotree ZAG. Similarly, as shown at FIG. 36C, the child sub-band H is added to the zerotree ZAG. As depicted in FIGS. 36A-36C, the zerotree ZAG is updated during the transformation. It should be noted that such mapping allows parent sub-bands to point backwards toward their child sub-bands, for example as shown at FIG. 36D.

Such a backwards pointing may me desirable from several reasons. The smaller is the origin of the sub-bands, it holds fewer details and therefore it makes less sense to point thereto in a bottom-up direction. Furthermore, the sub-bands of earlier sub-bands usually contain more significant coefficients than the sub-bands of sub-bands which have been transformed later-on. For example, in FIG. 36D more significant coefficients are expected in $L_xH_xL_yH_y$ than in $H_xL_{xx}H_yL_{yy}$. Although sub-bands may have comparable dimensions, they are not necessarily logically related, as for example, $L_xH_xL_xL_{yy}H_y$ and $L_{xx}H_xL_yH_yL_y$ in FIG. 37, which is an exemplary representation of a data segment after a number of transform iterations.

In order to avoid such a backward mapping, the sub-bands are ordered in an origin ordering which is defined a manner that a sub-band A is smaller than a sub-band B whenever $x_o^A \leq x_o^B$ and $y_o^A \leq y_o^B$ where $A_o=(x_o^A, y_o^A)$ denotes the origin of a sub-band A, and $B_o=(x_o^B, y_o^B)$ denotes the origin of a sub-band B. It should be noted that such an ordering is partial. The DAG relations are defined according to a DAG ordering in which the sub-bands of each DAG component of the same detailed information are locally arranged according to the aforementioned origin ordering.

Figures 37, 38:
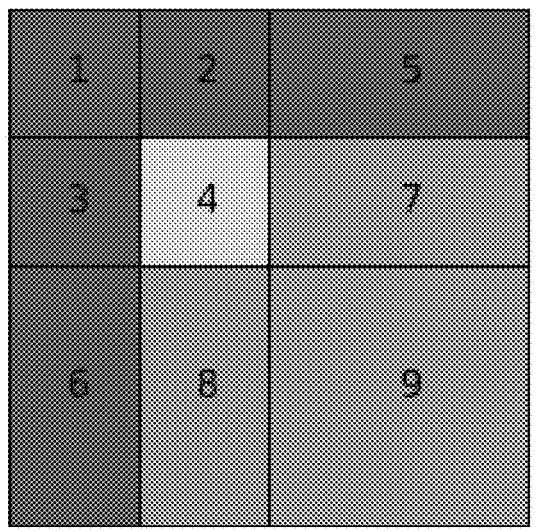
FIG. 37 is an exemplary representation of a data segment after a number of transform iterations.
FIG. 38 is an exemplary representation of a data segment after a number of transform iterations that depicts, using numerals, the DAG ordering relation of different sub-bands, according to some embodiment of the present invention.
Figure 39:
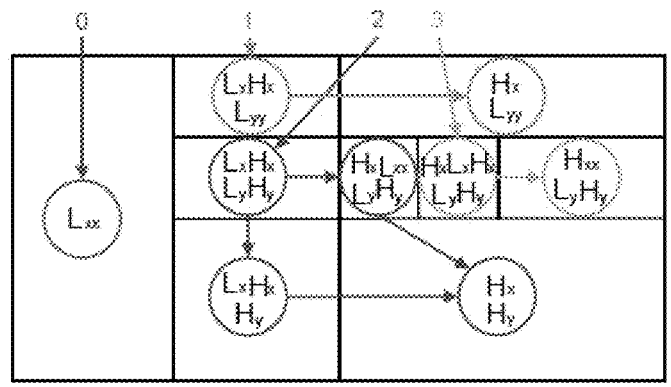
FIG. 39 is a schematic illustration of a zerotree DAG after the transforming of sub-band $H_xL_xL_yH_y$ of FIG. 35H, according to some embodiment of the present invention.
Figure 39:
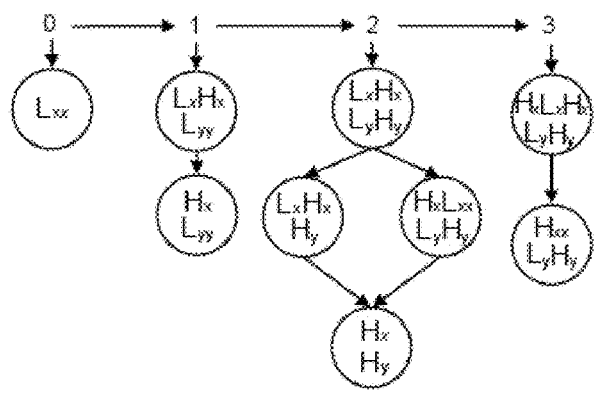
Figure 40:
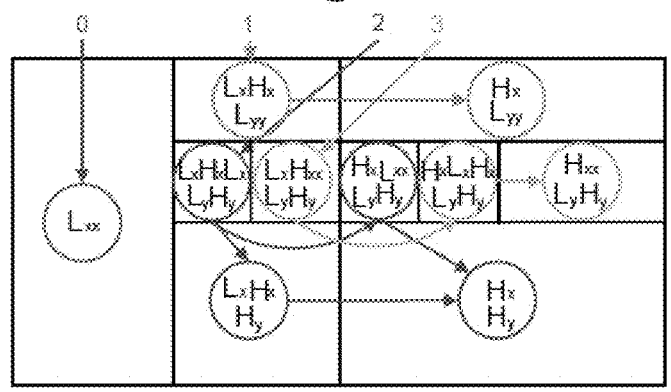
FIG. 40 is a schematic illustration of the zerotree DAG of FIG. 39 after its type-A inconsistencies have been resolved by transforming the parents of the inconsistent sub-bands, according to some embodiment of the present invention.
Figure 40:
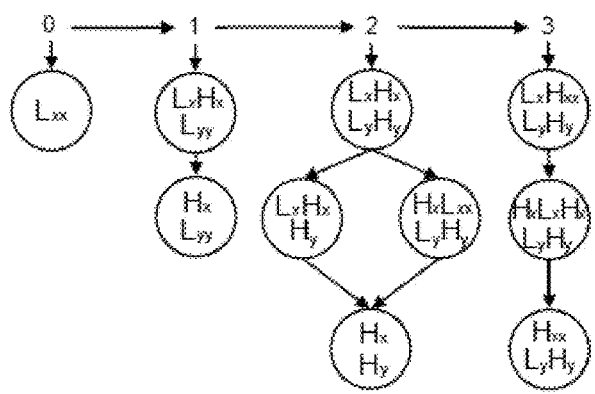

Reference is now also made to FIG. 38, which is a schematic illustration of an exemplary representation of a data segment after a number of transform iterations using numerals, the DAG ordering relation, according to some embodiment of the present invention. As depicted, sub-bands 1, 2, 3 are ordered before sub-band 4, which in turn is ordered before sub-bands 7, 8, 9. Sub-bands 4, 5, 6 are unrelated. However, the DAG ordering may be inconsistent with the previous dimension constraint, for example as shown at FIG. 36D. Hence, an additional transform is needed for avoiding dimension inconsistencies. The dimension inconsistencies can be divided to two types. Type-A is defined as inconsistencies that occurs when the dimensions of a sub-band conflicts the dimensions of its parent sub-bands but not with the dimensions of its child sub-bands. For example, FIG. 39 depicts a zerotree DAG after transforming $H_xL_xL_yH_y$ of FIG. 35H, according to the DAG ordering. Though the zerotree DAGs in both FIG. 39 and FIG. 36D have a dimension inconsistency, In FIG. 39 the directions of the pointers are well set. Type-A inconsistencies can be resolved by transforming the parent of the inconsistent sub-band, for example, $L_xH_xL_yH_y$ in FIG. 40. Type-B inconsistency occurs when the dimensions of a sub-band conflicts with the dimensions of its child sub-bands.

Figure 41A:
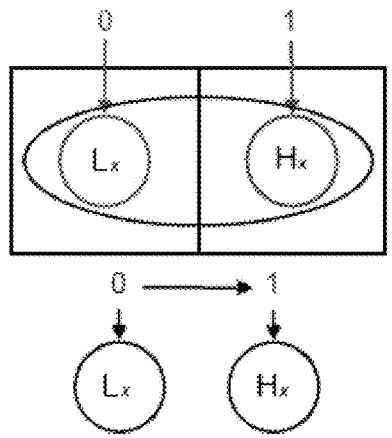
FIGS. 41A-41D are schematic illustrations a type-B inconsistency that occurs during the transformation of a certain sub-band.
Figure 41B:
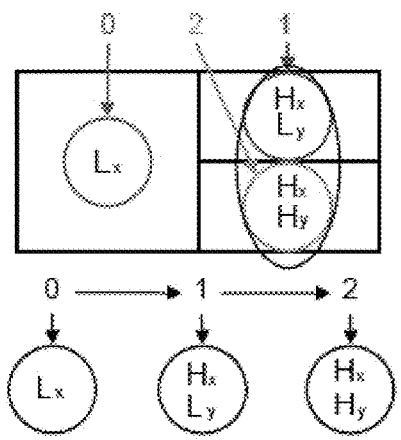
Figure 41C:
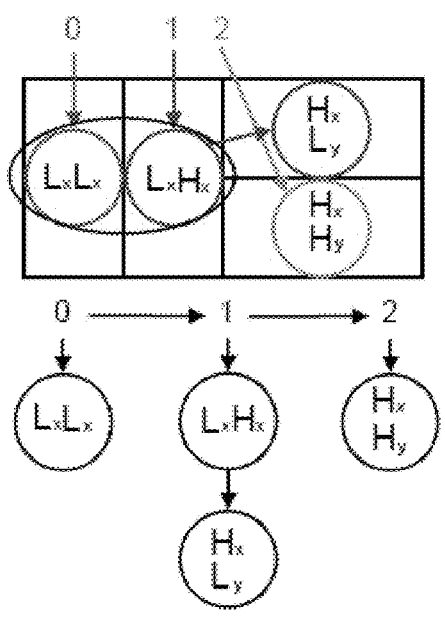
Figure 41D:
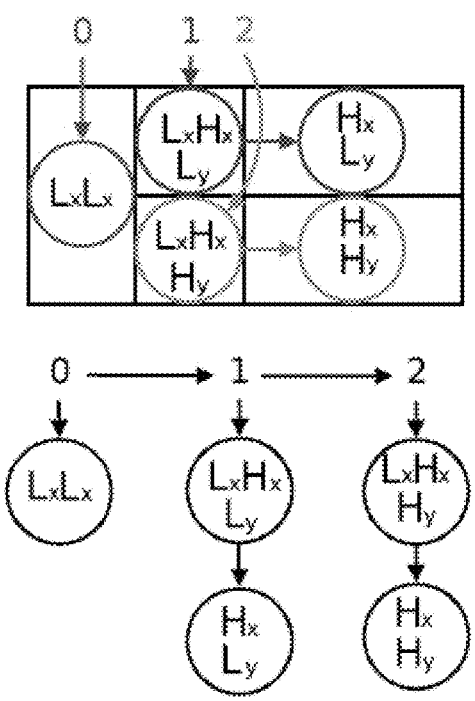

Reference is now made to FIGS. 41A-41D, which are schematic illustrations a type-B inconsistency that occurs during the transformation of a certain sub-band. FIG. 41A depicts a row transformation that is applied on an input signal that represents a 2D image. Then, as shown at FIG. 41B, the sub-band $L_x$ is row transformed. Now, as shown at FIG. 41C, the sub-band $H_x$ is column transformed. As shown at FIG. 41C, $L_x$ is transformed into the sub-bands $L_xL_x$ and $L_xH_x$, resulting in a dimension inconsistency between parent $L_xH_x$ and child $H_xL_y$. The type-B inconsistency may be repaired, optionally as shown in FIG. 41D. In general, although type-A inconsistency does not lead to a recursion, the combination thereof with type-B inconsistency may result in type-A and type-B inconsistencies.

Figure 42:
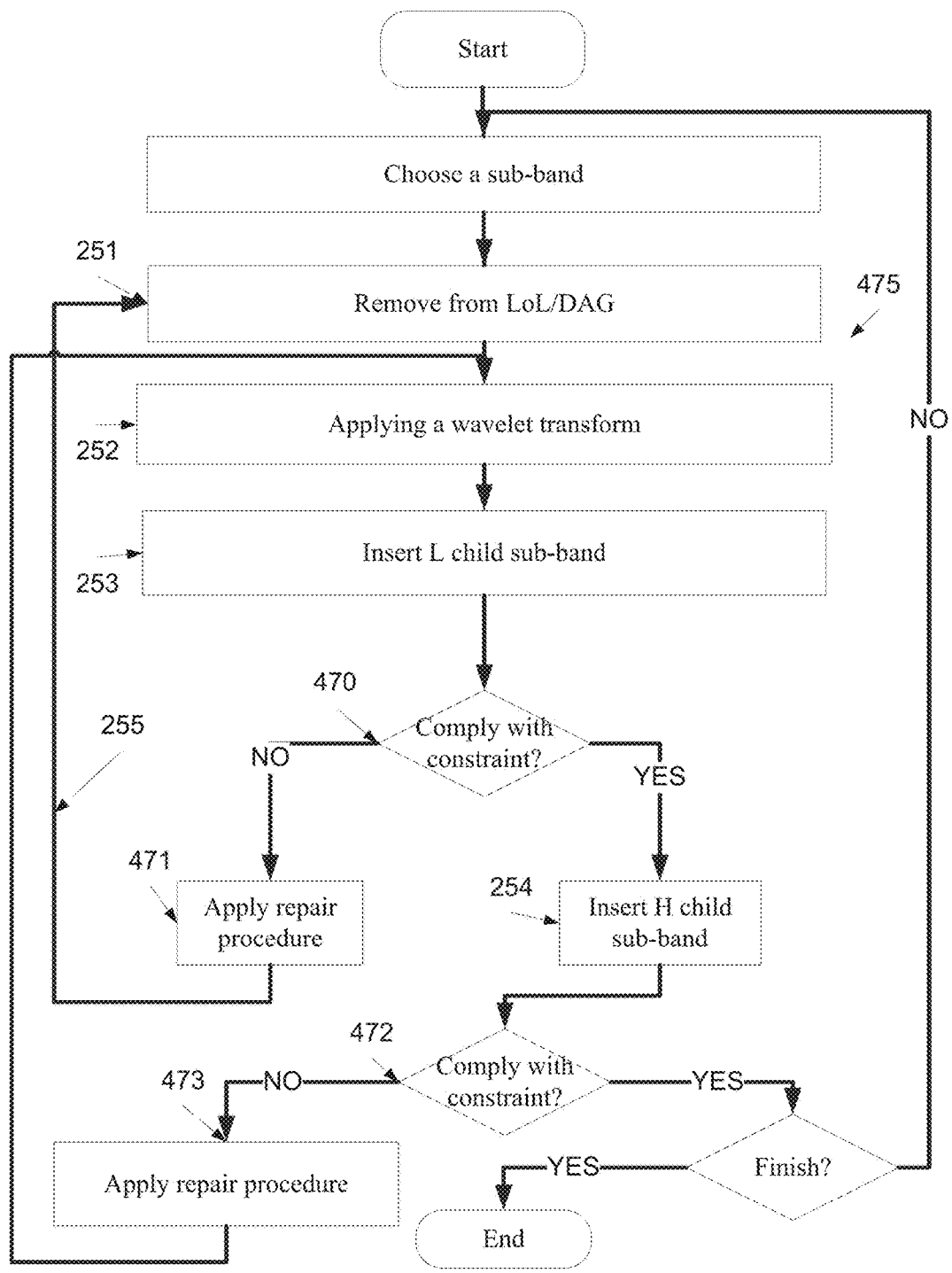
FIG. 42 is a flowchart of the main procedure of the directed SAZT (DSAZT) generation process, according to some embodiments of the present invention.

Reference is now made to FIG. 42, which is a flowchart of the main procedure of the DSAZT generation process, according to some embodiments of the present invention. 251-255 are as depicted in FIG. 16, however FIG. 42 further depict additional phases avoiding type-A and type-B inconsistencies. The depicted DSAZT generation process imposes the above ordering relations which are referred to herein as the DSAZT generation process. The DSAZT generation process is similar to the aforementioned DSAZT generation process. Optionally, a sub-band is removed from the zerotree DAG and replaced with two respective child sub-bands. However, unlike the previous process wherein the procedure did not involve additional transformations, the DSAZT generation process that is described hereinbelow may result in more transformations. For brevity, the process is initialized with a null data structure. First, as shown at 251, sub-band Y, the sub-band is removed and, as shown at 252, a wavelet transform is applied thereto, yielding the sub-bands L and H. Now, as shown at 253, sub-band L is inserted into the zerotree list where its parent sub-band has been before. Now, as shown at 470, if sub-band L complies with the aforementioned dimension constraint, the process proceeds. However, if sub-band L does not comply with the aforementioned dimension constraint, a repair procedure is applied 471 before the process proceeds. Similarly, as shown at 472, if sub-band H complies with the aforementioned dimension constraint, the process proceeds. However, if sub-band H does not comply with the aforementioned dimension constraint, a repair procedure is applied 473 before the process proceeds. This process is repeated 255 for each one of the newly added sub-bands.

Optionally, the repair procedure is defined for type-A and type-B inconsistencies. For handling a type-B inconsistency, in case a certain sub-band has no child sub-bands or all its child sub-bands have dimensions which are larger than or similar to its dimensions, proceed to the following step. Otherwise, apply the main procedure 475 to the sub-band in order to reduce its size. This process, which is a recursive process, ensures that sub-band is divided to child sub-bands which are also divided as long as have child sub-bands with dimensions which are smaller than the dimensions of the child sub-bands of the repaired sub-band.

For handling a type-A inconsistency, if the sub-band has no parent sub-bands or if all of its parent sub-bands have dimensions which are smaller than or equal to its dimensions, stop the repair procedure. Otherwise, apply the main procedure 475 to each one of the parents of the sub-band that does not have dimensions which are smaller than or equal to the dimensions of the sub-band.

Reference is now made to a non-recursive process of building up SAZT for a 2D image, which may be referred to herein as the non-recursive SAZT (NSAZT), according to some embodiments of the present invention.

Figure 43:
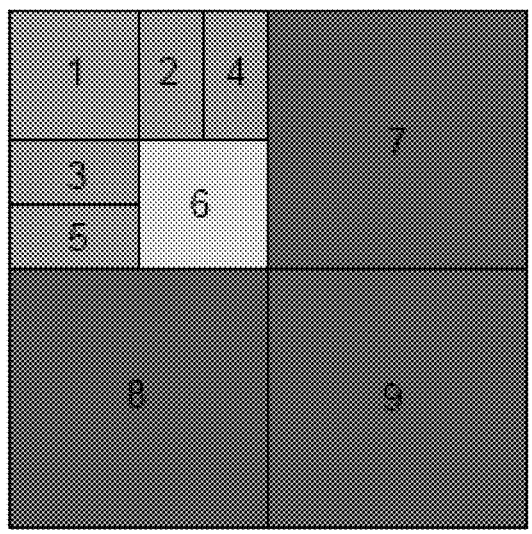
FIG. 43 is an exemplary representation of a data segment after a number of transform iterations that depicts, using numerals, a sub-band that comprises all the sub-bands that have an origin that is smaller than the sub-band end point, according to some embodiment of the present invention.

The non-recursive process is designed for assuring that sub-bands are ordered according to the aforementioned origin ordering without any recursive functions. For brevity a ruling class denotes a sub-band that comprises all the sub-bands that have an origin that is smaller than the sub-band end point. For example, in FIG. 43, the ruling class for sub-band 6 includes sub-bands 1, 2, 3, 4, 5. Note that sub-bands 4, 5 are in this ruling class although their origin is not smaller than that of sub-band 6.

A sufficient condition for the DSAZT generation process, which is described above, is to have no type-B inconsistencies and therefore no recursion. In such a manner, all the ruling class sub-bands have dimensions which are smaller than or equal to the dimensions of the sub-band.

Figure 44:
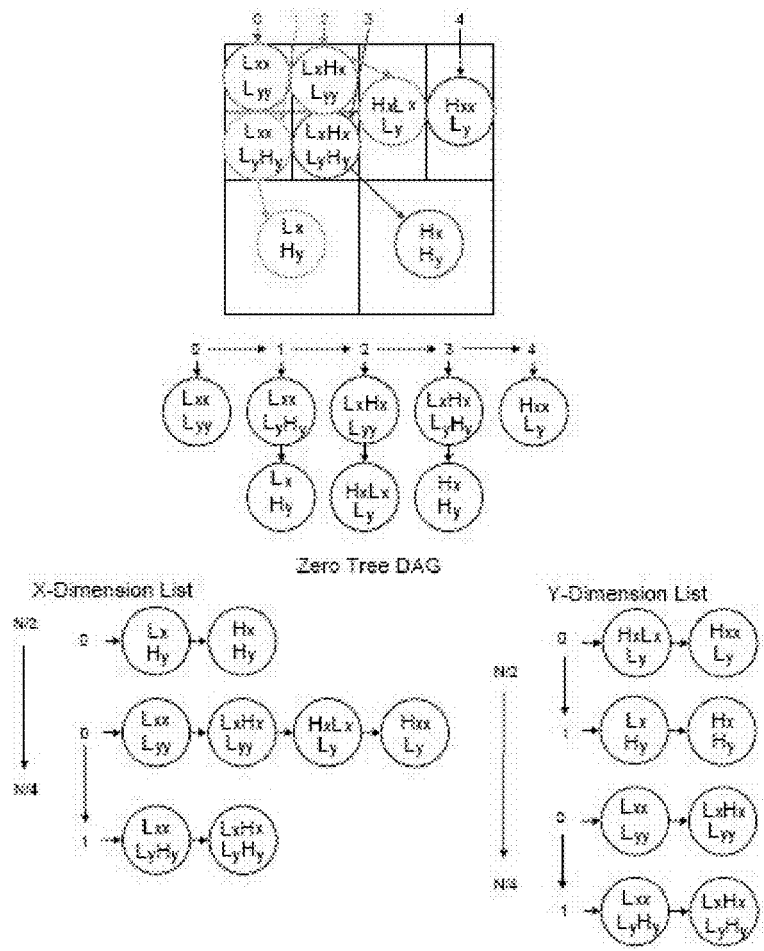
FIG. 44 is a schematic illustration of dimension lists and the 2D image they map, according to some embodiment of the present invention.
Figure 45:
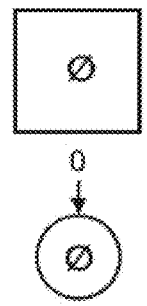
FIG. 45 is an image that is optionally received in an input signal, for example as depicted in FIG. 1, an initialized X-dimension list and an initialized Y-dimension list, according to some embodiment of the present invention.
Figure 45:
Figure 45:
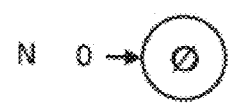

The NSAZT generation process ensures that there are no type-B inconsistencies and in this way ensures a fast implementation with no occurrences of type-B recursion iterations. The main data structure is optionally a zerotree DAG, as defined above. However, in order to avoid inconsistencies, an additional data structure, which may be referred to herein as dimension lists, is used. The dimension lists structure keeps separate lists for all sub-bands which have the same x-dimension or y-dimension, for example as shown at FIG. 44, which is a schematic illustration of the dimension lists and the 2D image they map. For brevity, the NSAZT generation process, which is described hereinbelow, is initialized with a null structure, for example as shown at FIG. 45, which is an image that is optionally received in an input signal, for example as depicted in FIG. 1, an X-dimension list and a Y-dimension list.

The main procedure of the NSAZT generation process is designed to transform a sub-band, optionally sub-band A, in the k-direction. The main procedure is based on constructing a list from all the sub-bands in the ruling class A, which are of the same k-dimension as A. Such a list may be constructed by a raster scan of the respective dimension list of A which is appended thereto. Then, for each sub-band B in this list do the following:
1. Remove sub-band B from the respective X-dimension and Y-dimension Lists, and from the Zero Tree DAG;

2. Apply the wavelet transform in d-direction to B yielding $BL_d$ and $BH_d$;
3. Insert $BL_d$ to the respective X-dimension and Y-dimension Lists, and to the zerotree DAG; and
4. Insert $BH_d$ to that same X-dimension and Y-dimension Lists, as described above, and to the zerotree DAG.

It should be noted that the NSAZT generation process maintains the aforementioned ruling class, and therefore maintains the aforementioned DAG ordering and the aforementioned DAG constraint.

Figure 46A:
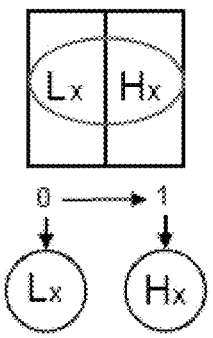
FIGS. 46A-46P which are schematic illustrations of a non-recursive SAZT generation process which is based on a 2D image, for example as provided in FIG. 45, according to some embodiments of the present invention.
Figure 46A:
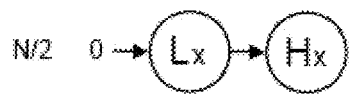
Figure 46A:
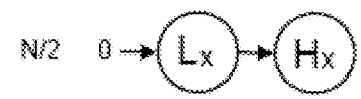
Figure 46B:
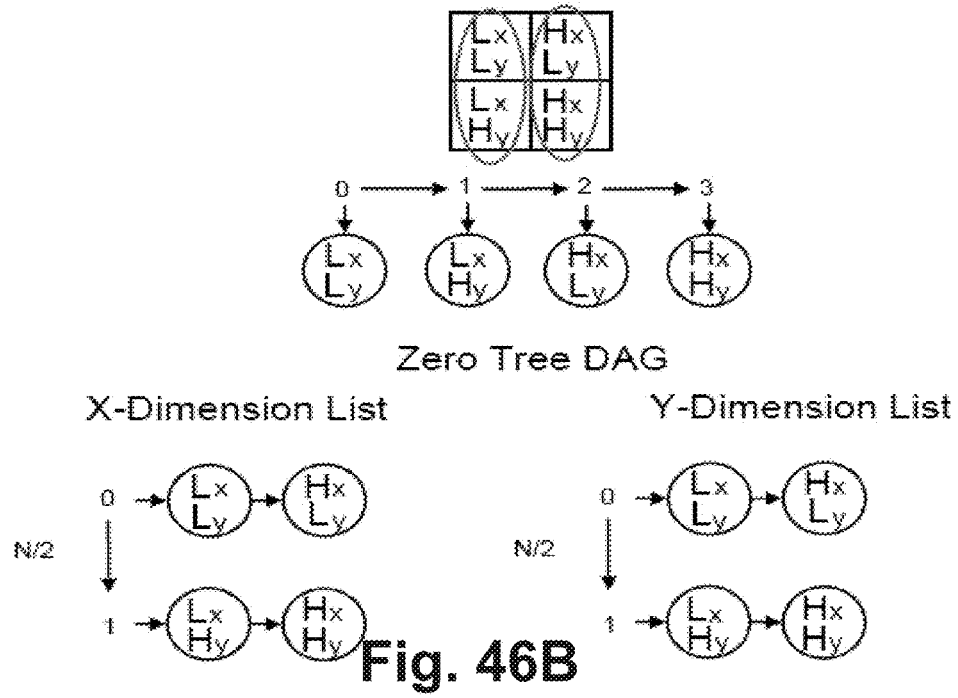
Figure 46C:
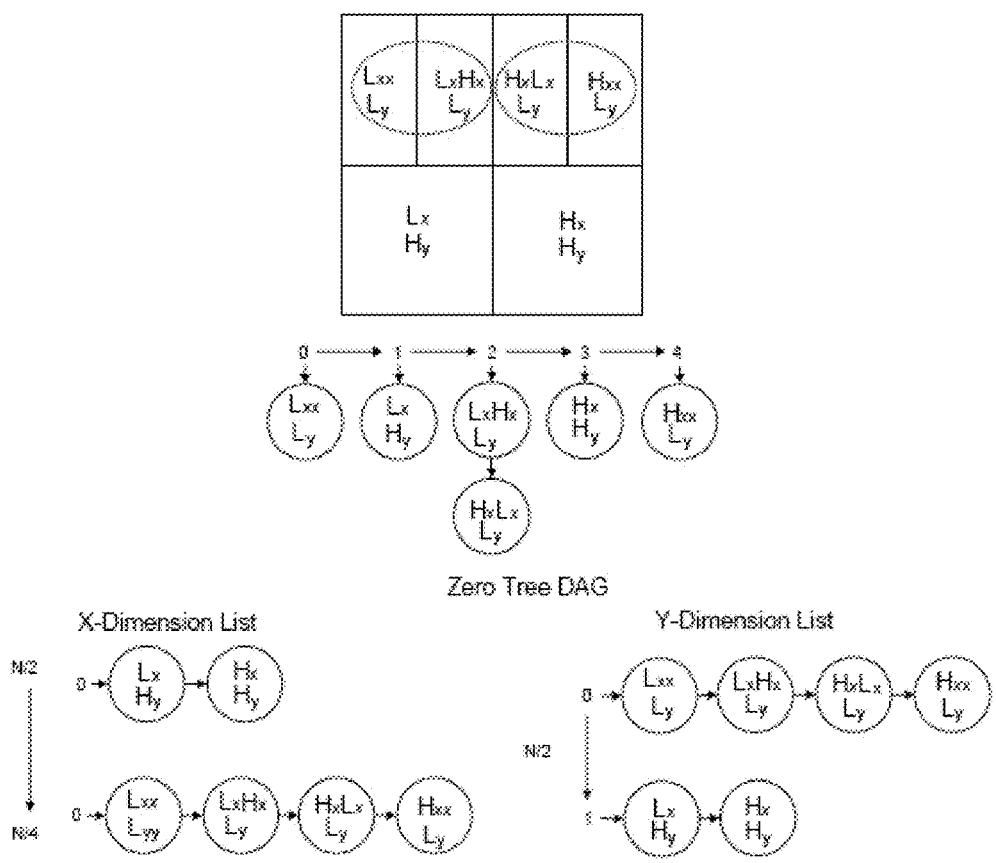
Figure 46D:
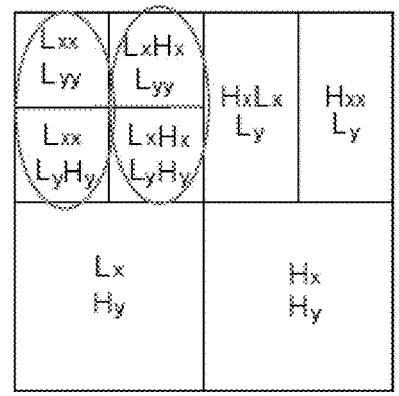
Figure 46D:
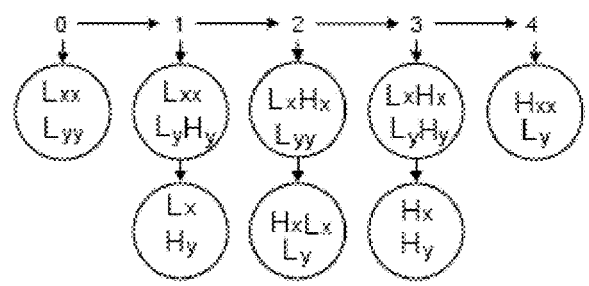
Figure 46D:
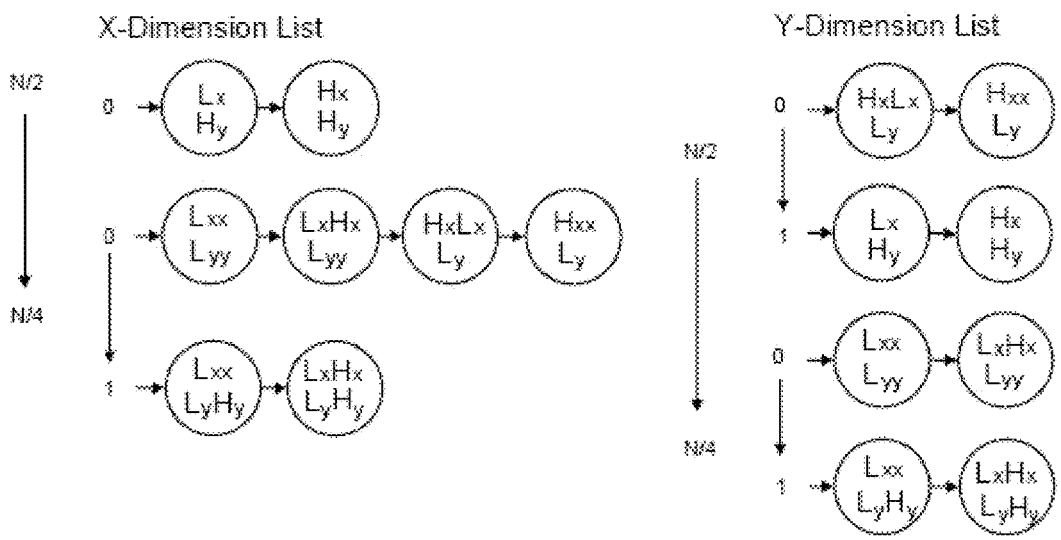
Figure 46E:
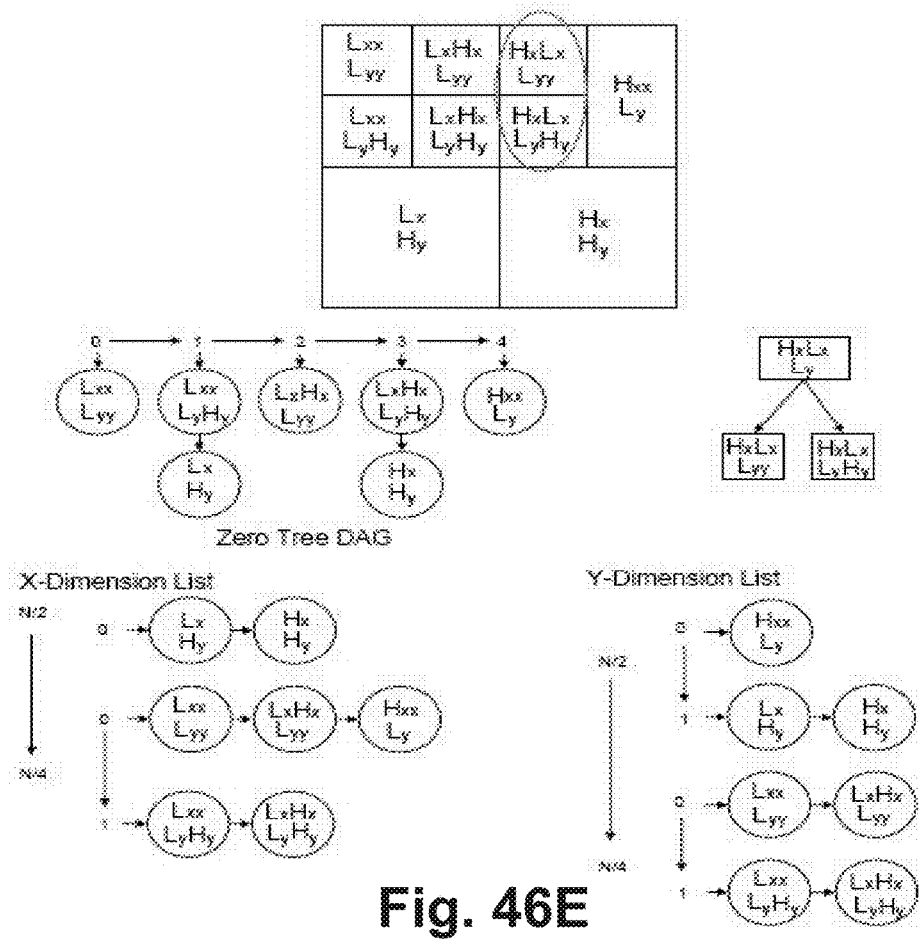
Figure 46F:
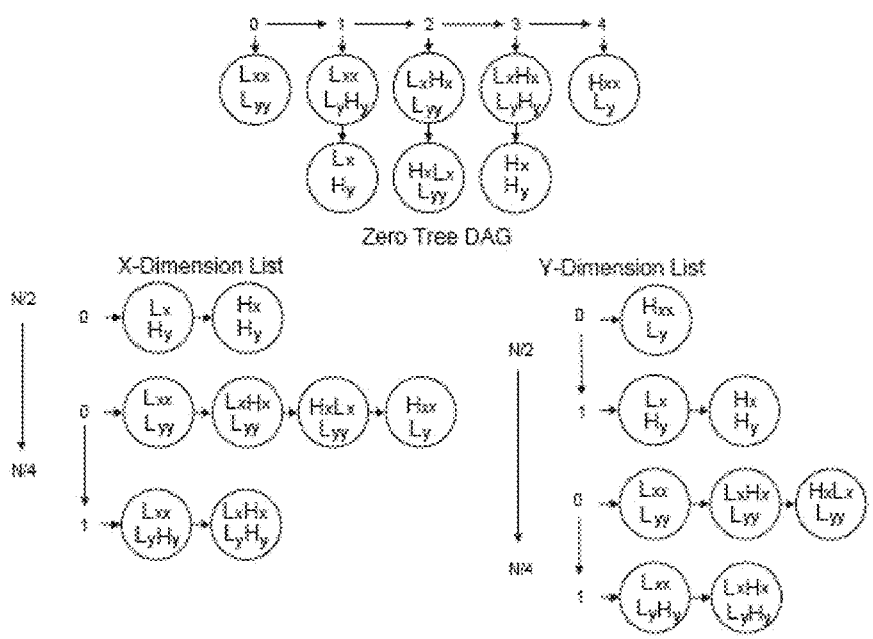
Figure 46G:
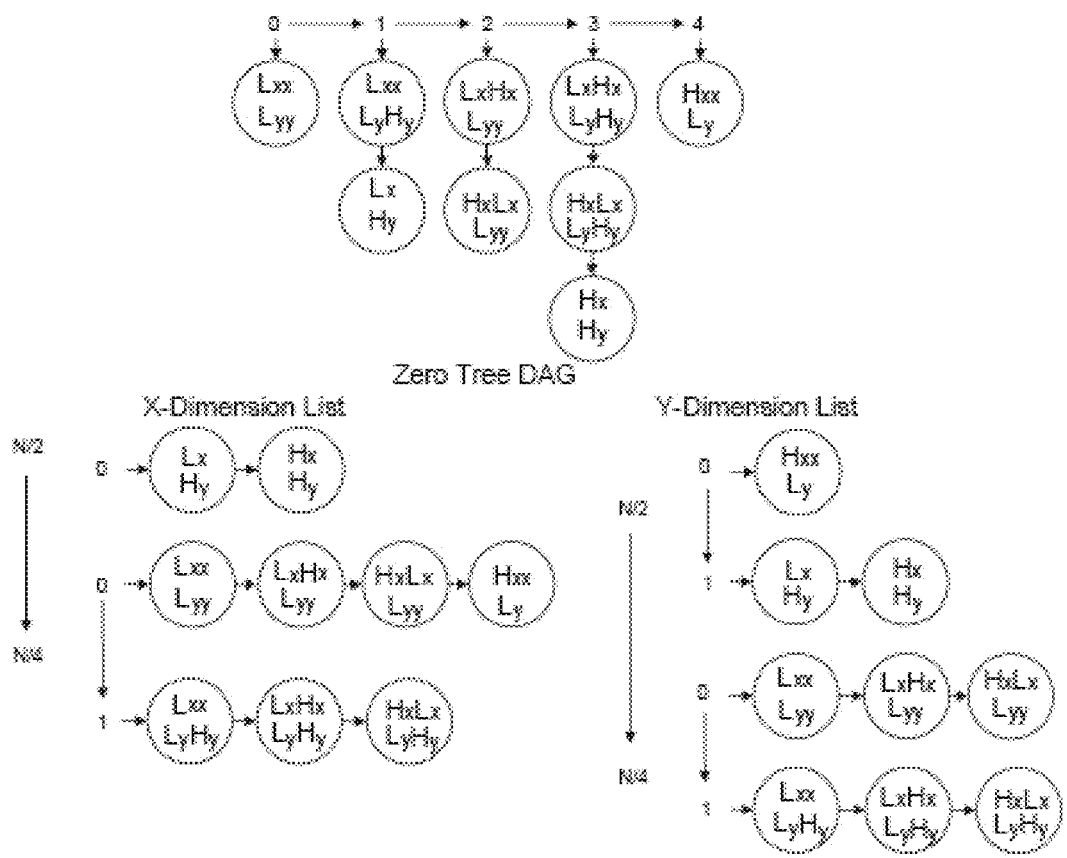
Figure 46H:
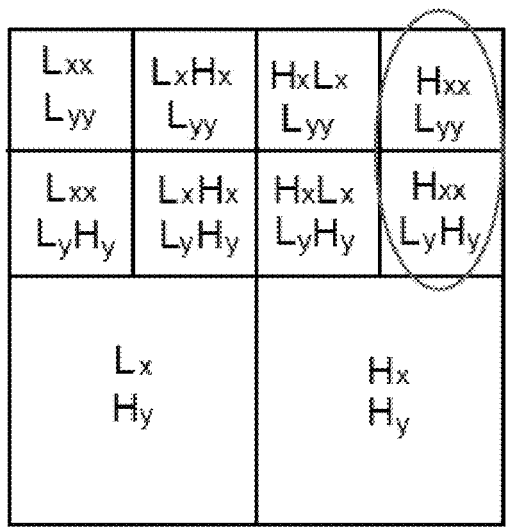
Figure 46H:
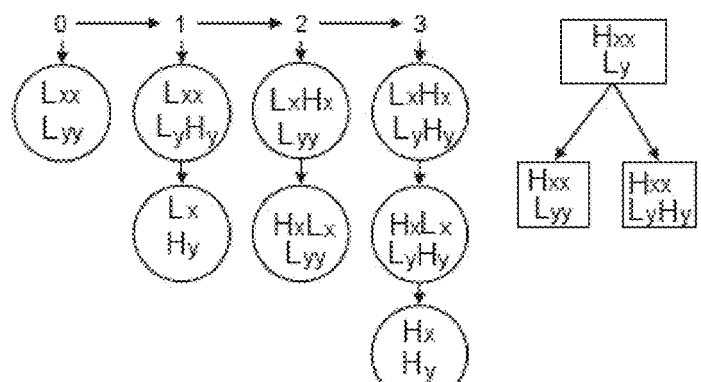
Figure 46H:
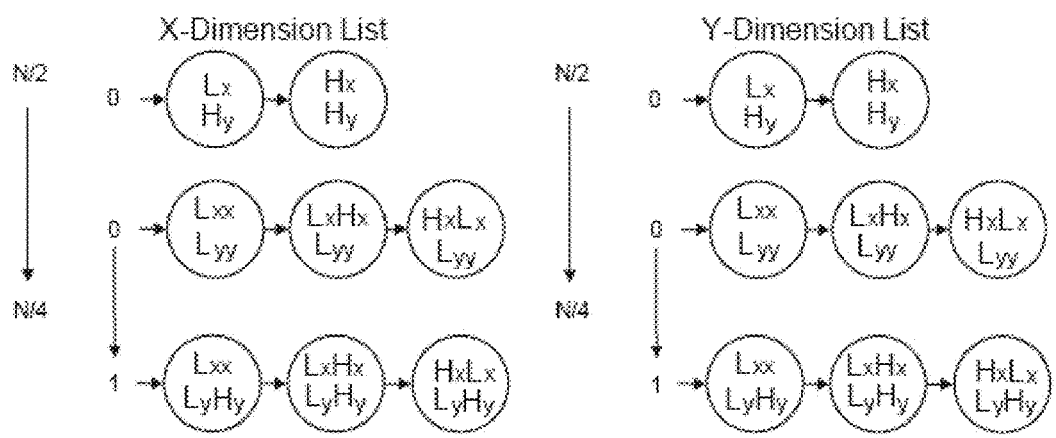
Figure 46I:
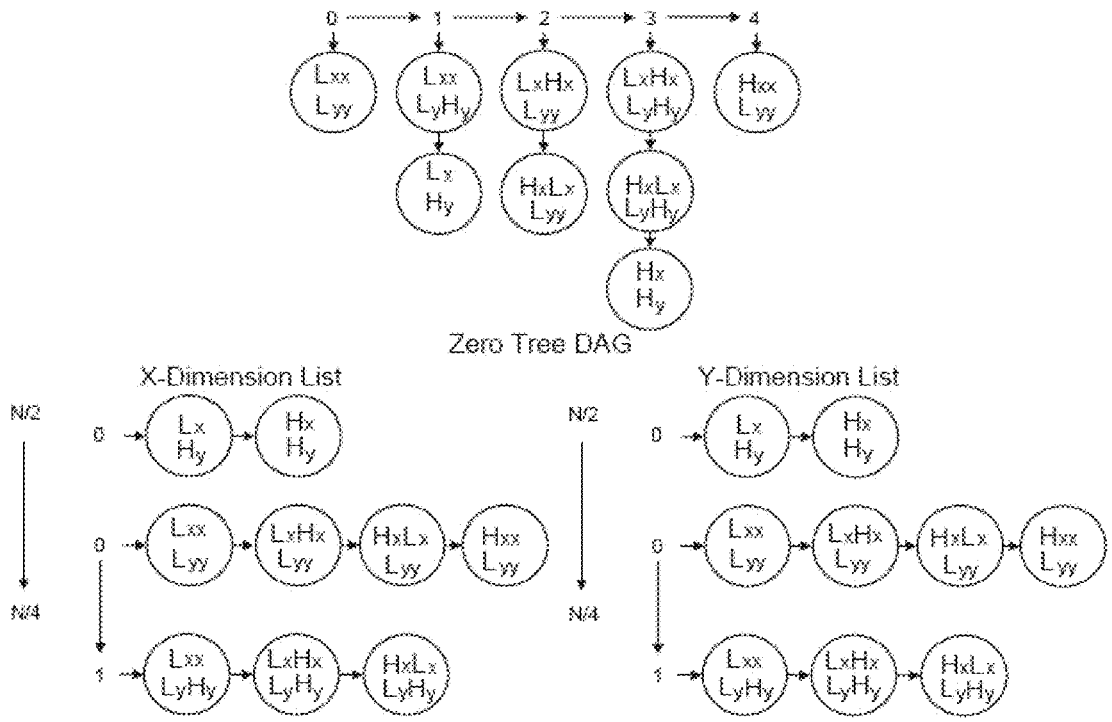
Figure 46J:
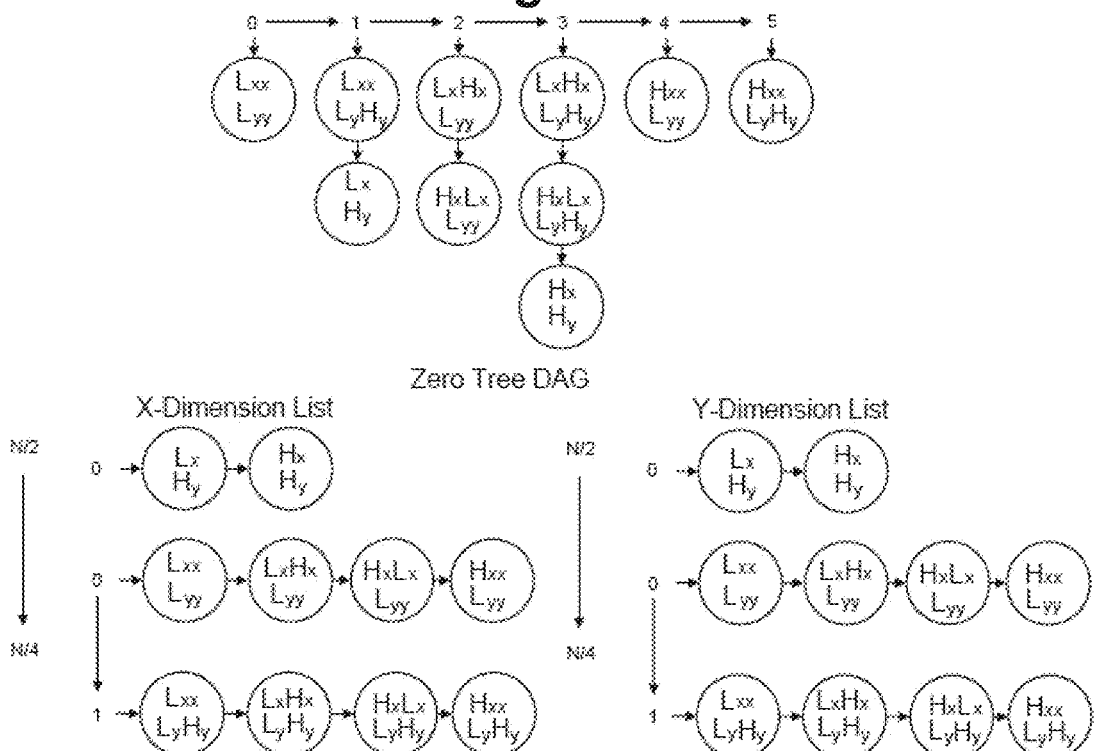
Figure 46K:
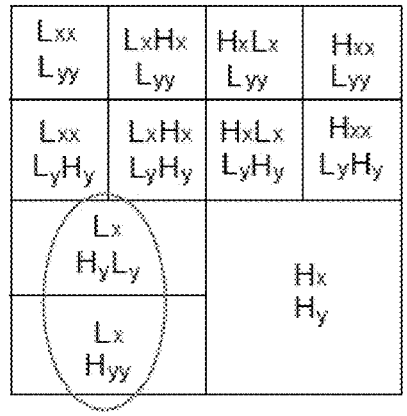
Figure 46K:
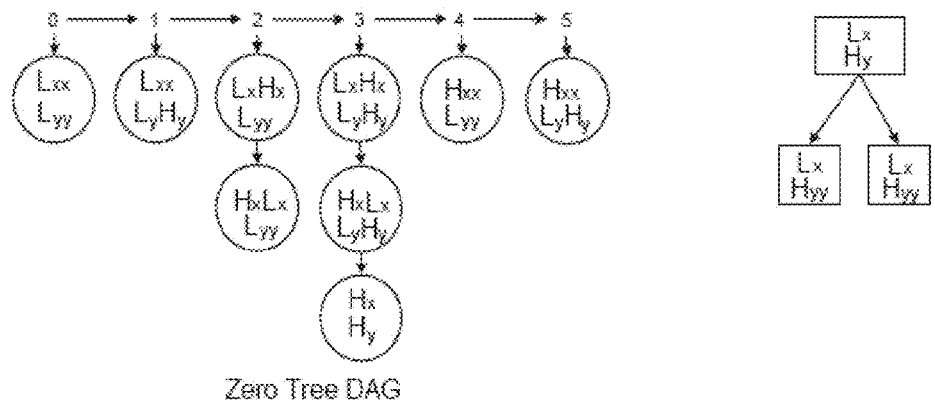
Figure 46K:
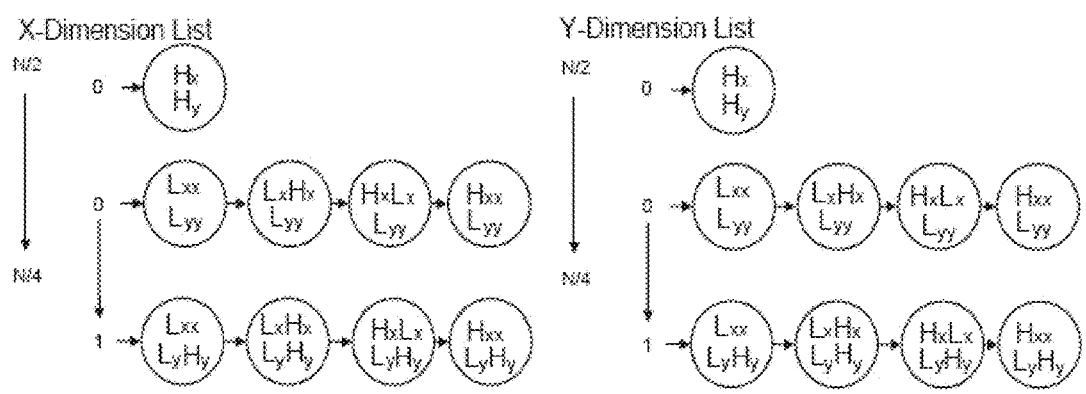
Figure 46L:
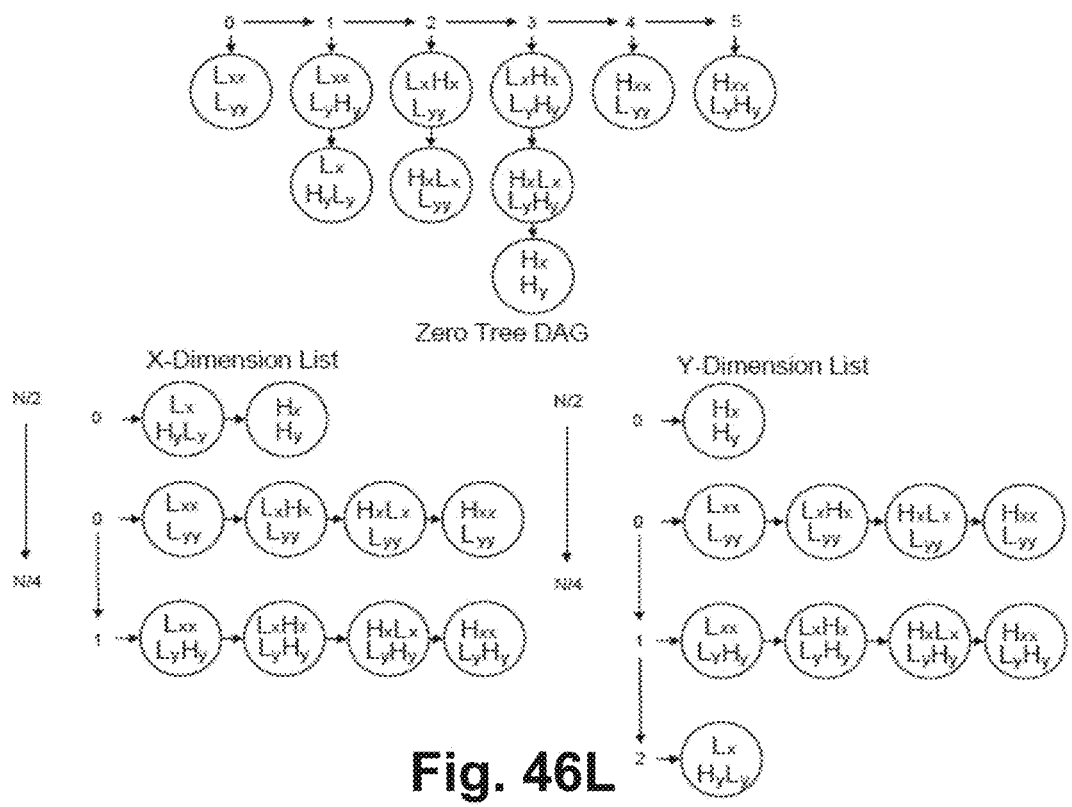
Figure 46M:
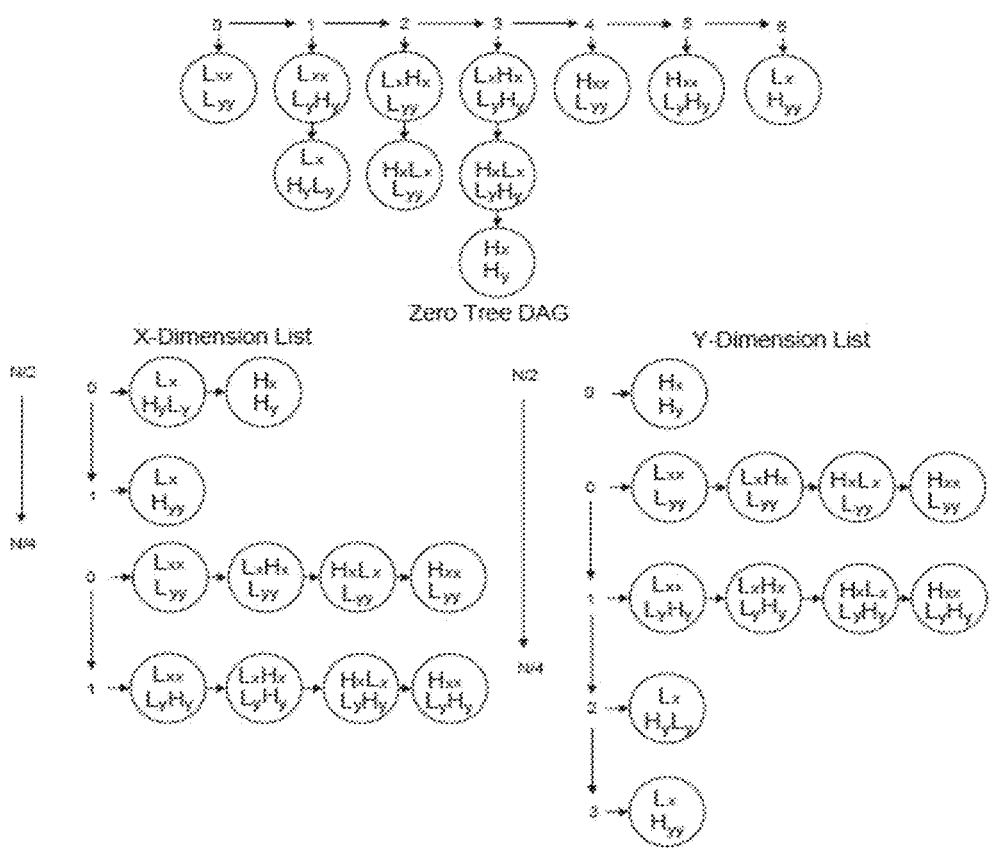
Figure 46N:
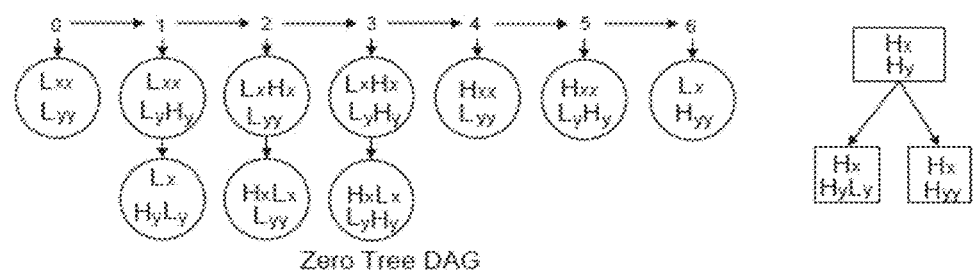
Figure 46N:
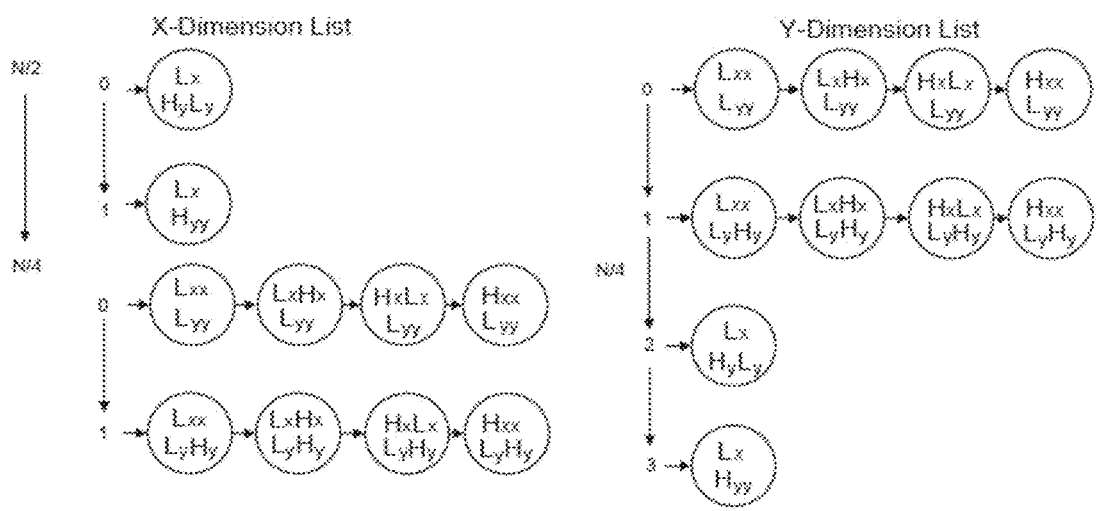
Figure 46O:
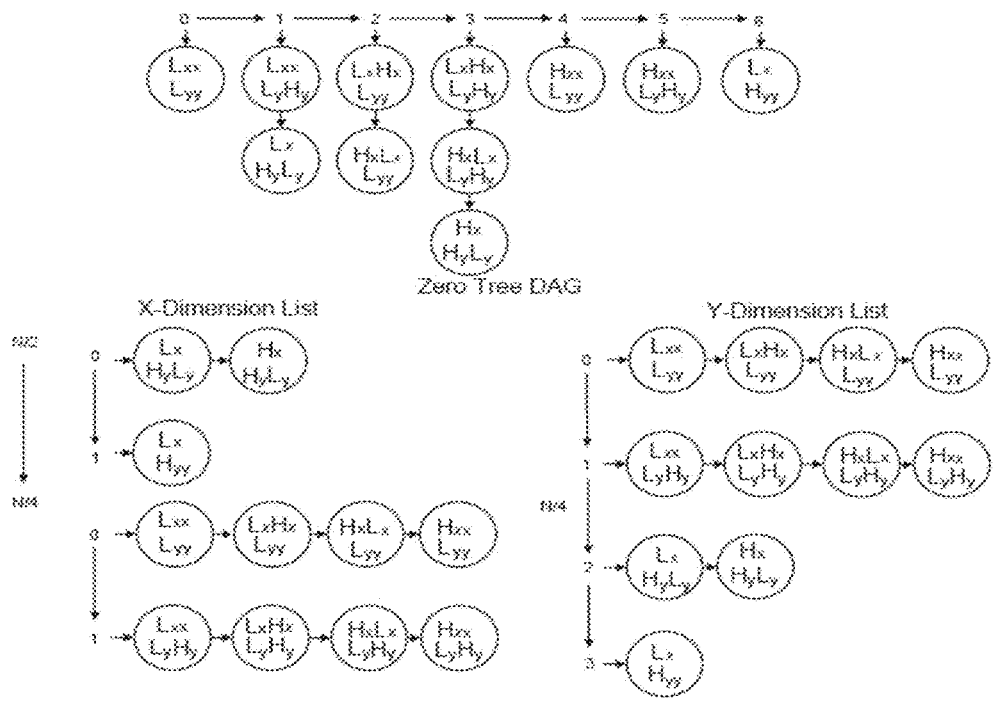
Figure 46P:
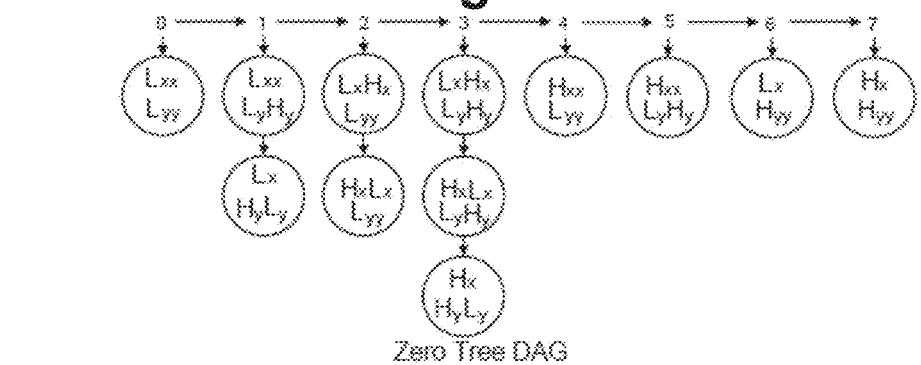
Figure 46P:
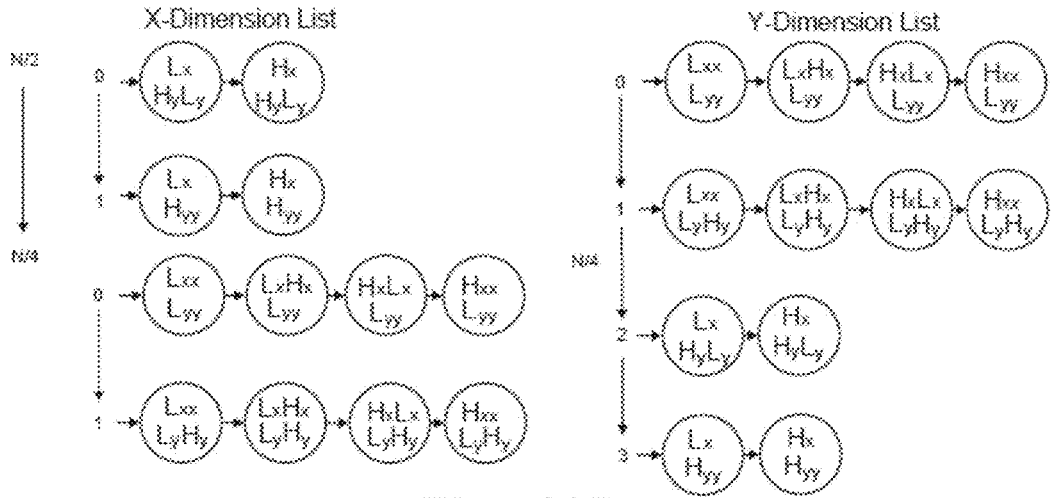

Reference is now made to exemplary FIGS. 46A-46P which are schematic illustrations of NSAZT generation process which is based on a 2D image, for example as provided in FIG. 45, according to some embodiments of the present invention.

First, FIG. 46A depicts a row transform of the original image that is represented in the received input signal, for example the original image of FIG. 45. Then, for example as shown at FIG. 46B, a column transform is performed on sub-band H. It should be noted that in such a manner a column transform to the sub-band $L_x$ is performed before the column transform of sub-band H. Then, for example as shown at FIG. 46C, a row transform is performed to sub-band $H_xL_y$. It should be noted that in such a manner a row transform to the sub-band $L_xL_y$ is performed before the column transform to the sub-band $H_xL_y$. Then, for example as shown at FIG. 46D, a column transform is performed to sub-band $L_xH_xL_y$. It should be noted that in such a manner a column transform to the sub-band $L_{xx}L_y$ is performed before the column transform to the sub-band $L_xH_xL_y$. In accordance with certain embodiments, this procedure is repeated for each one of the new sub-bands. In such a manner $H_xL_xL_y$ is column transformed, then $H_{xx}L_y$ and $L_xH_y$ are column transformed. For example, as shown at FIG. 46E, $H_xL_xL_y$ is column transformed and $H_xL_xL_{yy}$ is inserted, for example as shown at FIG. 46F. Then, as shown at FIG. 46G, $H_xL_xL_yH_y$ is inserted. Then, as shown at FIG. 46H, $H_{xx}L_y$ is removed. Now, $H_{xx}L_{yy}$ and $H_{xx}L_yH_y$ can be inserted, for example as respectively shown at FIGS. 46I and 46J. Then, as shown at FIG. 46K, $L_xH_y$ is removed. Similarly, $L_xH_yL_y$ and $L_xH_{yy}$ can be inserted, for example as respectively shown at FIGS. 46L and 46M. Now, as shown at FIG. 46N, $H_xH_y$ is removed. Similarly, $H_xH_yL_y$ and $H_xH_{yy}$ can be inserted, for example as respectively shown at FIGS. 46O and 46P.

Because the DAG data structure is not limited to a predefined number of dimensions, any of the multidimensional SAZT generation process, which is described for compressing 2D data segment, such as an image, can easily be applied for compressing data in any dimension, such as a video sequence, a video stream, a 3D image, a 4D image, and the like. For example, in the 2D case, x-label and y-label are used for constructing the DAG. In a similar manner, an additional z-label can be added to describe DAG in 3D.

Figure 47:
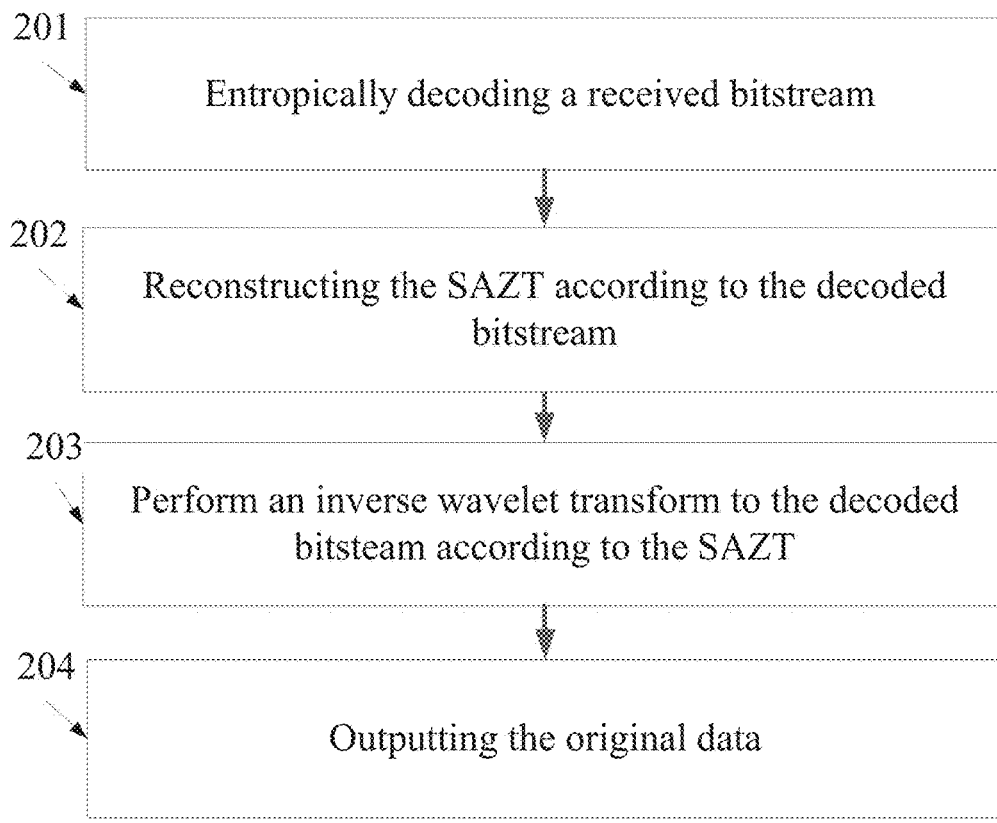
FIG. 47 is a flowchart of an exemplary method for decompressing digital data, such as media content, that has been compressed using a wavelet transformation and a SAZT, according to some embodiments of the present invention.

Reference is now made to FIG. 47, which is a flowchart of an exemplary method for decompressing digital data, such as media content, that has been compressed using a wavelet transformation and a SAZT, according to some embodiments of the present invention. The method, which is depicted in FIG. 47, is used for decompressing encoded digital data that has been generated using a wavelet transformation, as described in one or more of the aforementioned processes.

During the first step, as shown at 201, a received digital data, such as a bit stream is entropically decoded. The implementation of such entropy decoding is generally well known and therefore is not described here in greater detail.

During the following step, as shown at 202, the SAZT which has been used for encoding the bitstream is reconstructed. Such a reconstruction is performed according to an inverse of one of the aforementioned SAZT generation processes which are described above. Then, as shown at 203, an inverse wavelet transform is performed to the decoded bitsteam according to the reconstructed SAZT. The implementation of the inverse wavelet transform is based on the used wavelet transform that is described above. The implementation of such inverse wavelet transform is generally well known and therefore is not described here in greater detail. In the following step, as shown at 204, the digital data which has been encoded before 201 is built. Optionally, the digital data is a video stream and/or sequence that can be displayed.

Figure 48:
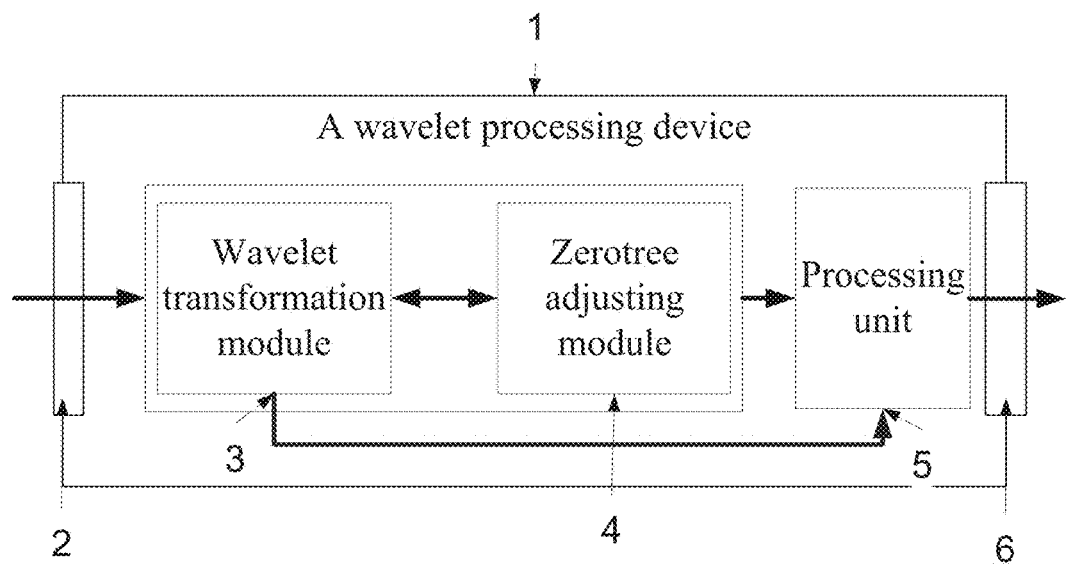
FIG. 48 is a schematic illustration of a wavelet processing device for processing, optionally compressing, digital data, such as an image or a video, using wavelet transformation and a related SAZT, according to some embodiments of the present invention.

Reference is now made to FIG. 48, which is a schematic illustration of a wavelet processing device 1 for processing, optionally compressing, digital data, such as an image or a video, using wavelet transformation and a related SAZT, according to some embodiments of the present invention. As depicted in FIG. 48, the device 1 comprises an input interface 2 for receiving an input signal that represents digital data, a wavelet transformation module 3 for transforming the input signal to a set of wavelet coefficients. The wavelet transformation module 3 creates a plurality of wavelet coefficients associated with the received input signal by iteratively performing a plurality of wavelet transforms to a plurality of sub-bands of said input signal. The plurality of wavelet coefficients are accessed by a zerotree adjusting module 4 that adjusts a zerotree dataset according thereto. Optionally, the zerotree adjusting module 4 adjusts the wavelet coefficients after each wavelet transform. The device 1 further comprises a processing module 5, which is optionally used for entropy encoding and/or analyzing the wavelet coefficients according to the adjusted zerotree. When entropy encoding is performed, the processing module 5 quantifies the wavelet coefficients using the adjusted zerotree, as described above. Optionally, the entropically coded quantified wavelet coefficients and the adjusted tree are outputted via a designated output interface 6.

In one embodiment of the present invention, an encoder device using the compression method cited above is disclosed. The encoder is not described hereinafter as it is substantially made up of the same functional modules as the compressing device 1.

Figure 49:
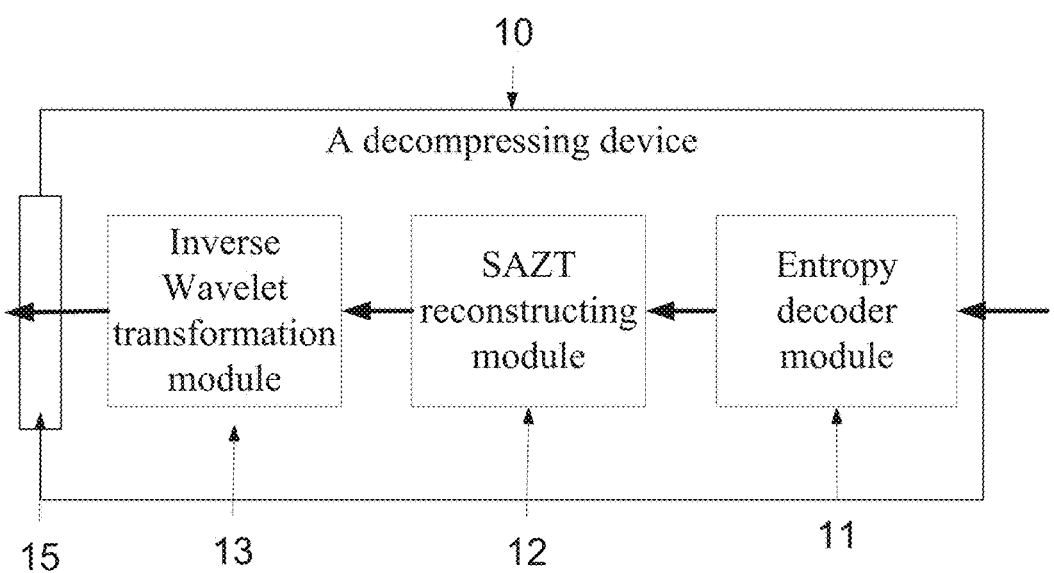
FIG. 49 is a schematic illustration of a device for decompressing digital data, according to some embodiments of the present invention.

Reference is now made to FIG. 49, which is a schematic illustration of a device 10 for decompressing digital data, such as an image or a video, which is compressed as encoded wavelet coefficients, according to some embodiments of the present invention. As depicted in FIG. 49, the device 10 comprises an entropy decoder module 11 which is adapted for entropically decoding encoded data which have been encoded according to a SAZT, optionally as described above. The device 10 further comprises an SAZT reconstructing module 12 for reconstructing the SAZT according to the decoded data. The reconstructed SAZT and the decoded data are forwarded to an inverse wavelet transformation module 13 that transforms the decoded data according to the reconstructed SAZT by performing an inverse wavelet transform, optionally as described above. Optionally, the reconstructed data is outputted via a designated output interface 15.

In one embodiment of the present invention, a decoder device that uses the aforementioned decompression method is disclosed. The decoder is not described hereinafter as it is substantially made up of the same functional modules as the decompressing device 10.

In one embodiment of the present invention, a compressor/decompressor or coder/decoder, which may be referred to as a CODEC, comprises the aforementioned compressing and decompressing devices. It should be noted that the invention is not limited to the compression method, the decompression method, the compressor, the decompressor and the codec which are described above by way of exemplary embodiments only.

It is expected that during the life of a patent maturing from this application many relevant methods and systems will be developed and the scope of the term video, digital content, compressions and wavelet are intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of defining relations between sub-bands of a sequence of wavelet transforms applied to an original n-dimensional signal, comprising:
    a. defining a list of sub-bands initially containing the original n-dimensional signal with a null label;
    b. repeatedly:
        (1) removing any sub-band with its label from said list of sub-bands;
        (2) creating a new low sub-band and a new high sub-band by respectively applying a pair of a low-pass and a high-pass 1D(1-dimensional) wavelet filters to said removed sub-band in the direction of dimension k of said sub-band's n dimensions;
        (3) defining a label for the new low sub-band as the removed sub-band's label concatenated with the symbol Lk, and a label for the new high sub-band as the removed sub-band's label concatenated with the symbol Hk;
        (4) inserting said two newly created low and high sub-bands, with their labels, to the list of sub-bands;
    c. defining the phase-space information of a given sub-band as the number and direction of symbols "Hk" appearing in the sub-band's label;
    d. partitioning the sub-bands of the list into groups of equal phase-space sub-bands; and
    e. defining a DAG (Directed Acyclic Graph) data structure comprising DAG relations between the sub-bands in each group.

2. The method of claim 1, wherein said DAG relations between the sub-bands in each group are defined first by dimension ordering relations and then, in case of equality, by lexicographic ordering relations.

3. The method of claim 1, wherein said DAG relations between the sub-bands in each group are defined by origin ordering relations and enforcing a dimension ordering constraint by recursively applying additional transformations.

4. The method of claim 1, wherein said DAG relations between the sub-bands in each group are defined by origin ordering relations and enforcing the "Ruling Class" constraint, that all sub-bands whose origin point is smaller than the sub-band end point be of smaller dimension ordering, by applying the required additional transformations.

5. The method of defining the DAG data structure of claim 1, comprising:
    defining an initial group consisting of one sub-band having a null label, said sub-band being the original n-dimensional signal, and the corresponding DAG of said initial group; and repeatedly applying the following operations:

a. removing an input sub-band from its DAG group of equally phase-space sub-bands;
b. applying a low and high pass wavelet filters to said input sub-band to create a new low sub-band having the same phase-space information as that of the input sub-band, and a new high sub-band having a different phase-space information than that of the input sub-band;
c. inserting said low sub-band to the DAG data structure of said input sub-band in accordance with that DAG relations;
d. inserting said high sub-band to the DAG data structure of the respective group of sub-bands having that same phase-space information, in accordance with that DAG relations; or creating a new group consisting of said high sub-band only and the corresponding DAG consisting of said high sub-band only, if a group having that same phase-space information does not exist.

6. The method of constructing the DAG data structure of claim 2, comprising:
defining an initial group consisting of one sub-band having a null label, said sub-band being the original signal, and the corresponding DAG of said initial group; and repeatedly applying the following operations:
a. removing an input sub-band from its DAG group of equally phase-space sub-bands;
b. applying a low and high pass wavelet filters to said input sub-band to create a new low sub-band having the same phase-space information as that of the input sub-band, and a new high sub-band having a different phase-space information than that of the input sub-band;
c. inserting said low sub-band to the DAG data structure of said input sub-band in accordance with the dimension ordering and the lexicographical ordering constraints;
d. inserting said high sub-band to the DAG data structure of the respective group of sub-bands having that same phase-space information in accordance with the dimension ordering and the lexicographical ordering constraints; or -creating a new group consisting of said high sub-band only and the corresponding DAG consisting of said high sub-band only, if a group having that same phase-space information does not exist.

7. The method of constructing the DAG data structure of claim 3, comprising:
defining an initial group consisting of one sub-band having a null label, said sub-band being the original signal, and the corresponding DAG of said initial group; and repeatedly applying the following operations:
a. removing an input sub-band from its DAG group of equally phase-space sub-bands;
b. applying a low and high pass wavelet filters to said input sub-band to create a new low sub-band having the same phase-space information as that of the input sub-band, and a new high sub-band having a different phase-space information than that of the input sub-band;
c. inserting said low sub-band to the DAG data structure of said input sub-band in accordance with the origin ordering constraint, maintaining the dimension ordering constraint by recursively applying additional wavelet transformations and updating the respective DAG data structures accordingly;
d. inserting said high sub-band to the DAG data structure of the respective group of sub-bands having that same phase-space information, in accordance with the origin ordering constraint, maintaining the dimension ordering constraint by recursively applying additional wavelet transformations and updating the respective DAG data structures accordingly; or creating a new group consisting of said high sub-band only and the corresponding DAG consisting of said high sub-band only, if a group having that same phase-space information does not exist.

8. The method of constructing the DAG data structure of claim 4, comprising:
defining an initial group consisting of one sub-band having a null label, said sub-band being the original signal, and the corresponding DAG of said initial group; and repeatedly applying the following operations:
a. removing an input sub-band from its DAG group of equally phase-space sub-bands;
b. applying a low and high pass wavelet filters to said input sub-band to create a new low sub-band having the same phase-space information as that of the input sub-band, and a new high sub-band having a different phase-space information than that of the input sub-band;
c. inserting said low sub-band to the DAG data structure of said input sub-band in accordance with the origin ordering constraint, maintaining the "Ruling Class" constraint by iteratively applying the additional required wavelet transformations and updating the respective DAG data structures accordingly;
d. inserting said high sub-band to the DAG data structure of the respective group of sub-bands having that same phase-space information, in accordance with the origin ordering constraint, maintaining the "Ruling Class" constraint by iteratively applying the additional required wavelet transformations and updating the respective DAG data structures accordingly; or creating a new group consisting of said high sub-band only and the corresponding DAG consisting of said high sub-band only, if a group having that same phase-space information does not exist.

9. The method of claim 1, wherein said wavelet transforms and said defining the DAG data structures are performed concurrently.

10. The method of claim 1, wherein said n-dimensional signal is selected from a group consisting of: an image, a sequence of images, a video stream, a three dimensional image, and a four dimensional image.

11. The method of claim 1, further comprising after defining the DAG data structures in step (e),
defining respective tree data structures corresponding to said DAG data structures.

12. The method of claim 5, further comprising after inserting said sub-bands into the corresponding DAG data structures at steps c) and d),
updating respective tree data structures corresponding to said DAG data structures.

13. The method of claim 6, further comprising after inserting said sub-bands into the corresponding DAG data structures at steps c) and d),
updating respective tree data structures corresponding to said DAG data structures.

14. The method of claim 7, further comprising after inserting said sub-bands into the corresponding DAG data structures at steps c) and d), updating respective tree data structures corresponding to said DAG data structures.

15. The method of claim 8, further comprising after inserting said sub-bands into the corresponding DAG data structures at steps c) and d),
updating respective tree data structures corresponding to said DAG data structures.

16. The method of claim 1, further comprising after defining the DAG data structure in step e),
encoding the wavelet coefficients of each sub-band in said DAG, said encoding method selected from the group consisting of: a scalar quantization method, a vector quantization method, a Huffman coding method, an arithmetic coding method and a zero tree method.

17. The method of claim 5, further comprising after defining the DAG data structures in steps c) and d),
encoding the wavelet coefficients of said DAG sub-bands, said encoding method selected from the group consisting of: a scalar quantization method, a vector quantization method, a Huffman coding method, an arithmetic coding method, and a zero tree method.

18. The method of claim 6, further comprising after defining the DAG data structures in steps c) and d),
encoding the wavelet coefficients of said DAG sub-bands, said encoding method selected from the group consisting of: a scalar quantization method, a vector quantization method, a Huffman coding method, an arithmetic coding method, and a zero tree method.

19. The method of claim 7, further comprising after defining the DAG data structures in steps c) and d),
encoding the wavelet coefficients of said DAG sub-bands, said encoding method selected from the group consisting of: a scalar quantization method, a vector quantization method, a Huffman coding method, an arithmetic coding method, and a zero tree method.

20. The method of claim 8, further comprising after defining the DAG data structures in steps c) and d),
encoding the wavelet coefficients of said DAG sub-bands, said encoding method selected from the group consisting of: a scalar quantization method, a vector quantization method, a Huffman coding method, an arithmetic coding method, and a zero tree method.

21. The method of claim 1, further comprising after defining the DAG sub-band groups in step e),
performing optimal rate control analysis of said wavelet coefficients of said DAG sub-band groups, said analysis further guiding the sequence of wavelet transforms to perform.

22. The method of claim 5, further comprising after defining the DAG sub-band groups in steps c) and d),
performing optimal rate control analysis of said wavelet coefficients of said DAG sub-band groups, said analysis further guiding the sequence of wavelet transforms to perform.

23. The method of claim 6, further comprising after defining the DAG sub-band groups in steps c) and d),
performing optimal rate control analysis of said wavelet coefficients of said DAG sub-band groups, said analysis further guiding the sequence of wavelet transforms to perform.

24. The method of claim 7, further comprising after defining the DAG sub-band groups in steps c) and d),
performing optimal rate control analysis of said wavelet coefficients of said DAG sub-band groups, said analysis further guiding the sequence of wavelet transforms to perform.

25. The method of claim 8, further comprising after defining the DAG sub-band groups in steps c) and d),
performing optimal rate control analysis of said wavelet coefficients of said DAG sub-band groups, said analysis further guiding the sequence of wavelet transforms to perform.

* * * * *